(12) United States Patent
Kahn

(10) Patent No.: US 11,388,601 B1
(45) Date of Patent: Jul. 12, 2022

(54) CELLULAR SYSTEMS HAVING ELEMENTS MODIFIED TO TRANSFORM AND/OR OPERATE CELLULAR COMMUNICATION SIGNALS IN ACCORDANCE WITH NOVEL CELLULAR COMMUNICATIONS PROTOCOLS AND NETWORK ARCHITECTURES UTILIZING CELLULAR NETWORK HOSTED ACCESS CONTROLLING SCHEMAS, AND METHODS FOR USE THEREOF

(71) Applicant: Ari Kahn, Mt. Shasta, CA (US)

(72) Inventor: Ari Kahn, Mt. Shasta, CA (US)

( * ) Notice: Subject to any disclaimer, the term of this patent is extended or adjusted under 35 U.S.C. 154(b) by 0 days.

(21) Appl. No.: 17/567,044

(22) Filed: Dec. 31, 2021

(51) Int. Cl.
*H04W 12/72* (2021.01)
*H04W 12/08* (2021.01)
*H04L 9/32* (2006.01)
*H04W 12/71* (2021.01)
*H04W 12/60* (2021.01)

(52) U.S. Cl.
CPC .......... *H04W 12/72* (2021.01); *H04L 9/3236* (2013.01); *H04W 12/08* (2013.01); *H04W 12/66* (2021.01); *H04W 12/71* (2021.01)

(58) Field of Classification Search
CPC ..... H04W 12/72; H04W 12/08; H04W 12/66; H04W 12/71; H04L 9/3236
See application file for complete search history.

(56) References Cited

U.S. PATENT DOCUMENTS

| | | | |
|---|---|---|---|
| 5,524,142 A | 6/1996 | Lewis et al. | |
| 6,381,317 B1 | 4/2002 | Bala et al. | |
| 6,487,602 B1 | 11/2002 | Thakker | |
| 6,868,267 B1 | 3/2005 | Briggs et al. | |
| 7,319,855 B1 | 1/2008 | Brune et al. | |
| 7,321,656 B2 | 1/2008 | Bevente et al. | |
| 7,403,603 B2 | 7/2008 | Tikiks et al. | |
| 7,487,213 B2 | 2/2009 | Zager et al. | |

(Continued)

OTHER PUBLICATIONS

Micropayments: A Viable Business Model?, 1 page (2011). https://cs.stanford.edu/people/eroberts/cs201/projects/2010-11/MicropaymentsAndTheNet/history.html.

(Continued)

*Primary Examiner* — Mazda Sabouri
(74) *Attorney, Agent, or Firm* — Greenberg Traurig, LLP

(57) ABSTRACT

In some embodiments, the present disclosure is directed to an exemplary process including: receiving, by a processor of a computing device, via an application program and a communications network, application program instruction to display an access controller interface element and an access code on a screen; where the access controller interface element is communicatively coupled to a cellular network hosted access controlling schema and operationally linked to an access-restricted digital resource; transmitting, by the processor, an access request having data that includes the access code and an identity linked to the computing device; where at least one part of the data is configured to be accepted by the cellular network hosted access controlling schema; receiving, by the processor, access program instruction to unlock the access-restricted digital resource; and executing, by the processor, the access program instruction to unlock the access-restricted digital resource for accessing via the computing device.

30 Claims, 25 Drawing Sheets

(56) References Cited

U.S. PATENT DOCUMENTS

| | | | |
|---|---|---|---|
| 7,502,455 | B2 | 3/2009 | Crockett et al. |
| 7,603,102 | B1 | 10/2009 | Pryor |
| 7,945,242 | B2 | 5/2011 | Kahn |
| 8,009,816 | B2 | 8/2011 | Syrjala et al. |
| 8,149,848 | B2 | 4/2012 | Karaoguz et al. |
| 8,275,119 | B2 | 9/2012 | Kahn |
| 8,725,637 | B2 | 5/2014 | Bixler et al. |
| 8,818,328 | B2 | 8/2014 | Kahn |
| 8,862,751 | B2 | 10/2014 | Faccin et al. |
| 8,874,635 | B2 | 10/2014 | Mustafa |
| 8,886,773 | B2 | 11/2014 | Papakostas et al. |
| 8,954,032 | B1 | 2/2015 | Stoler |
| 9,264,552 | B2 | 2/2016 | Kahn |
| D778,269 | S | 2/2017 | Kahn et al. |
| 9,924,356 | B2 | 3/2018 | McQueen |
| 10,110,706 | B2 | 10/2018 | Chen et al. |
| 10,116,805 | B2 | 10/2018 | Lu et al. |
| 10,142,322 | B2 | 11/2018 | Thodupunoori et al. |
| 10,187,528 | B2 | 1/2019 | Kahn |
| 10,311,413 | B2 | 6/2019 | Stroeh et al. |
| 10,341,498 | B2 | 7/2019 | Kahn |
| 10,728,385 | B2 | 7/2020 | Kahn |
| 10,986,504 | B1* | 4/2021 | Smith ............... G06Q 20/3221 |
| 2004/0042597 | A1 | 3/2004 | Atkins et al. |
| 2004/0053598 | A1 | 3/2004 | Book et al. |
| 2004/0067747 | A1 | 4/2004 | Carpenter et al. |
| 2004/0199475 | A1 | 10/2004 | Rivest et al. |
| 2004/0213409 | A1 | 10/2004 | Murto et al. |
| 2005/0009500 | A1 | 1/2005 | Ear |
| 2005/0102242 | A1 | 5/2005 | Omidyar |
| 2005/0177506 | A1 | 8/2005 | Rissanen |
| 2005/0188010 | A1 | 8/2005 | Valk |
| 2006/0053293 | A1 | 3/2006 | Zager et al. |
| 2006/0256941 | A1 | 11/2006 | Kahn |
| 2007/0208864 | A1 | 9/2007 | Flynn et al. |
| 2008/0091489 | A1 | 4/2008 | Larock et al. |
| 2008/0177638 | A1 | 7/2008 | Butler |
| 2008/0229399 | A1 | 9/2008 | O'Neil et al. |
| 2008/0243650 | A1 | 10/2008 | Yoon |
| 2009/0070262 | A1 | 3/2009 | Olliphant et al. |
| 2009/0198619 | A1 | 8/2009 | Tripunitara et al. |
| 2009/0275307 | A1 | 11/2009 | Kahn |
| 2010/0069036 | A1 | 3/2010 | Pericas et al. |
| 2010/0293017 | A1 | 11/2010 | Merritt et al. |
| 2011/0077949 | A1 | 3/2011 | Olliphant et al. |
| 2012/0064860 | A1 | 3/2012 | O'Neil et al. |
| 2012/0083243 | A1 | 4/2012 | Kahn |
| 2014/0316982 | A1 | 10/2014 | Brown et al. |
| 2014/0323082 | A1 | 10/2014 | Browne et al. |
| 2014/0324696 | A1 | 10/2014 | Browne et al. |
| 2015/0350459 | A1 | 12/2015 | Isobe et al. |
| 2015/0365512 | A1* | 12/2015 | Mackenzie ....... H04W 12/0431 455/420 |
| 2016/0374132 | A1 | 12/2016 | Yerrabommanahalli et al. |
| 2017/0063925 | A1 | 3/2017 | Votaw et al. |
| 2017/0068947 | A1 | 3/2017 | Xie et al. |
| 2017/0213404 | A1* | 7/2017 | Sivalingam ......... G06F 16/9535 |
| 2017/0237822 | A1 | 8/2017 | Kahn |
| 2017/0329615 | A1 | 11/2017 | Kahn |
| 2018/0315086 | A1 | 11/2018 | Morse et al. |
| 2020/0145384 | A1* | 5/2020 | Chauhan ............... G06F 21/606 |

OTHER PUBLICATIONS

Thorpe, Esther Kezia, "Why micropayments aren't dead . . . yet," 16 pages (2020). https://whatsnewinpublishing.com/why-micropayments-arent-dead-yet/.

Nielsen, Jakob, "The Case for Micropayments," 5 pages (1998). https://www.nngroup.com/articles/the-case-for-micropayments/.

Rosenberg, Scott, "The micropayments mirage," Trent Micor, 9 pages (2021). https://www.google.com/amp/s/www.axios.com/micropayments-mirage-subscriptions-payments-online-84aff6f2-b24d-4f1f-afdf-e10a71104b17.html.

Lesk, Michaek, "Micropayments: An Idea Whose Time Has Passed Twice?," Digital Rights, 3 pages (2004). https://www.google.com/url?sa=t&source=web&rct=j&url=https://www.cpe.ku.ac.th/~mcs/courses/2005_02/214573/papers/micropayments.pdf&ved=2ahUKEwilt5Xes9j0AhVEbs0KHaFUCbgQFnoECAUQAQ&usg=AOvVaw120sw9ZhgKv4ZXITIdsWsL.

Case, Amber, "Who Killed the micropayment? A history." 16 pages (2003). https://caseorganic.medium.com/who-killed-the-micropayment-a-history-ec9e6eb39d05.

Shea, Ryan, "Micropayments, Abridged," 9 pages (2019). https://medium.com/radartech/micropayments-abridged-2f110302677c.

Birch, David G.W. "Micropayments Are a Macro Opportunity," 6 pages (2021). https://www.google.com/amp/s/www.forbes.com/sites/davidbirch/2021/05/16/micropayments-are-a-macro-opportunity/amp/.

Coinpedia, "The Road Not Taken: Browser-Based Micropayments and History of Error 402," 11 pages (2021).

Rivest, Robert L., "Peppercoin Micropayments," Proceedings Financial Cryptograhy, Springer, 8 pages (2004); http://www.springer.de/comp/lncs/index.html.

Nelson, Ted, "The Babbage of the web," The Economist, 9 pages (2000).

Tufekci, Zeynep, "Shouldn't We All Have Seamless Micropayments by Now?," 3 pages (2019).

* cited by examiner

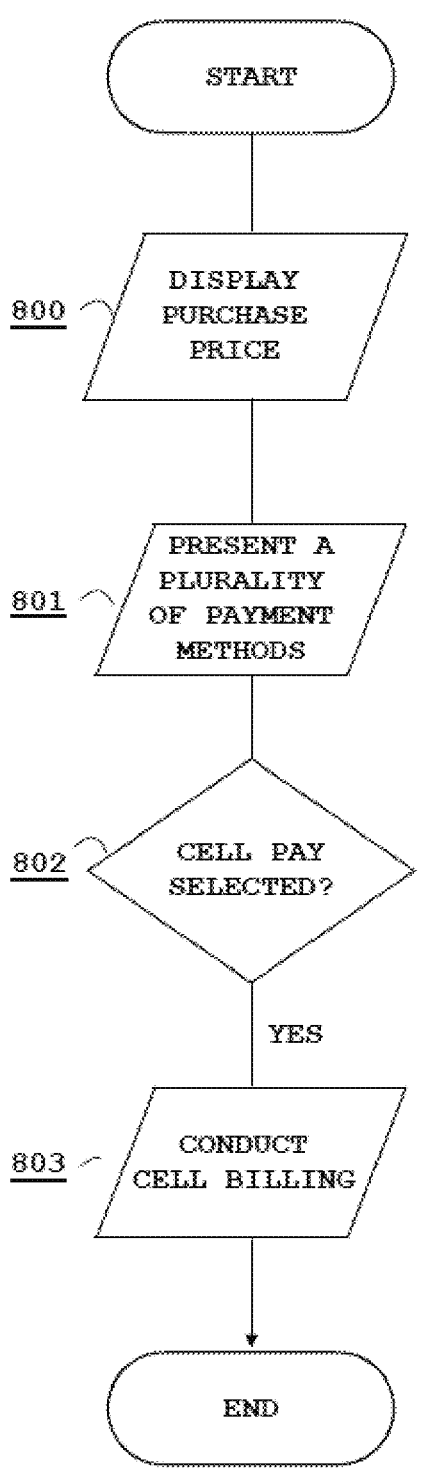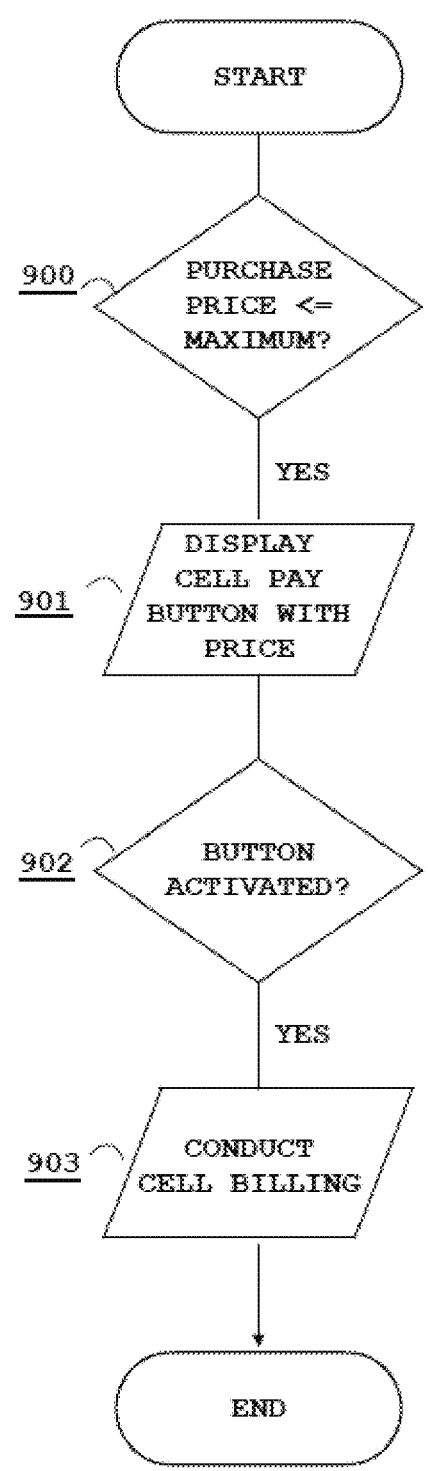
FIG. 8
(Prior Art)
FIG. 9

(PLURALITY)

(SINGULARITY)

| | CELL SIGNALS | PARSE INT | MIN/MAX | TARIFF |
|---|---|---|---|---|
| 151A | *NN | NN | 0/99 | $0.NN |
| 152A | *NNN | NNN | 0/999 | $N.NN |
| 153A | *NNNN | NNNN | 0/9999 | $NN.NN |
| 154A | *NNNNN | NNNNN | 0/99999 | $NNN.NN |
| 155A | *NN... | NN... | 0/99... | $...N.NN |
| 156A | NN... | NN... | 0/99... | $...N.NN |

| | SIGNALS NN | SIGNALS NNN | TARIFF |
|---|---|---|---|
| 151B | *00 | *000 | 0¢ |
| 152B | *01 | *001 | 1¢ |
| 153B | *02 | *002 | 2¢ |
| 154B | *05 | *005 | 5¢ |
| 155B | *10 | *010 | 10¢ |
| 156B | *25 | *025 | 25¢ |
| 157B | *50 | *050 | 50¢ |
| 158B | *75 | *075 | 75¢ |
| 159B | *99 | *099 | 99¢ |

| | DEC | HEX | OVERDECADIC TELEPHONY BCD | OVERDECADIC NATURAL BCD |
|---|---|---|---|---|
| 150C | 0 | 0000 | | |
| | 1 | 0001 | | |
| | 2 | 0010 | | |
| | 3 | 0011 | | |
| | 4 | 0100 | | |
| | 5 | 0101 | | |
| | 6 | 0110 | | |
| | 7 | 0111 | | |
| | 8 | 1000 | | |
| 151C | 9 | 1001 | | |
| 152C | 10 | 1010 | * | A |
| 153C | 11 | 1011 | # | B |
| 154C | 12 | 1100 | A | C |
| 155C | 13 | 1101 | B | D |
| 156C | 14 | 1110 | C | E |
| 157C | 15 | 1111 | STOP (ST) | F |

FIG. 15C

CELLULAR SYSTEMS HAVING ELEMENTS MODIFIED TO TRANSFORM AND/OR OPERATE CELLULAR COMMUNICATION SIGNALS IN ACCORDANCE WITH NOVEL CELLULAR COMMUNICATIONS PROTOCOLS AND NETWORK ARCHITECTURES UTILIZING CELLULAR NETWORK HOSTED ACCESS CONTROLLING SCHEMAS, AND METHODS FOR USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Ari Kahn, All Rights Reserved.

FIELD OF TECHNOLOGY

This subject matter relates to cellular system having elements modified to transform and/or operate cellular communication signals in accordance with novel cellular communications protocols and network architectures utilizing cellular network hosted access controlling schemas, and methods for use thereof.

BACKGROUND

Typically, cellular communication signals associated with a cellular communication may utilize a Basic Call State Model (BCSM) and control points that may govern communication setup, progression and other call-related actions in an Intelligent Network (IN) (communications network). In one example, where the communication may be a mobile originated telephony call request, a network switching element (e.g. MSC) may receive a call setup request, and in turn request call processing instructions from a network controlling element (e.g. SCP/SCF) that may rely on one or more additional devices/systems (e.g. OCS) to determine various aspects of the call, including a decision to proceed with the call.

SUMMARY OF DESCRIBED SUBJECT MATTER

In some embodiments, the present disclosure provides various exemplary technically improved methods, one method may include, without limitation, at least steps of: receiving, by a processor of a computing device, via an application program and a communications network, at least one application program instruction to display an access controller interface element and an access code on a screen of the computing device; where the access controller interface element is: communicatively coupled to a cellular network hosted access controlling schema and operationally linked to an access-restricted digital resource; executing, by the processor of the computing device, the at least one application program instruction to display the access controller interface element and the access code on the screen of the computing device; detecting, by the processor of the computing device, at least one activity associated with the access controller interface element; transmitting, by the processor of the computing device, based on the detecting of the at least one activity, an access request having data that includes at least: the access code and an identity linked to the computing device; where at least one part of the data is configured to be accepted by the cellular network hosted access controlling schema; receiving, by the processor of the computing device, in response to the transmitting the access request and via the application program, at least one access program instruction to unlock the access-restricted digital resource for accessing via the computing device; where the receiving the at least one access program instruction to unlock the access-restricted digital resource is after the at least one part of the data has been accepted by the cellular network hosted access controlling schema; and executing, by the processor of the computing device, the at least one access program instruction to unlock the access-restricted digital resource for accessing via the computing device.

In some embodiments, the transmitting the access request may be in accordance with at least one of: a mobile originating cellular communications protocol or a communications protocol of a transmission control protocol/Internet protocol (TCP/IP) suite.

In some embodiments, one exemplary method of the present disclosure may further include requesting, by the processor of the computing device, via the application program, the at least one application program instruction.

In some embodiments, the access-restricted digital resource may include at least one of: an access-restricted internet content or an access-restricted internet service.

In some embodiments, the identity may be: a cellular identity or derived from the cellular identity; and where the cellular identity identifies: a cellular device that may be programmatically associated with the computing device or the computing device that may be a cellular service-enabled device.

In some embodiments, the cellular identity may be one of: an International Mobile Subscriber Identity (IMSI), a cryptographically hashed IMSI, a Mobile Station International Subscriber Directory Number (MSISDN), or a cryptographically hashed MSISDN.

In some embodiments, the at least one access program instruction may include a universal resource locator (URL), referencing an Internet address of the access-restricted digital resource.

In some embodiments, the at least one application program instruction may include at least one of at least one JavaScript instruction, at least one HTML instruction, or at least one CSS instruction, to control an appearance, at least one functionality, or both, of the access controller interface element.

In some embodiments, the access request may include symbolically prefixed address signals specifying the access code. In some embodiments, the cellular network hosted access controlling schema is configured to accept the at least one part of the data as an access charge to be applied to a cellular account associated with the identity.

In some embodiments, one exemplary method of the present disclosure may further include executing, by the processor of the computing device, the at least one application program instruction to display the access code: on the access controller interface element or in a visual vicinity of the access controller interface element.

In some embodiments, the mobile originating cellular communications protocol may be one of: a Telephony call setup request, a Short Message Service request, or an Unstructured Supplementary Services Data request.

In some embodiments, the present disclosure provides various exemplary technically improved methods, one method may include, without limitation, at least steps of: transmitting, by a processor of an access control server, via an application program and a communications network, to a computing device, at least one application program instruction to display an access controller interface element and an access code on a screen of the computing device; where the access controller interface element is: communicatively coupled to a cellular network hosted access controlling schema and operationally linked to an access-restricted digital resource, restricted from being accessed via the computing device; receiving, by the processor of the access control server, an access request based on at least one activity associated with the access controller interface element; where the access request having data that includes: the access code and an identity linked to the computing device; querying, by the processor of the access control server, based on at least one part of the data, the cellular network hosted access controlling schema for an affirmative access permission indication; where the at least one part of the data is configured to be accepted by the cellular network hosted access controlling schema; and transmitting, by the processor of the access control server, to the computing device, based on the affirmative access permission indication and via the application program at least one access program instruction to unlock the access-restricted digital resource for accessing via the computing device.

In some embodiments, the present disclosure provides various exemplary technically improved methods, one method may include, without limitation, at least steps of: transmitting, by a processor of an access control server, via an application program and a communications network, to a cellular device, at least one application program instruction to display an access controller interface element and an access code on a screen of the cellular device; where the access controller interface element is: communicatively coupled to a cellular network hosted access controlling schema and operationally linked to an access-restricted digital resource, restricted from being accessed via the cellular device; receiving, by the processor of the access control server, an access request based on at least one activity associated with the access controller interface element; where the access request having data that includes: the access code and a cellular identity linked to the cellular device; receiving, by the access control server, from the cellular network hosted access controlling schema, responsive to receiving, processing and accepting a series of mobile originated address signals (the at least one part of the data) as disclosed herein, emitted from the cellular device associated with the cellular identity, an affirmative access permission indication; and transmitting, by the processor of the access control server, to the cellular device, based on the affirmative access permission indication and via the application program, at least one access program instruction to unlock the access-restricted digital resource for accessing via the cellular device.

In some embodiments, the receiving the access request may be in accordance with at least one of: a mobile originating cellular communications protocol or a communications protocol of a transmission control protocol/Internet protocol (TCP/IP) suite.

In some embodiments, the affirmative access permission indication may specify that the access charge has been applied to a cellular account associated with the identity.

In some embodiments, the at least one application program instruction may further instruct the computing device to: specify the access code as symbolically prefixed address signals of the access request and utilize a mobile originating cellular communications protocol to transmit the access request to the cellular access controlling schema.

In some embodiments, the present disclosure provides various exemplary technically improved computing devices, one computing device may include, without limitation, at least the following components: at least one processor in communication with a non-transitory computer readable medium storing at least one first application program instruction; where the at least one first application program instruction, when executed, cause the at least one processor to: receive at least one second application program instruction to display an access controller interface element and an access code on a screen of the computing device; where the access controller interface element is: communicatively coupled to a cellular network hosted access controlling schema and operationally linked to an access-restricted digital resource, restricted from being accessed via the computing device; execute the at least one second programming instruction to display the access controller interface element and the access code on the screen of the computing device; detect at least one activity associated with the access controller interface element; transmit, based on the detecting of the at least one activity, an access request having data that includes: the access code and a cellular identity linked to the computing device; wherein at least one part of the data is configured to be accepted by the cellular network hosted access controlling schema; receive, in response to the access request, at least one access program instruction to unlock the access-restricted digital resource for accessing via the computing device; where the receiving the at least one access program instruction to unlock the access-restricted digital resource is after the at least one part of the data has been accepted by the cellular network hosted access controlling schema; and execute the at least one access program instruction to unlock the access-restricted digital resource for accessing via the computing device.

In some embodiments, the computing device may be further configured to transmit the access request in accordance with at least one of: a mobile originating cellular communications protocol or a communications protocol of a transmission control protocol/Internet protocol (TCP/IP) suite.

In some embodiments, the access-restricted digital resource may include at least one of: an access-restricted internet content, or an access-restricted internet service.

In some embodiments, the identity may be: a cellular identity or derived from the cellular identity; and where the cellular identity identifies: a cellular device that may be programmatically associated with the computing device or the computing device that may be a cellular service-enabled device.

In some embodiments, the cellular identity may be one of: an International Mobile Subscriber Identity (IMSI), a cryptographically hashed IMSI, a Mobile Station International Subscriber Directory Number (MSISDN), or a cryptographically hashed MSISDN.

In some embodiments, the cellular network hosted access controlling schema is configured to accept the at least one part of the data as an access charge to be applied to a cellular account associated with the identity.

In some embodiments, the at least one second application program instruction may further instruct the computing device to display the access code: on the access controller interface element or in a visual vicinity of the access controller interface element.

In some embodiments, the present disclosure provides various exemplary technically improved methods, one method may include, without limitation, at least steps of: recording, by an access controlling platform, an expectation data record as an access control mechanism to access an access-restricted digital resource, the expectation data record including: an access code and an identity linked to a computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; receiving, by the access controlling platform, while the access controller interface element is displayed, a mobile originating communication having data that includes: the access code and the identity; performing, by the access controlling platform, a confirmation of the expectation data record with the mobile originating communication; when the confirmation is successful: instructing, by the access controlling platform, based on at least one part of the data, the cellular communications network to perform at least one action with the cellular network hosted access controlling schema to generate a session record associated with the identity; and authorizing, by the access controlling platform, the computing device to unlock the access-restricted digital resource for accessing via the computing device.

In some embodiments, the present disclosure provides various exemplary technically improved methods, one method may include, without limitation, at least steps of: receiving, by an access controlling platform, from a computing device, an expectation data record as an access control mechanism to access an access-restricted digital resource, the expectation data record including: an access code and an identity linked to the computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; receiving, by the access controlling platform, while the access controller interface element is displayed, a mobile originating communication having data that includes: the access code and the identity; performing, by the access controlling platform, a confirmation of the expectation data record with the mobile originating communication; when the confirmation is successful: instructing, by the access controlling platform, based on at least one part of the data, the cellular communications network to perform at least one action with the cellular network hosted access controlling schema to generate a session record associated with the identity; and authorizing, by the access controlling platform, the computing device to unlock the access-restricted digital resource for accessing via the computing device.

In some embodiments, the present disclosure provides various exemplary technically improved systems, one system may include, without limitation: at least one processor of an access controlling platform; where the at least one processor is in communication with a non-transitory computer readable medium storing software instructions that, when being executed by the at least one processor, instruct the access controlling platform to: record an expectation data record as an access control mechanism to access an access-restricted digital resource, the expectation data record including: an access code and an identity linked to a computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; receive, via the cellular network hosted access controlling schema and while the access controller interface element is displayed, a mobile originating communication having data that includes: the access code and the identity; perform a confirmation of the expectation data record with the mobile originating communication; when the confirmation is successful: instruct the cellular communications network to perform, based on at least one part of the data, at least one action with the cellular network hosted access controlling schema to generate a session record associated with the identity; and authorize the computing device to unlock the access-restricted digital resource for the accessing via the computing device.

In some embodiments, the present disclosure provides various exemplary technically improved systems, one system may include, without limitation: at least one processor of an access controlling platform; where the at least one processor is in communication with a non-transitory computer readable medium storing software instructions that, when being executed by the at least one processor, instruct the access controlling platform to: receive, from a computing device, an expectation data record as an access control mechanism to access an access-restricted digital resource, the expectation data record including: an access code and an identity linked to the computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; receive, via the cellular network hosted access controlling schema and while the access controller interface element is displayed, a mobile originating communication having data that includes: the access code and the identity; perform a confirmation of the expectation data record with the mobile originating communication; when the confirmation is successful: instruct the cellular communications network to perform, based on at least one part of the data, at least one action with the cellular network hosted access controlling schema to generate a session record associated with the identity; and authorize the computing device to unlock the access-restricted digital resource for the accessing via the computing device.

In some embodiments, the mobile originating communication may be a telephone call; and the instructing, by the access controlling platform, the cellular communications network to perform at least one action may further include: instructing, by the access controlling platform, the cellular communications network to: answer the telephone call and release the telephone call momentarily thereafter, once sufficient time passes to generate the session record associated with the identity. In some embodiments, the sufficient time is less than 1 second.

In some embodiments, the identity may be: a cellular identity or derived from the cellular identity; and where the cellular identity identifies: a cellular device that is programmatically associated with the computing device or the computing device that is a cellular service-enabled device. In some embodiments, the cellular identity may be one of: an International Mobile Subscriber Identity (IMSI) or a Mobile Station International Subscriber Directory Number (MSISDN).

In some embodiments, the access-restricted digital resource may include at least one of: an access-restricted internet content or an access-restricted internet service.

In some embodiments, the mobile originating communication may be in accordance with a mobile originating cellular communications protocol.

In some embodiments, the mobile originating cellular communications protocol may be one of: a Telephone call setup request, a Short Message Service request, or an Unstructured Supplementary Services Data request.

In some embodiments, the mobile originating communication may include symbolically prefixed address signals specifying the access code.

In some embodiments, the cellular network hosted access controlling schema is configured to accept the at least one part of the data for generating the session record in a cellular account associated with the identity.

In some embodiments, the session record may include an access charge for accessing the access-restricted digital resource via the computing device.

In some embodiments, one exemplary method may further include transmitting, by the access controlling platform to the computing device, prior to the receiving the expectation data record, at least one application program instruction to display the access controller interface element and the access code on the screen of the computing device. In some embodiments, the at least one application program instruction may further instruct the computing device to display the access code: on the access controller interface element or in a visual vicinity of the access controller interface element.

In some embodiments, the authorizing the computing device to unlock the access-restricted digital resource for accessing via the computing device may further include transmitting, by the access controlling platform to the computing device, based on the confirmation, at least one access program instruction to unlock the access-restricted digital resource for accessing via the computing device. In some embodiments, the at least one access program instruction may include a universal resource locator (URL), referencing an Internet address of the access-restricted digital resource.

In some embodiments, the performing of the confirmation may further include confirming, by the access controlling platform, that the expectation data record and the mobile originating communication have been received within a predetermined time period from each other.

In some embodiments, software instructions, when being executed by the at least one processor, may further instruct the access controlling platform to transmit to the computing device, prior to the receiving the expectation data record, at least one application program instruction to display the access code on the access controller interface element.

In some embodiments, software instructions, when being executed by the at least one processor, may further instruct the access controlling platform to transmit to the computing device, based on the confirmation, at least one access program instruction to unlock the access-restricted digital resource for accessing via the computing device.

In some embodiments, software instructions, when being executed by the at least one processor, may further instruct the access controlling platform to confirm that the expectation data record and the mobile originating communication have been received within a predetermined time period from each other.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 8 is a Manual Selection (Prior Art).

FIG. 9 is an illustrative non-restrictive example of an Automatic Selection in accordance with at least some embodiments of the present disclosure.

FIG. 15C is an illustrative non-restrictive example of a telephony and a natural binary encoded address schema, in accordance with at least some embodiments of the present disclosure.

DETAILED DESCRIPTION

Figure 1:
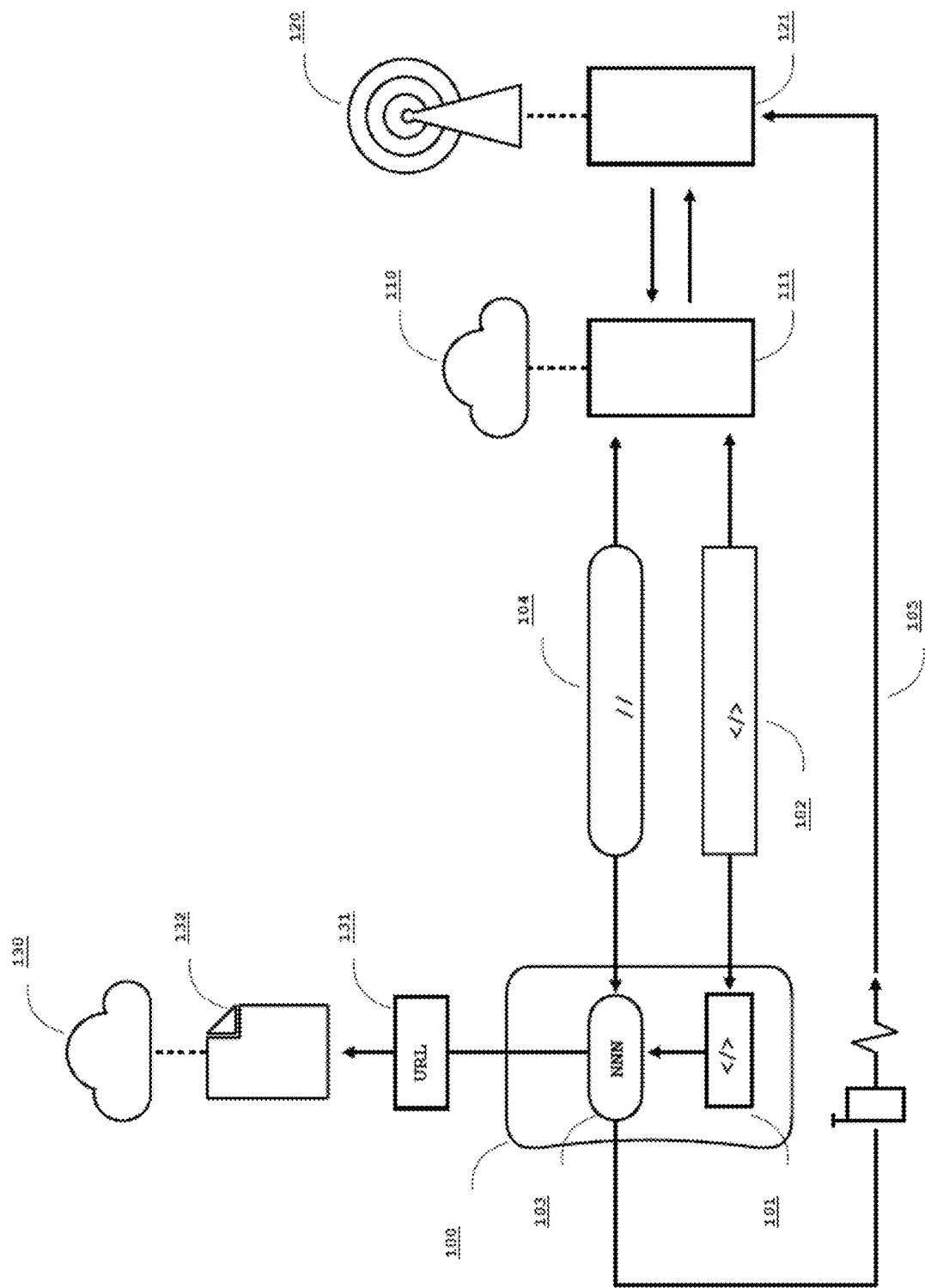
FIG. 1 is an illustrative non-restrictive example of a remote controlled access schema in accordance with at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Some Illustrative Non-Limiting Technological Problems being Addressed Herein

One technological problem being addressed in the present disclosure is that user on-line experience is being subject to digital content (e.g. digital advertising) that has become increasingly invasive, interruptive, and universally detested. For example, some content providers purposely irritate online users with copious amounts of digital advertisements only to then to extort monthly payments from only users for software solutions that purport to free the online users from the very spam that providers of digital content have created.

Another technological problem being addressed in the present disclosure is that while many internet browsers (application programs) may offer digital ad blocking technology to suppress online advertising, some browser creators themselves may be conflicted since in suppressing unwanted digital content (e.g. digital adverts), browser creators may obfuscate and/or make it difficult for the online users to configure internet browsers to reduce and/or remove tracking of users' online activities and to obtain the same online experience without giving up their online privacy.

Yet another technological problem being addressed in the present disclosure is that digital advertisements may also innocently present themselves as "sponsored content," yet often take the form of "clickbait", images and/or links that look like they would lead to a newsworthy story and/or interesting video, when various online technologies in fact may allow unscrupulous actors to cleverly design deceptive digital advertisements to extract and/or steal personal information and/or conduct ransomware attacks which may result in undermining users' trust in online publishing.

Yet another technological problem being addressed in the present disclosure is that online users may have a perception of a lack of online privacy and increase feelings of mistrust to digital technologies due to, for example without limitation, a frequency of large scale data security breaches that may have dramatically decreased the level of trust users have that their data and/or activities (e.g. electronic payment activities) would be protected by digital security measures/technologies utilized by unknown and/or known third parties.

Yet another technological problem being addressed in the present disclosure is that online technologies typically lack any capability to effectively execute single online transactions such as, without limitation, execute digital payments for Single Service Units (SSUs), such as, without limitation, single online articles of interest rather than entire online publications, single music tracks rather than entire albums, and similar others units of digital content, and/or digital services, and/or real services having a digital component, and/or any combination thereof.

Yet another technological problem being addressed in the present disclosure is that the online experiences still currently lack micro commerce capabilities (e.g. digital transactions involving, for example without limitation, one or more minor units of one or more currencies that are defined by ISO 4217 standard published by International Organization for Standardization (e.g. one or more U.S. cents, etc.). For example, legacy bank switches which levy high transaction fees are not geared for micro billing.

For example, without limitation, the digital technologies related to Crypto Currencies also lack micro commerce capability. The technological problem of digital technologies related to Crypto Currencies being unable to execute micro commerce/payment/transaction capability that may be due to technological complexities in setting up and/or administering a Crypto Wallet which also typically requires users to be accountable for securing their digital keys, in addition to the complexities in actually transacting from such digital wallets due to, for example without limitation, computational intensity and/or digital resource demand (e.g. CPU/GPU processing power requirements, computer memory demand, electricity demand, etc.) involved in executing and/or recording digital transactions in Crypto Currencies.

Further, while the promise of Crypto is decentralization to democratize digital transactions (e.g. currency), the Crypto exchanges which facilitate trading, may be necessarily centralized and typically vulnerable to various cyberattacks. For example, it has been reported that one in three Crypto Exchanges have been hacked, resulting in the theft and loss of millions of crypto currency worth billions of dollars.

Yet another technological problem being addressed in the present disclosure is that the Crypto currencies may be more subject to the volatile swings in valuation and the potential for market manipulation by numerous bad actors utilizing various digital techniques which may translate in considerable real losses in fiat currencies.

Yet another technological problem being addressed in the present disclosure is that in accordance with the BCSM and control points/elements that may govern communication setup, progression and billing in a typical Intelligent Network (IN) (e.g. a network architecture specified in the ITU-T Q.1200 series recommendations), the typical IN is limited since the typical IN only applies a communication tariff on a pro-rata basis when the communication is a telephony call, where the total charge is calculated on the total call duration (e.g. a number of seconds or minutes consumed). In one case of such typical IN, billing and/or controlling elements is programmed to provide subsequent quotas as the call continues past an initial quota. Alternatively, in another case of such typical IN, the initial quota may also be the final quota, which once exhausted may result in the call being disconnected (released). For example, on determining that credit sufficiency exists in accordance with the BCSM and based on the tariff associated with a requested call destination, identified by the address signals (e.g. called party number (CdPN)), a processing element (e.g. billing element/system) of the typical IN may then respond to the controlling element with an Initial Service Quota (e.g. a maximum permitted call duration) and an instruction to CONTINUE switching and routing the call toward the destination.

Furthermore, in case of the typical IN, the controlling elements may arm certain Trigger Detection Points (TDP) that may be encountered during communication progression, in order to be alerted, for example, without limitation, arming a TDP-R (TDP armed as Request), which when encountered suspends a communication processing awaiting further instruction from the controlling element, or to be notified, for example arming a TDP-N (TDP armed as Notification), which simply notifies the controlling element when the event is encountered. In one embodiment, these trigger detection points may be statically armed and set in the subscriber profile (e.g. in the O-CSI).

In one embodiment, a typical controlling element of the typical IN may issue a Request Report BCSM Event (RRBE) to be notified when the originating call is answered (DP O_Answer), and when the call is released (DP O_Disconnect) in order to control and/or monitor the call, and thus control billing in substantially real-time, and to compute the total charge to be applied based on the call duration. Further, controlling and/or billing elements of the typical IN may be programmed to instruct the typical switching element to execute Apply Charging (ACH) function(s), where the typical switching element starts or continues to monitor the call duration, and when the initial quota is exhausted or when the call is released, the switching element may then furnish the typical controlling element with an Apply Charging Report (ACR). On receiving the ACR the typical controlling and/or billing element(s) may then compute the total charge, based on the call tariff, that is to be applied for the call by processing and generating a CDR (Call Data Record).

Consequently, yet another technological problem being addressed in the present disclosure is that there is a lack of a technological solution that would allow a cellular device (e.g. a smartphone) to signal to an operator of a cellular network (e.g. a typical IN billing element) a tariff to be applied to a call or service, and thereby control/cause a process of recording/generating/applying a charge (e.g. CDR) in an electronic data record associated with the cellular device.

Yet another technological problem being addressed in the present disclosure is that there is a lack of a mechanism to automatically recall and/or reverse a transaction once it has been submitted.

Yet another technological problem being addressed in the present disclosure is that many users may be entrapped into recurring subscriptions to services they did not intend to subscribe for, and/or did not understand subscription implication or terms, because, for example, without limitations, terms of services were not clearly presented and/or articulated, via a Premium Short Message Service (PSMS) communications since such communications are not technically indicative of the resultant tariff and charge to be applied. For example, for the typical IN network to apply a differentiated billing tariff, the typical IN network would need to utilize an alternate bearer and service, such as PSMS, where assigning a short address code to the messaging service which may then be associated and utilized to apply a different tariff, typically a premium rate, to users utilizing the messaging service. However, such Premium SMS (PSMS) rated billing element of the typical IN is not programmed to recognize short codes themselves as enumerating and being triggers indicative of the resultant tariff and charge to be applied. Consequently, one of technological shortcomings of PSMS rated billing element of the typical IN is a need for metadata, transported in an SMS body, in order to communicate to users what tariff is to be applied to the selected service. Typically, such metadata may be deficient in informing users. Moreover, another technological shortcoming of the typical PSMS model is that the desired tariff and charge to be applied is not being communicated from the cellular device associated with the user/consumer but by a third party PSMS platform provider that instructs the operator's IN billing system what charge to apply based on the service that is being requested, placing billing out of the user's control.

Yet another technological problem being addressed in the present disclosure is that the internet-originated cellular billing, such as, without limitation, Direct Carrier Billing (DCB) may permit third-party charges for digital content and services to be levied against a cellular account without control and transparency afforded to the user and without being originated from the cellular device associated with the user. DCB, for example, may be considered as an Internet backdoor to the Carrier Billing System permitting transactions that may thus be described as Internet Originated (IO) billing. For example, DCB authenticates cellular devices using a two-factor authentication (2FA) method such as 2FA SMS that may send a One Time Passcode (OTP) over a cellular network that is then required to be resubmitted by the user/customer via the internet connection back to the access control platform to verify an identify of the cellular device (e.g. MSISDN). While on the surface 2FA appears to offer additional layer(s) of security, as described herein, the use of 2FA may create a number of technological shortcomings by, for example, introducing additional steps and/or clicks (e.g. six (6) additional clicks required to process a single 2FA, including, without limitation: opening the SMS, entering the four (4) digits or more of the OTP into the Internet application (IAPP) and clicking submit). Further, additional technological shortcoming associated with the 2FA SMS is the use of the SS7 messaging network that may have inherent security vulnerabilities. For example, the SS7 signaling network may permit malicious actors with access to an SS7 peering point, to redirect and/or intercept these mobile terminating signals carrying authorization codes. Such security shortcomings associated with utilizing 2FA over the SS7 signaling network may typically be caused by a condition where the source of SS7 messages is not authenticated and critical network controlling messages may thus be injected into the SS7 network from entities masquerading as cellular devices (e.g. mobile phones) and/or switching and controlling elements. For example, a malicious actor may simply inject and thereby fake a cellular device's location update (or similarly overwrite subscriber profile information in an HLR, etc.), hijacking the cellular routing to surreptitiously intercept phone calls and/or SMSs.

For example, Man-In-The-Middle (MITM) attacks have led the US National Institute of Standards and Technology (NIST) to reverse their recommendation and support for such 2FA services. Thus, in at least some instances, while purporting to increase security, cellular 2FA may compromise security, given that anyone with sufficient knowledge in exploiting the SS7 vulnerabilities, may be able to present another person's MSISDN (MSISDN of a computing device (e.g., mobile phone, etc.) associated with another person), intercept the authentication code(s), and illegally transact on the now compromised (hijacked) cellular account.

Further, in at least some instances, while cellular operators/carriers may be able to probe their network traffic to extract the device identity of the cellular device, for example, by inspecting a cellular data source IP (Internet Protocol) address and correlating cellular data session identifier(s) with cellular device ownership and identity data (e.g. the MSISDN), being stored by network element(s), at least one technical shortcoming of such approach is due to a requirement on the part of the user to be connected to the Internet over the Mobile Packet Backbone Network (MPBN), using cellular packet data bearers which would be not available to those who use WIFI connections, where originating source traffic would not necessarily transit the cellular network and/or uniquely identify the transmitting cellular device.

Figure 10:
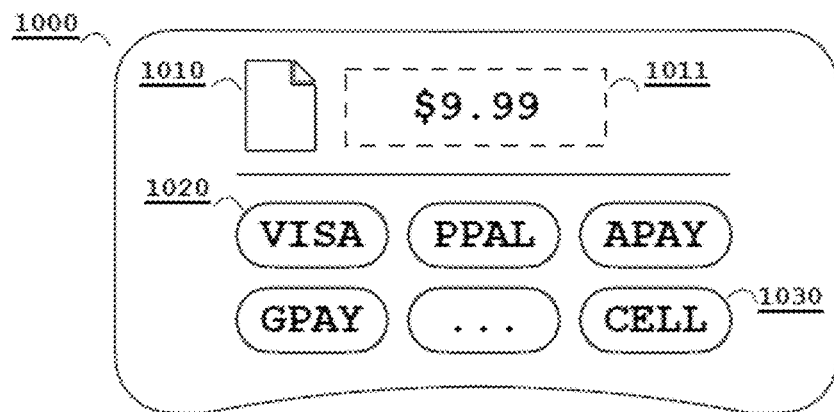
FIG. 10 is a Plurality of Action Methods (Prior Art).

For example, in at least some instance, an additional technological shortcoming being recognized herein is that once the cellular device is authenticated, DCB would be typically conducted using Premium Rate SMS communications (PSMS) which may be also vulnerable to abuse (e.g. security breaches, vishing attacks, etc.). For example, when the user selects an option to pay by cell phone (e.g. see FIG. 10), the DCB platform would typically send an SMS, originating from a Premium Rate Short Code Address (the address of the DCB messaging platform), to the cellular device of the user/consumer. Typically, the SMS would contain a transaction price in the SMS message body that would be programmed to request a recipient (e.g. the consumer) to reply in the affirmative (e.g. "Y") to confirm the transaction.

Moreover, an additional technological shortcoming being recognized herein is that when DCB platform receives the SMS reply confirmation, the DCB platform may not reliably determine that the SMS reply confirmation would have been sent from the cellular device, and the acceptance and trust by DCB platform that the SMS reply confirmation came from the cellular device and, thus, is representative of the consumer's explicit permission to complete the transaction, may be misplaced since the SMS reply confirmation itself may be compromised by trojans (malware) that intercept and respond in the background without alerting the consumer/user. On receiving an SMS reply confirmation to the PSMS, the DCB Platform may complete the access action by instructing a billing element of a cellular operator/carrier (e.g. Carrier Billing System) to, for example, without limitations, debit the transaction amount from a pre-paid cellular account associated with the user's cellular device or charge the transaction amount to cellular account associated with the user's cellular device. As detailed herein, at least some technological shortcomings are being addressed herein are due to a multitude of security vulnerabilities associated with one or more of the following steps of the typical DCB process:

1) The user must manually select a cellular billing as the payment method;
2) The user must manually enter their cellular phone number (e.g. MSIDN);
3) The user must await a 2FA SMS code on their cell phone to verify their MSISDN;
4) The user must switch application context to open the SMS received and memorize the onetime passcode (OTP) contained therein;
5) The user must recall and manually reenter the OTP into the internet service application screen;
6) The user must then await a PSMS to accept the transaction price;
7) The user must manually reply to confirm the PSMS transaction amount; and
8) The user may only then consume the content or access the service.

For example, even in a case when the carrier network may utilize the packet probing to authenticate the cellular identity, the process would still utilize 2FA which would still result a cellular billing transactional sequence that may include over twenty (20) manual keystrokes and clicks. Even once the cellular device has been authenticated, subsequent DCB transactions may still require, at minimum, 6 or more manual user driven inputs. Further, the above steps 6 and 7 in DCB protocols are typically mandated to meet regulatory requirements governing user opt-in and purchase confirmation, when selecting payments for third party content and services directed to their cellular account.

Moreover, yet another technological shortcoming is that since the only detailed record of the transaction is the Internet Originated SMS body's messaging content which the cellular carrier does not typically store and/or report in itemized billing (e.g. account record), and given that the SMS reply confirmation may be unauthorized (e.g. hijacked by a bad actor) and does not encapsulate and carry the messaging content forward along the SMS transactional path (e.g. the DCB transaction record is transient and deficient), the typical IN of the cellular operator/carrier may be forced to rely on the third-party metadata. For example, the cellular account may simply itemize/describe the DCB transaction as an SMS incurring the said premium cost, without providing an authoritative and irrevocable cellular data record capturing the transaction amount as confirmed by the user at the time of the purchase. In at least in some instances, such incomplete billing record may result in many contested DCB transactions that would be recorded in the cellular accounts. Thus, being under 3rd party billing control, DCB is inherently vulnerable, requiring extensive fraud detection and prevention measures. Further, such security measures are typically predicated on users auditing their billing statements and reporting suspicious transactions.

Consequently, many fraudulent DCB deductions go undetected and unreported costing the consumer untold billions in unauthorized transactions, where relatively small amounts go undetected, affecting millions upon millions of unsuspecting online users in a practice known as "skimming".

Yet another technological shortcoming is that digital content publishers who wish to monetize their content may seek to entice their users into a recurring weekly, monthly or yearly subscriptions, since charging for any shorter subscription period, for any less quantum of content, typically is not technically beneficial for online content provider since it may require more complex technical setup and maintenance of electronic/digital resources, including access-restricted electronic/digital resources with an associated fixed cost that would make it prohibitive to operate electronic access on per SSU-basis, and prohibitive for a user/consumer/entity that does not have technological sophistication and/or is unable to build a required technological architecture. For example, individual and small entity content creators are typically forced to funnel their work through content curators and aggregators, who, in one music streaming service, may pay composers a pittance amounting to $0.00001 ($1000^{th}$ of a penny) per track.

Yet another technological shortcoming of the digital subscription technology is that paywalls' of digital subscription would typically have single digit conversions due to lacking sufficient technology-driven interactive experiences to convert and retain users (just 5% subscribe, according to a survey conducted by Digiday™). Thus, subscription based services are heavily skewed in favor of larger national and multinational news outlets and content producers, given their large base, further undermining the democratization of digital publishing.

Yet another example, a long felt, over at least the past three decades, but unsolved need for a technological development related to the present disclosure is identified, without limitations, by *Micropayments, Abridged* (Ryan Shea, medium.com/radartech/micropayments-abridged-2f110302677c): "A functional micropayments system, enabling instant, miniscule transactions under one US dollar, is widely regarded as the holy grail of web monetization. . . . In the past, fundamental issues pertaining to usability, psychology, and economics were neglected. These issues must be solved for micropayments to succeed."

Yet another example, a long felt, over at least the past three decades, but unsolved need for a technological development related to the present disclosure is identified, without limitations, by *The Babbage of the web* (Ted Nelson, The Economist, Dec. 7,2000): " . . . [H]e hoped, [there] would be a democratization of publishing, because readers would pay only for what they read, and authors of the most popular documents would be rewarded accordingly."

Yet another example, a long felt, over at least the past three decades, but unsolved need for a technological development related to the present disclosure is identified, without limitations, by *Peppercoin Micropayments* (Ronald L. Rivest, Proceedings Financial Cryptography, 2004): "We view the introduction of efficient micropayments into the world of internet e-commerce as potentially as significant as the invention of metal coins by the Lydians in 640 B.C.".

Yet another example, a long felt, over at least the past three decades, but unsolved need for a technological development related to the present disclosure is identified, without limitations, by *Shouldn't We All Have Seamless Micropayments By Now?* (Alvaro Dominguez, wired.com/story/shouldnt-we-all-have-seamless-micropayments-by-now/): "The web's founders fully expected some form of digital payment to be integral to its functioning. But nearly three decades later, we're still waiting. . . . In the absence of a digital-native micropayment system Content creators have to rely on advertising to support themselves. This, too, is a losing game for all but the biggest players. Even the apparent winners of the digital ad economy-Facebook and YouTube—must operate at vast scale, engage in copious surveillance, and subject their systems to minimal human oversight to make ad financing work. Content creators are left chasing eyeballs and fractions of ad dollars on these giant platforms, whose business model favors virality, misinformation, and outrage. . . . As if all that weren't bad enough, intrusive and bloated layers of ad tech slow down the internet and serve as potential vectors for malware. Plus, the online ad business is rife with click fraud; the whole thing may be a house of cards".

Some Illustrative Non-Limiting Technological Solutions Described Herein

As detailed herein, at least some embodiments of the present disclosure are directed to one or more technological solutions that are designed to address one or more of technological problems identified herein by utilizing specifically programmed elements of cellular networks, such as controlling and/or billing elements. In some embodiments, controlling and billing routines may be programmed to be performed by the same element of the IN.

For example, as discussed herein, one technological shortcoming of a typical IN is that an operator/carrier could only apply a single published tariff to a single class of calls, for example, without limitations, a tariff for international calls by country, a tariff for national calls, a tariff for on/off net national calls, a tariff for fixed line terminating calls, a tariff for mobile terminating calls etc., such tariffs which themselves may be further differentiated, for example, by a user/customer's service agreement, profile, or by the time of day etc.). Moreover, another technological shortcoming of typical IN is that, where unlimited calls may be provided for certain call classes in return for a fixed subscription fee, calls may be metered without necessarily attracting additional charges.

As detailed herein, at least some embodiments of the present disclosure are directed to one or more technological solutions that are designed to address one or more of technological problems identified herein by utilizing one or more elements of cellular networks that may be specifically programmed to overcome, for example, without limitations, the technical shortcoming of utilizing a single published tariff to a single class of calls, by permitting a plurality of billing tariffs to be applied to a single class of call, for example, a plurality of tariffs for star calls (calls that are prefixed with a star symbol). In one embodiment, this plurality of tariffs is accomplished by pre-populating a rating table, stored in non-transitory memory of the specifically programmed element of a particular cellular network (e.g. IN), with amounts that directly map and match the symbolically prefixed address signals, which enumerate and encapsulate the desired billing tariff. In such an embodiment, a discrete (fixed) number of rating table entries may be populated to define a desired set of tariffs, as tabulated and described, for example, without limitations, in FIG. 15B.

As detailed herein, at least some embodiments of the present disclosure are directed to one or more technological solutions that are designed to address one or more of technological problems identified herein by utilizing one or more elements of cellular networks (e.g. operators' billing system and rating engine) that may be specifically programmed to support the present signaling disclosures, in order to dynamically determine the applicable tariff computationally, for example, without limitations, by parsing the symbolically prefixed address signals into an integer format which then equates to the monetary suitable and applicable billing charge (e.g. as applied to the CDR). For example, transforming an address signal string "*NNN" into an integer format of "NNN", equating for example to, a billing charge of NNN cents (¢) that would be recorded in the user's cellular account data record. In some embodiments, the computation may include a first step of extracting a fixed number of characters (e.g. three in an NNN signaling format) from the address signals string into a substring enumerating the billing charge, in order to compute the integer value and monetary suitable, as described, for example, below with reference to FIG. 15B.

For example, before the present disclosure, if a user of a cellular device were to dial on a keypad, for example, "*009", the user would hear an error voice message such as "We are unable to complete the call.", since the operator would lack the requisite billing intelligence and routing modifications as disclosed herein. In contrast, As detailed herein, at least some embodiments of the present disclosure are directed to one or more technological solutions that are designed to capitalize on such a network exception (error) by reprogramming the network with new logic in order to successfully service and support such star calls, and thereby enable micro charges, directed by the mobile device, as disclosed herein. Such network error messages may be addressed, for example, without limitations, by programing one or more elements of cellular networks (e.g. controlling element(s) (e.g. SCP/SCF) of an IN, billing element(s) of an IN (e.g. OCS)) to process the sequence of "*009", recognizing (e.g. parsing out) "009" as a monetary suitable tariff, by example, nine (9) cents, and create or instruct to create a corresponding CDR in the amount of nine (9) cents to be applied to an account associated with the cellular device, and thereafter, route the communication to a servicing access control platform (e.g. Star Node or DCB of the present disclosure) in order to complete an associated internet transaction.

Notably, As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to apply the tariff in a unitary rather than a pro-rata fashion. That is, a fixed rather than a variable charge is applied as defined by the call tariff, regardless of the call duration.

As detailed herein, at least some embodiments of the present disclosure are directed to one or more technological solutions that are designed to address one or more of technological problems identified herein by utilizing, without limitation, a HOOK FLASH method which intentionally limits the call to a very short duration (e.g. one second), such a fixed charge billing protocol may be realized by programming to record the applicable charge as a per minute rather than a per second rating tariff.

Thus, in contrast to above detailed technological shortcomings associated with typical PSMS methods, at least some embodiments of the present disclosure are directed to one or more technological solutions that are designed to be transparent to users/consumers since the address signals (e.g. the dialed digits), equate directly to the tariff and billing charge to be recorded, in a one-to-one relationship (i.e., "what you dial is what you pay.").

As detailed herein, at least some embodiments of the present disclosure are directed to one or more technological solutions that are designed to address one or more of technological problems identified herein by utilizing one or more elements of cellular networks (e.g. IN controlling elements SCP/SCF and billing elements, OCS) that may be specifically programmed to execute micro payment service/charge/payment, by, for example, without limitations:
i) Restricting the maximum transaction amount,
ii) Removing additional payment confirmation step(s),
iii) Disallowing recurring subscriptions in favor of supporting only SSU, and
iv) Automatically switching micro payments to elements of cellular networks (e.g. cellular billing systems).

As detailed herein, at least some embodiments of the present disclosure are directed to one or more technological solutions that are designed to address one or more of technological problem of not being able to automatically reverse a transaction once it has been submitted by, for example, without limitations, creating the transparent and sustainable process with the sufficient transactional details in records of cellular carriers/operators to reduce or eliminate a burden of charge reversal on electronic payment processors based, at least in part, on practical, psychological and financial grounds, allowing to address and/or sidestep a hitherto unsolvable problem. For example, by restricting the maximum transaction to minor (micro) amounts, the systems and methods disclosed herein obviate the need to process reversals and refunds on such single service units (i.e., discrete) transactions, as they are perceived to be financially immaterial, and psychologically inconsequential.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to allow the cellular networks to leverage cellular telephony networks to conduct high frequency activities, for example, without limitation, micro billing on billions of existing mobile (e.g. cellular) wallets (e.g. digital account records at mobile communication companies/entities) holding trillions of dollars in digital airtime currency, to deliver seamless, frictionless, and trustworthy digital experiences that are related, without limitation, to, for example, online digital content and/or services. For example, As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to allow the cellular networks to provide micro commerce capability (e.g. digital transactions involving, for example without limitation, one or more minor units of one or more currencies that are defined by ISO 4217 standard (e.g. one or more U.S. cents, etc.).

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to leverage the cellular networks (Mobile Telephony Networks) for software licensing, by, for example, without limitation, allowing users to secure (e.g. purchase) application time, much as one currently secures (e.g. purchases) mobile (e.g. cellular) air time, to rent an application for a short period of time (e.g. few minutes, an hour, few hours, a day, few days, etc.) rather than paying a higher perpetual monthly license fee for infrequent use, and, thus, without limitation, allowing users to control precisely what, when and how much to consume, rather than being force fed unwanted digital advertisements and locked into recurring digital subscription surcharges.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to provide an enhanced sense of Privacy and/or Trust in digital online experiences/transactions/interactions to users, that their data is safe and their privacy is protected.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow processing transactions of micro monetary value (minor units of currencies) to perform low cost, highly scalable micro payment activities/transactions/interactions, switched directly in the dial stream.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow for micro billing to be executed during a short time duration (e.g. milliseconds) of Mobile Originating Signaling that is emitted during a call setup phase, which may follow a switching logic and one or more billing rules that may be defined by the Originating Basic Call State Model (OBCSM).

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow telephony calls to progress through a Basic Call State Model (BCSM), with standardized Points in Call (PICS) and Trigger Detection Points (TDP) and/or Initial Filter Criteria (IFC), and Service Trigger Points (STP), collectively defining sequential steps where a network logic of present description may be applied during an initial call setup and ongoing call state management. For example, without limitation, one or more communications protocols detailed herein may utilize a finite state machine feature of the BCSM and PICS to permit a switching element (e.g. MSC) configured as detailed herein, to interact with one or more controlling and billing elements of cellular networks (e.g. Intelligent Network Nodes as per ITU-T Q.1200 series recommendations (International Communication Union)), to notably perform/execute one or more of Authentication, Authorization, and/or Accounting (AAA) procedures, delivering billing verification, real-time account balance management and call progress monitoring as detailed herein.

In some embodiments, during one such billing verification step, the requested call may be paused to determine whether an account associated with the caller has sufficient credit to continue and complete the call. That is to determine whether the call can be permitted to advance and mature to ringing state and be answered. Similarly, one or more communications protocols detailed herein may involve one or more billing systems that utilize rating engines and/or tables, and Call Data Records (CDRS) which may record transactions and apply charges on a digital network.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow to quantify the monetary value, and thereby the billing, of a communication, by encapsulating the discrete charge itself in the address signals (e.g. digit for decimal digit) so that the dialed telephony address of a communication enumerates the actual cost of the communication and, consequently, the billing charge applied in a data record (e.g. database) of an operator/administrator/carrier associated with the cellular network.

In some embodiments, one or more novel communications protocols detailed herein are designed to configure/modify/utilize various components of cellular communications networks to allow to quantify the monetary value, and thereby the billing, of a communication, by encapsulating the tariff itself in a message (e.g. SMS) address signals (e.g. digit for decimal digit) so that the address of a communication, enumerates the actual cost of the communication.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and to uniquely map the dialed digits to the monetary suitable (e.g. on a rating table lookup), so as to deliver technological transparency to related activities by, for example, explicitly and emphatically highlighting the cost in the actual dialed digits.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to avoid a lack of transparency and trackability on the part of the user that may be caused by an ability of a third party platform to unilaterally pull funds from an account associated with a cellular user that would be associated with one or more technological problems discussed herein.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols such as, without limitations, the Mobile (Cellular) Originated HOOK FLASH signaling protocol disclosed herein, to overcome such cellular certification disintermediation and the resulting security vulnerabilities, by utilizing the AAA (Authentication, Authorization and Accounting) protocol in Mobile Originated (MO) telephony, entering the billing systems of a mobile (cellular) network transparently through the carriers' "front door, so to speak."

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to uniquely and securely capture the cost of the transaction in the address signals emitted by the cellular device, and, in accordance with one or more disclosed communications protocols, such as, without limitations, a HOOK FLASH transactional protocol, innately and authoritatively generate a native cellular billing certificate (CDR) to irrevocably capture and record the transactional data.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to and/or to instruct to transparently timestamp all transactions and record transactions consistent with, for example, without limitations, any other telephony call, displaying the dialed address together with the call duration and enumerated cost, substantially at the moment of the transaction, and which may be directly correlated with the cellular device call log (e.g. recent calls). For example, transactions administered in accordance with the present disclosure may result in the following itemized cellular phone bill entry as shown in Table 1:

TABLE 1

| Date Time | Dialed | Duration | Cost |
| --- | --- | --- | --- |
| Oct. 1, 2021 10:30:15 | *010 | 00:01 | $0.10 |

In some embodiments, the present disclosure considers that the typical credit card processing is based on two transactional states
1) Card Present and
2) Card Not Present.

For example, typically, the Card Present state typically describes more than just the physical presence of a credit card, in that a transaction is only considered to be "card-present" if electronic data is captured at the time of the transaction. Data may be captured, for example, by swiping a magnetic strip card, dipping an EMV (Europay™, MasterCard™ and Visa™) chip card, or tapping an NFC (Near Field Communication) or contactless digital wallet with a stored card in a smartphone (e.g. Apple Pay™).

For example, DCB in being Internet Originated, and in failing to capture the cellular transactional data audit trail, may be classified as being in "card-not-present" transaction state of a typical credit card payment processing. Typically, even if the customer physically presents the card at the time of the transaction, all payment methods are deemed "card-not-present" transactions when there is a deficiency in capturing electronic data when a credit card is present. Given the system vulnerabilities inherent in a card-not-present transaction, they cost more to process, at the fundamental level, to mitigate fraud.

As detailed herein, at least some embodiments of the present disclosure are directed to one or more technological solutions that are designed to address one or more of technological problems (e.g. DCB-based shortcomings) identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to utilize, for example, without limitations, the native and core billing pathway(s) applicable to cellular telephony calls that mature to answer, by employing, for example, without limitations, the disclosed HOOK FLASH (WINK) protocol that is securely underwritten and predicated on an active SIM card presence and internal data recording.

As detailed herein, at least some embodiments of the present disclosure are directed to one or more technological solutions that are designed to address one or more of current digital payment technological problems identified herein, by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to avoid a requirement for users/consumers to create and administer a digital wallet in order to transact, and they do not require a carrier/operator to expose their internal elements of the carrier's IN (e.g. Core Billing System) to external third parties (e.g. DCB platform providers), and thus preserving the integrity and/or security of the cellular wallet by uniquely and synchronously transacting internally, along the cellular telephony billing path.

As detailed herein, at least some embodiments of the present disclosure are directed to one or more technological solutions that are designed to address one or more of technological problems (e.g. DCB-based shortcomings) identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to provide fundamentally more secure and streamlined Mobile Originating (MO) authentication and transactional actions that may not require any manual data input by the user, and in containing payments to micro amounts (e.g. pennies rather than pounds) in order to automatically direct payments via cellular networks' elements (e.g. billing platforms). For example, in accordance with novel communications protocols and network architectures described herein, in some embodiments, a DCB access control platform of the present disclosure may be programmed, in accordance with one or more principles described herein, to address and meet mass market adoption and appeal, by for example, without limitations:

i) Restricting payments to a maximum micro threshold amount;

ii) Automatically selecting and presenting cellular billing as the single payment method;

iii) Forgoing highly contested recurring subscriptions for single service units, and iv) Removing additional verification and/or confirmation steps.

Further, in accordance with novel communications protocols and network architectures described herein, in some embodiments, the DCB access platform of the present disclosure may be programmed to perform in accordance with one or more principles described herein to go beyond gambling and gaming to facilitate payment for a broader market in mass content publishing and consumption. In some embodiments, restricting payment to micro amounts may also deftly sidestep regulatory spending restrictions and requirements, since now transactions may be limited to the realm of pocket change. And, further, in forgoing the vulnerabilities and the friction introduced by 2FA and multi-step PSMS confirmation, the re-programmed DCB platform in accordance with one or more principles of present disclosure may now offer a hitherto unattainable ubiquitous and exceptionally streamlined payment process. For example, without limitations, and as further detailed herein, in some embodiments, the re-programmed DCB platform in accordance with one or more principles of present disclosure may operate based on the following reduced instruction set and a simple sequence of events, transacted within a singular digital payment and interface channel (e.g. STAR BAND):

1. The user taps a cellular micro payment button displaying the purchase amount of an associated access-restricted content/service;
2. The cellular network (e.g. IN) determines the cellular device identity of the cellular device;
3. The DCB platform charges an account associated with the identified cellular device; and
4. The user instantly gets to access the product and/or service.

Further, in some embodiments, when the MPBN is not the active data bearer, resulting in the cellular network's inability to internally identify a cellular device, the IAPP may automatically engage, for example, without limitations, a Random Challenge system/engine to enable any network to seamlessly and securely identify the cellular device. For example, in at least some embodiments, a cellular device may have been previously identified and that the identity (e.g. MSISDN) or a unique derivative identity (e.g. a cryptographically hashed MSISDN) has been communicated to the IAPP.

In some embodiments, the exemplary inventive computer-based systems/platforms, the exemplary inventive computer-based devices, and/or the exemplary inventive computer-based components of the present disclosure may be configured to securely store and/or transmit data (e.g. identity, cellular identity, IMSI, MSISDN) by utilizing one or more of encryption techniques (e.g. private/public key pair, Triple Data Encryption Standard (3DES), block cipher algorithms (e.g. IDEA, RC2, RC5, CAST and Skipjack), cryptographic hash algorithms (e.g. MD5, RIPEMD-160, RTRO, SHA-1, SHA-2, Tiger (TTH), WHIRLPOOL, RNGs).

Figure 13A:
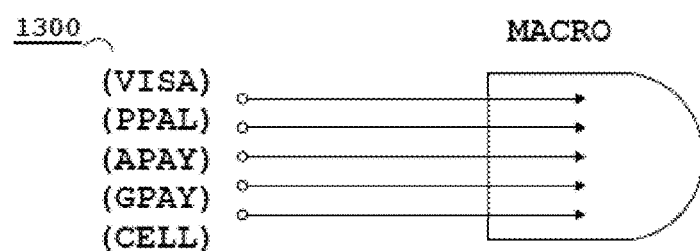
FIG. 13A is a Plurality of Action Methods (Prior Art).
Figure 13B:
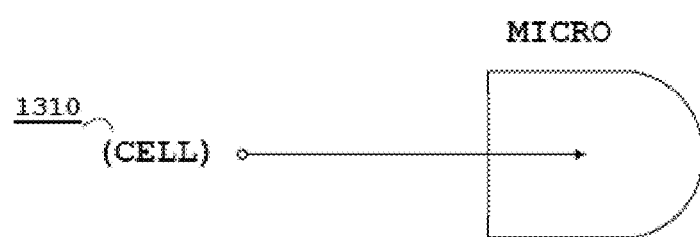
FIG. 13B is an illustrative non-restrictive example of a singularity nature of an Activity Channel in accordance with at least some embodiments of the present disclosure.

As detailed herein, at least some embodiments of the present disclosure are directed to one or more technological solutions that are designed to address one or more of technological problems identified herein (e.g. DCB-based shortcomings) by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow the streamlined and secure access action sequence (including micro billing) that may be initiated, conducted and completed based on just a single step (e.g. 1-tap of a button) of the user/consumer, without requiring any additional steps, and without requiring any manual data entry by the user/consumer, by establishing of a singular activity channel (e.g. a singular transaction channel (STAR BAND)) connecting on-line environment with element(s) of cellular network (e.g. IN), as for example illustrated, without limitations, in FIG. 13B.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to utilize existing, digital cellular wallets (e.g. prepaid cellular accounts, prepaid SIM cards, non-prepaid cellular accounts with credit allowance, etc.) and currency in the hands of billions of people, accessible via telephony address signals (e.g. telephony numbers). While such cellular telephony-linked digital wallets and their associated currencies, billing and payment arrangements have been limited to control how much network time and/or data each user/consumer is permitted to consume, in accordance with novel communications protocols and network architectures, at least some embodiments of the present disclosure uniquely utilize, based at least in part on address signals, the cellular networks' linked currency/billing/payment arrangements to support a singular action access channel that links an Internet-based environment, and/or a virtual-based environment and/or a physical environment with a communication environment of the cellular networks to seamlessly utilize the cellular networks' linked currency/billing/payment arrangements for accessing and/or consuming various products and/or services, including, without limitations, virtual products (e.g. Internet hosted content), virtual services (e.g. Internet hosted services); physical products, physical services, or any combination thereof.

As detailed herein, at least some embodiments of the present disclosure are directed to one or more technological solutions that are designed to address one or more of technological problems identified herein (e.g. a need for Digital Wallet Creation (and administration) which is a typical impediment to the mass adoption of online micro commerce) by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to seamlessly transact online using the existing digital cellular wallet.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow, without limitations, to:
1. Conduct a payment via a single phone call, lasting one (1) second or less, thus reshaping and repurposing the cellular networks;
2. Leverage scalable cellular networks with associated elements for instant/real-time micro billing;
3. Provide new ways to utilize existing cellular digital wallets, active for billions of cellular users;
4. Affect a movement of cellular currency over the ring, into the cloud and onto the internet, in milliseconds, at marginal signaling cost, for uniquely anticipated transactions only; and
5. Deliver a seamless, frictionless and gratifying user experiences based on the single action access channels.

As detailed herein, at least some embodiments of the present disclosure are directed to one or more technological solutions that are designed to address one or more of technological problems identified herein (e.g. DCB-based shortcomings) by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to conduct, without limitations, various processes disclosed herein without any external billing exposure to a carrier/operator of the cellular network, without requiring any additional financial instrument disclosure by users, and without requiring the users to utilize and/or participate in administering security elements, such as, in the form of cryptographic keys, transactional PIN codes, user names, or passwords.

As detailed herein, at least some embodiments of the present disclosure are directed to one or more technological solutions that are designed to address one or more of technological problems identified herein (e.g. DCB-based shortcomings) by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to utilize prepaid billing that may be, without limitations, in the form of Airtime vouchers of differing denominations that users/consumers may acquire either in retail stores or online, which are then loaded into their cellular wallet (account). In some embodiments, the prepaid cellular account may serve as a fiat backed digital currency. For example, users may be also permitted to send (gift) airtime directly from one wallet to another using cellular network services provided. For example, without limitations, as the user/consumer consumes cellular network's time and/or resources, the balance of a prepaid account associated with a corresponding cellular device depletes. In some embodiments, when the prepaid balance reaches zero, cellular network's services may be suspended until such time as the user/customer replenishes their account.

Typically, postpaid users would be credit worthy customers who typically settle their cellular network accounts at the end of their billing cycle (e.g. monthly). That is, whereas Prepaid customers pay before (PRE) consumption, postpaid customers pay after (POST) consuming cellular network resources and/or services. Typically, prepaid billing would be performed substantially in real-time for communications, whereas the postpaid billing would be typically billed in cycles. As detailed herein, in at least some embodiments, one or more technological solutions of the present disclosure are designed to utilize prepaid, postpaid, hybrid and blended cellular billing models.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to utilize, without limitations, marginal network signaling during call origination setup, resulting in costs for establishing the single action access channels with the cellular network's environment that may be minuscule and fixed, permitting the switching of very low denominations/minor units (e.g. pennies) such that the technological solutions of the present disclosure may be simple (e/g. a single click by the user) low cost (e.g. under 99 cents), secure (e.g. less vulnerable than PSMS over SS7 communications), fast (e.g. 1 second), and scalable (e.g. servicing billions of instant users/consumers).

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow for, without limitations, a digital content billing model that is a more granular Pay Per View (PPV), Single Service Unit (SSU), where the user/consumer only pays for discrete access and/or consumption of at least one of product (e.g. digital content, physical product) or service (e.g. digital service, service at a physical establishment). For example, paying for a single article, photograph, song, video or other creative works of art and digital services that they desire in the moment, rather than having to commit to recurring subscription fees.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to enable any Mobile Network Operator (MNO) of a cellular network to pivot, for example, without limitation, their legacy and analog telephony network into a transactional platform, utilizing single access channels to online and/or physical environments, utilizing marginal network signaling.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to enable to reduce Call Hold Time (CHT) to a mere second based at least in part on various HOOK FLASH signaling protocols described herein and increase Busy Hour Call Attempts (BHCA), the density of calls a network can sustain during a peak hour.

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to leverage (e.g. re-program) existing legacy cellular networks to address a typically perceived lack of a technologically successful micro access control platform, by utilizing the modern digital mobile phone and the Subscriber Identity Module (SIM) that uniquely identifies it, as without limitations, a wireless "credit/debit card."

As detailed herein, at least some embodiments of the present disclosure are directed to one or more technological solutions that are designed to address one or more of technological problems identified herein by utilizing one or more elements of cellular networks (e.g. controlling element(s) (e.g. SCP/SCF) of an IN, billing element(s) of an IN (e.g. OCS)) that may be specifically programmed to transform and/or operate cellular signals in accordance with novel communications protocols and network architectures so as to allow the user/consumer to utilize dialing the transaction amount from their mobile phone to digitally sign the transaction with a symbolic character (e.g. "*" key), thereby authorizing the payment.

Further, since at least some embodiments of the present disclosure operate via a singular access control channel that logically links and synchronizes the Cellular Signaling Channel with the Internet Data Channel (i.e., inline within the browser program or APP where the items for purchase are presented and consumed), and where the transactions may be described as occurring Out of Band or Above Band, and more pertinently, in the preferred signaling embodiment, in the STAR BAND.

Illustrative Terminology as Utilized in at Least Some Embodiments Described Herein Table 2 provides full descriptions of abbreviations that may appear in the present disclosure.

TABLE 2

| | |
|---|---|
| A-SBC | Access Session Border Controller |
| AAA | Authentication Authorization Accounting |
| ABMF | Account Balance Management Function |
| ACH | Apply Charging |
| ACK | Acknowledgment |
| ACM | Address Complete Message |
| ACR | Apply Charging Report |
| ANS | Answer |
| API | Application Programming Interface |
| APP | Application Program |
| AS | Application Server |
| B2BUA | Back To Back User Agent |
| BCD | Binary Coded Decimal |
| BGCF | Border Gateway Control Function |
| BHCA | Busy Hour Call Attempts |
| CAMEL | Customized Applications for Mobile network Enhanced Logic |
| CCA | Credit Control Answer |
| CCR | Credit Control Request |
| CDMA | Code Division Multiple Access |
| CDPA | CalleD Party Address |
| CDPN | CalleD Party Number |
| CDR | Call Data Record |
| CGPN | CallinG Party Number |
| CHT | Call Hold Time |
| CLI | Calling Line Identity |
| CLIP | Calling Line Identity Presentation |
| CLIR | Calling Line Identity Restriction |
| CPG | Call Progress |
| CSCF | Call Server Control Function |
| CSE | CAMEL Service Environment |
| CSI | CAMEL Subscription Information |
| CSS | Cascading Style Sheets |
| CTF | Charging Triggering Function |
| DCB | Direct Carrier Billing |
| DNS | Domain Name System |
| DOM | Document Object Model |
| DP | Detection Point |
| DP2 | Detection Point 2 |
| EDP-R | Event Detection Point Request |
| ESD | Exceptional Service Delivery |
| ESME | External Short Message Entity |
| FLASH | Momentary Connect and Disconnect |
| FQDN | Fully Qualified Domain Name |
| GMSC | Gateway MSC |
| GPRS | General Packet Radio Service |
| GSM | Global System for Mobile Communications |
| GSMSCF | GSM Service Control Function |
| GSMSRF | GSM Special Resource Function |
| GSMSSF | GSM Service Switching Function |
| GSMSSG | GSM Service Selection Gateway |
| HLR | Home Location Register |
| HSS | Home Subscriber Server |
| HTML | HyperText Markup Language |
| HTTP | Hyper Text Transfer Protocol |
| I-CSCF | Interrogating Call Session Control Function |

TABLE 2-continued

| | |
|---|---|
| IAM | Initial Address Message |
| IAPP | Internet Application Program/Internet Enabled Application Program |
| ICDR | Internet Content Data Record |
| ICSI | IMS Communication Service Identifier |
| IFC | Initial Filter Criteria |
| IMS | Internet Multimedia Subsystem |
| IMS-AGW | IMS Access Gateway |
| IMS-ALG | IMS Application Level Gateway |
| IMSI | International Mobile Subscriber Identity |
| IN | Intelligent Networking/Intelligent Network |
| INAP | Intelligent Network Application Protocol |
| INITDP | Initial Detection Point |
| IO | Internet Originated |
| IP | Internet Protocol |
| IPE | IP Endpoint |
| ISDN | Integrated Services Digital Network |
| ISUP | ISDN User Part |
| IVR | Interactive Voice Response |
| JSON | JavaScript Object Notation |
| LTE | Long Term Evolution |
| LTU | License To Use |
| MAP | Mobile Application Part |
| MCC | Mobile Country Code |
| MGCF | Media Gateway Control Function |
| MMS | Multimedia Messaging Service |
| MNC | Mobile Network Code |
| MNO | Mobile Network Operator |
| MO | Mobile Originating |
| MOD | Modulus |
| MPBN | Mobile Packet Backbone Network |
| MRF | Media Resource Function |
| MS | Mobile Station |
| MSC | Mobile Switching Center |
| MSISDN | Mobile Subscriber ISDN |
| MSRN | Mobile Station Roaming Number |
| MVNO | Mobile Virtual Network Operator |
| NIST | National Institute of Standards and Technology |
| O-CSI | Originating Camel Subscription Information |
| OBCSM | Originating Basic Call State Model |
| OCS | Online Charging System |
| OFFHOOK | Lifting Receiver/Answering a call (Connect) |
| ONHOOK | Replacing Receiver/Hanging up a call (Disconnect) |
| OSS | Operator Specific Service |
| P-CSCF | Proxy Call Session Control Function |
| P2P | Peer To Peer |
| PCC | Policy and Charging Control |
| PCEF | Policy and Charging Enforcement Function |
| PCO | Protocol Configuration Options |
| PCRF | Policy Charging and Rules Function |
| PDD | Post Dial Delay |
| PIC | Point in Call |
| PING | Signaling Caller Identity |
| PPV | Pay Per View |
| PSMS | Premium SMS |
| PSTN | Public Switched Telephony Network |
| R-URI | Request URI |
| RAN | Radio Access Network |
| RBT | Ring-back-tone |
| RCS | Rich Communication Services |
| REL | Release |
| RF | Rating Function |
| RLC | Release Complete |
| ROI | Return On Investment |
| RRBE | Request Report BCSM Event |
| RTP | Realtime Transport Protocol |
| S-CSCF | Serving Call Session Control Function |
| SBC | Session Border Controller |
| SBCF | Session Balance Control Function |
| SBMF | Session Balance Management Function |
| SCP | Service Control Point |
| SIM | Subscriber Identification Module |
| SIP | Session Initiation Protocol |
| SIP | Session Initiation Protocol |
| SK | Service Key |
| SKU | Stock Keeping Unit |
| SLPI | Service Logic Program Instance |
| SMPP | Short Message Peer to Peer |
| SMS | Short Message Service |
| SMSC | Short Message Service Center |

TABLE 2-continued

| | |
|---|---|
| SRF | Specialized Resource Function |
| SS7 | Signaling System Seven |
| SSU | Single Service Unit |
| STP | Service Trigger Points |
| TAS | Telephony Application Server |
| TDMA | Time Division Multiple Access |
| TDP | Trigger Detection Point |
| TDP-N | Trigger Detection Point Notify |
| TDP-R | Trigger Detection Point Request |
| TTL | Time To Live |
| UMTS | Universal Mobile Communications System |
| URI | Uniform Resource Identifier |
| URL | Uniform Resource Locator |
| USP | Unique Service Proposition |
| USSD | Unstructured Supplementary Services Data |
| UUID | Universally Unique Identifier |
| VLR | Visitor Location Register |
| VOCS | Virtual Coin Operating System |
| VOIP | Voice Over Internet Protocol |
| VOLTE | Voice Over LTE |
| WINK | Short Duration OFFHOOK Signal |
| WWW | World Wide Web |
| XMSISDN | Cryptographically Hashed MSISDN |
| XMSISDN4 | XMSISDN Ending With Last 4 MSISDN Digits Appended |

In at least some embodiments described herein, the terms "mobile", "cellular", "cell", "phone," are used interchangeably to describe a modern GSM/TDMA/CDMA/UMTS/IP digital wireless telephony and a communications network. While illustrations may depict a smartphone, any phone may be applicable, including without limitation, a basic feature phone, an IP phone, a VOIP phone. Statements such as "the mobile device" may be interchangeable with "the user of the mobile device". In at least some embodiments described herein, while networking elements may be referenced in the singular, they may incorporate elements in the plural. In at least some embodiments described herein, network subsystems (e.g. Billing Systems) may incorporate elements from other subsystems (e.g. IN Control Systems).

In at least some embodiments described herein, the terms "communications signal(s)", "communication signal(s)," "mobile communications signal(s)," "mobile communication signal(s)," "cellular communications signal(s)," "cellular communication signal(s)," "cellular signal(s)," and the like are used interchangeably and describe, without limitation, digital signals, data and/or digital data packet(s) that may be encoded, partially or in full, (e.g. without limitations, bit/byte/hexadecimal/binary coded decimal etc. format) for (1) cellular transmission utilizing radio wave frequencies and associated elements(s)/device(s) programmed to operate in accordance with one or more suitable cellular transmission protocols, (2) for transmission in accordance with one or more wireless Internet-related protocols and correspondingly programmed device(s)/element(s), or (3) any combination of any embodiment of (1) and any embodiment of (2).

In at least some embodiments described herein, the term "element(s)" and the like may describe programmed computing device(s) executing at least a portion of software program(s) resided, partially or in full, in one or more non-transient computer memory blocks (e.g. without limitations, Flash Memory, RAM, ROM, etc.), software program(s), or a combination thereof.

In at least some embodiments described herein, the terms "cellular network", "mobile networks," "cellular telephony network," "mobile telephony network," "cellular mobile network(s)", "cellular communications network" and the like are used interchangeably.

In at least some embodiments described herein, the terms "micro", "micro payment" "micro transaction," "micro action", "micro activity" and the like, may describe a digital transaction involving, for example without limitation, one or more minor units of one or more currencies that are defined by ISO 4217 standard published by International Organization for Standardization (e.g. one or more U.S. cents, etc.).

In at least some embodiments described herein, while, for example, the micro payment describes transactions of a small quantum in minor units of one or more currencies that are defined by ISO 4217 standard (e.g. typically less than one dollar), one or more principles/protocols/methods/systems/devices/platforms described herein may be programmed/utilized for activities/actions/transactions that exceed that amount. For example, transactions of ten dollars and greater are equally applicable. In some embodiments, one or more principles/protocols/methods/systems/devices/platforms described herein may be programmed/utilized for activities/actions/transactions that are typically settled using other banking instruments, such as debit and/or credit cards.

The character "Y in conjunction with other Y characters represents a telephony decimal digit (0-9), or collectively an entire telephony number. The series +Y YYY YYYY represents a typical e164 formatted MSISDN (e.g. 11 digits, with + as the outbound international dialing symbol). The MSISDN may be transported and presented as the Calling Line Identity (CLI).

The term "caller" is interchangeable with "A" party. The party is interchangeable with the associated telephony device (telephone). Embodiments may show the caller as "A", "B", "C" etc., to distinguish between different callers.

The characters "A" and "B" (etc.) represent cellular MSISDN A and B.

The enclosing square parentheses "[ ]" represent a digital monetary wallet.

The notation "[A]" and "[B]" represent CELL wallets A and B.

The notation "[*A]" and "[*B]" represent STAR wallets A and B. That is, wallets created and maintained by the systems and methods disclosed herein.

In some embodiments, the present disclosure may describe a Prepaid cellular account, whose unit of currency is fiat backed network airtime, and an Accounting test that may determine whether the account has sufficient credit balance to sustain the charge. It is understood that various technological solutions of the present disclosure are equally applicable to a Postpaid account, where an Accounting test may determine whether the user has credit sufficiency (that is, credit worthiness) to sustain the debt incurred by the pending transaction.

Thus, while some embodiments may describe deducting the said amount from the cellular account, it may similarly debit (post) the amount to the account for later settlement. While debiting and deducting may technically describe different bookkeeping principles, they are applied in the broader context here, being that the account associated with the use has sufficient credit to sustain the charge, rather than in the narrower context that the account has sufficient (prepaid) credit balance. Thus, these two terms may be used interchangeably.

The payment quantum may be presented in a dollar, decimal, or unitary (¢) notation. While examples herein may illustrate dollar ($) amounts, any currency (e.g. currency defined by ISO 4217 standard) may be similarly mapped to the dialed digits as disclosed. In some embodiments, dollar amounts may be displayed as a uniform sticker price and then converted to local currency at transaction time. In some embodiments, the dialed digits and corresponding monetary suitable is localized to the home currency by referencing the MSISDN of the cellular device being utilized to effect payment. The digital store in a STAR wallet is herein termed STAR CURRENCY, a highly fungible fiat backed token.

In some embodiments, the term IP Endpoint (IPE) herein describes a uniquely addressed and referenced Internet connected component including without limitation, a discrete digital content or service, a Document Object Model (DOM) element (for example, without limitations, presented via XML or HTML) in a browser page, a user interface element on an internet connected device, application, terminal, webpage, etc. In some embodiments, An IPE may be addressable via a unique internet address including without limitation a socket address, port number etc., coupled to a digitally identifiable element.

In some embodiments, address signals of a cellular call may be symbolically prefixed. Without limitation, this prefix may be a Star (*), Double Star (**), Hash(#), Double Hash (##), Star Hash (*#), Hash Star (#*) or any other symbol or combination of symbols. In some embodiments, such a symbolic prefix shifts the address signals one position to the right, escaping the regular dialed address domain into a previously unutilized (e.g. star) number realm.

In some embodiments, without limitation, a Mobile Switching Center (MSC) is referenced as the transactional node responsible for generating the cellular micro billing tickets (records). Typically, the MSC is a switching element and function of legacy 2G/3G Circuit Switched telephony networks. In more modern 4G/5G Packet Switched telephony networks, for example those utilizing an Internet Multimedia Subsystems (IMS) architecture, and those utilizing Voice over Long Term Evolution (VoLTE), other network nodes and elements may be responsible for generating these transactional records, including without limitation, a Serving Call Session Control Function (S-CSCF), and/or a Telephony Application Server (TAS).

In some embodiments, whether a Circuit, Packet, or Hybrid Circuit and Packet Switched Network Architecture is utilized, an associated Online Charging System (OCS) typically manages user account balances and makes billing determinations. The OCS may comprise a Session Balance Control Function (SBCF), an Account Balance Management Function (ABMF) and a Rating Function (RF), to determine a tariff (i.e., a charge) for a communication.

In the nearly 150 years since the first telephony call, the ring has only transported Calling Line Identity (CLI). In some embodiments, the technological solutions of the present disclosure teach how to conduct currency over the telephony ring. In some embodiments, "RING COMMERCE", "RING TRANSACTION(S)" and the like, are terms coined herein to describe transacting over the ring, and to thereby literally ring up sales remotely online and/or in non-online environment.

The STAR ("*") is the universal key in the cellular matrix (the telephony dial pad). In some embodiments, elements of the cellular networks may be programmed to recognize the STAR ("*") as the symbolic network routing prefix and the name given to the cellular network signaling and switching element (node) that services and controls the micro payments as disclosed herein in accordance with at least some novel communications protocols and architectures. In some embodiments, while the disclosed STAR NODE is depicted as a SIP signaling server, other signaling systems, protocols (for example, without limitation, SS7 and ISUP) and/or entities, may be utilized to achieve the same transactional result (e.g. a micro transaction over the singular access channel (STAR BAND)).

In some embodiments, term "server" should be understood to reference a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server (e.g. Cloud servers).

In some embodiments, terms "cloud," "Internet cloud," "cloud computing," "cloud architecture," and similar terms correspond to at least one of the following: (1) a large number of computers connected through a real-time communications network (e.g. Internet); (2) providing the ability to run a program or application on many connected computers (e.g. physical machines, virtual machines (VMs)) at the same time; (3) network-based services, which appear to be provided by real server hardware, and are in fact served up by virtual hardware (e.g. virtual servers), simulated by software running on one or more real machines (e.g. allowing to be moved around and scaled up/down on the fly without affecting service to the end user). The aforementioned examples are, of course, illustrative and not restrictive.

In some embodiments, in accordance with the technological solutions of the present disclosure, users (and/or associated cellular devices) simply dial a star symbol (*) followed by the digits which match a monetary amount, as taught herein. In some embodiments, in accordance with the technological solutions of the present disclosure, access (event) activities (e.g. micro-payment transactions) may typically complete in just one second or less. In some embodiments, in accordance with the technological solutions of the present disclosure, access (event) activities (e.g. micro-payment transactions) may typically complete in just two seconds or less. In some embodiments, in accordance with the technological solutions of the present disclosure, access (event) activities (e.g. micro-payment transactions) may typically complete in just three seconds or less. In some embodiments, in accordance with the technological solutions of the present disclosure, access (event) activities (e.g. micro-payment transactions) may typically complete in just four seconds or less. In some embodiments, in accordance with the technological solutions of the present disclosure, access (event) activities (e.g. micro-payment transactions) may typically complete in just five seconds or less. In some embodiments, in accordance with the technological solutions of the present disclosure, users' cellular devices produce authenticated (signed) cellular signals (e.g. address signals), enumerating a monetary amount that may be processed by:

1) a presentation of a ring back tone; followed by
2) a call connect and disconnect (e.g. HOOK FLASH/ WINK protocol).

In some embodiments, by momentarily connecting and then disconnecting the call, the technological solutions of the present disclosure uniquely utilize a signaling technique such as, without limitations, "hook flashing" or "winking" as disclosed herein, to instantly switch and conduct the micro transaction by generating an event record (e.g. billing ticket at the originating switching element (MSC or suitable IMS billing nodes)) in an account that is associated with the corresponding cellular device (e.g. smartphone) and tracked in a database of an associated cellular operator/carrier. In some embodiments, one or more technological solutions of the present disclosure may be referenced as "FLASH COMMERCE." In some embodiments, in accordance with the technological solutions of the present disclosure, the resulting event record (e.g. the cellular billing ticket, also may be reference herein as the CDR (Call Data Record)), contains the star signaling event, which may be utilized to debit (or deduct) the monetary suitable of the dialed digits from the account associated with the calling device (caller account). In some embodiments, in accordance with the technological solutions of the present disclosure, the resulting event record (e.g. the cellular billing ticket (billable CDR)) may be generated when a call lasts one second. In some embodiments, in accordance with the technological solutions of the present disclosure, the resulting event record (e.g. the cellular billing ticket (billable CDR)) may be generated when a call lasts at least 500 milliseconds. In some embodiments, in accordance with the technological solutions of the present disclosure, the resulting event record (e.g. the cellular billing ticket (billable CDR)) may be generated when a call lasts at least 100 milliseconds. In some embodiments, in accordance with the technological solutions of the present disclosure, the resulting event record (e.g. the cellular billing ticket (billable CDR)) may be generated when a call lasts at least 50 milliseconds. In some embodiments, in accordance with the technological solutions of the present disclosure, the resulting event record (e.g. the cellular billing ticket (billable CDR)) may be generated when a call lasts at least 1 millisecond.

[FIG. 1]

FIG. 1 is a remote controlled access schema system and method in accordance with one or more embodiments of the present disclosure. An exemplary computing device (Internet connected device) 100, running Internet Application Program (IAPP) 101, requests an internet resource (e.g. a webpage) via an Application Programming Interface (API) 102 which connects to a remote server 111, in one embodiment hosted in the cloud 110. Remote server 111 returns at least one application program instruction (as represented by the generic scripting notation "</>"), to IAPP 101, that renders and displays an access controller interface element 103 with a displayed exemplary access code NNN, and in one embodiment, a linked URL 131 referencing an access-restricted digital resource (130) (e.g. internet hosted content) and/or or an access-restricted service 132.

In one embodiment, the API may transport a plurality of data, for example and without limitation, the access code NNN, a URL 131 referencing the internet content or service 132, a parameter identifying a cellular device (e.g. MSISDN) for a cellular device previously identified, and any other access control metadata. The cellular identity may be associated with the internet connected device 100, or any other previously identified cellular device. On receiving the request for the internet resource, remote server 111 responds to the IAPP 101, with at least one application program instruction 102 (again, as depicted by the generic scripting notation "</>") for rendering an access controller interface element 103.

At least one application program instruction 102 may, without limitation, contain code to stylize the access controller interface element 103 (e.g. HTML markup and/or CSS) and the displayed access code (NNN). In addition to providing script(s) for stylizing the interface element 103, the at least one application program instruction may include service logic (e.g. JavaScript) to execute when the interface element is activated. In one embodiment, the at least one application program instruction, without limitation, may thus encode a button rendering script (e.g. using HTML, CSS or any combination thereof) to stylize the interface element 103 and the presented display access code (NNN), and furthermore, provide service logic which communicatively couples the interface element 103, to a cellular network 120 controlling schema 121.

In one embodiment, the at least one application program instruction that communicatively couples the access controller interface element 103 to the cellular network controlling schema 121, may also instruct to activate and/or initiate a mobile originating cellular communications protocol to transmit/emit an access request including the access code NNN in symbolically prefixed address signals (e.g. *NNN as disclosed herein) on detecting of at least one activity associated with the access controller interface element 103. In some embodiments, at least one activity associated with the access controller interface element 103 may be an activation of the access controller interface element 103 when a user of the computing device 100 clicks on/selects the access controller interface element 103, and/or when a user of the computing device 100 while scrolling through online content advances to a part of online content that would display the access controller interface element 103 that would be operationally linked to an access-restricted digital resource (e.g., the access controller interface element 103 being in a focal presence (in focus) on a screen of the computing device 100). The mobile originating communications protocol may be without limitation, a Telephony call setup request, a Short Message Service (SMS) request or an Unstructured Supplementary Services Data (USSD) request. In some embodiments, on detecting the at least one activity with the access controller interface element 103 (e.g. the activation of the access controller interface element 103), access request data may thus be communicated along a cellular signaling path 105, to the cellular network hosted access controlling schema 121, which may then in turn communicate at least one access program instruction, via remote internet access control server 111 (e.g. addressed, in one embodiment, on the translated symbolic network routing prefix as described in FIG. 15 below), back to the access controller interface element 103 using the API 104.

In some embodiments, client-server interaction, as described between internet client device 100 (running IAPP 101) and remote internet access control server 111 may happen along the established internet communications path (e.g. API schema 104, represented by the generic HTTP "//" communications protocol). While this communication path may be utilized in this disclosed schema (e.g. in a modified DCB embodiment as newly disclosed herein), one technological solution in the disclosed remotely programmed access schema, is that in one embodiment, a remote internet access control server (111) may now inject new programming logic into an IAPP (101) executed on a client device (100), that redefines and pivots the client-server communications from one that is typically conducted over the internet, for example and without limitation, using an HTTP GET/PUT or JSON data interchange protocol along an internet communications path 104, to one that now is transported over a cellular network 120, using a Mobile Originating (MO) signaling protocol along a cellular communication path 105. By communicating thus, over a cellular rather than an internet channel, the data is transported securely out of internet band, or above band (e.g. in the STAR BAND) as disclosed and described in detail herein.

Thus, when the internet connected device 100 detects that the access control interface element 103 has been activated (e.g. a user taps/clicks the interface element), service logic programmed and supplied by the remote internet access control server 111 is executed. In one embodiment, this service logic may be configured to transport access controlling data over an internet communications channel 104 (e.g. "//" indicated, as in "HTTPS://"), including without limitation, transporting the access code (NNN) and cellular device identity (e.g. MSISDN), to the remote internet access control server 111, utilizing an internet API. In one embodiment, service logic may transport access controlling data over a cellular communications channel 105, using mobile originating signals directed to the network access controlling schema 121, which may then communicate access controlling instruction back to the remote internet access control server 111, as described above.

In one embodiment, on receiving the access controlling data via an internet communications channel 104, remote internet access control server 111 may then request a cellular network hosted access controlling schema 121 to approve access, based at least in part, on executing newly configured cellular service logic on the data communicated (e.g. access code NNN and the cellular device identity, e.g. MSISDN). In one embodiment, the access controlling data may be transmitted over a cellular communications path 105, as described above, to the cellular network access controlling element 121, bypassing the remote internet access control server 111.

In one embodiment, the newly configured cellular network hosted access controlling schema 121, recognizes and interprets the display access code NNN to enumerate a charge ($N.NN) that is to be applied to an account associated with the identified cellular device (e.g. MSISDN) in order to grant access to the referenced content or service 132 (e.g. on URL 131). In one non limiting embodiment, the access controller interface element 103 is rendered by the IAPP 101, as a graphical user interface element (e.g. a transaction submit button) displaying the access code NNN, in one embodiment formatted as the purchase price (e.g. $N.NN or NNN¢ as disclosed herein), to be paid for accessing the internet content or service 132.

The graphical user interface element 103, defined by the at least one application program instruction 102 received from the remote internet access control server 111 as described above, may thus be presented as a uniformly designed payment button (e.g. shape, size and color), suitably branded thus, so as to be instantly recognizable as a cellular billing payment method, displaying the transaction amount ($N.NN or NNN¢) as disclosed herein, for accessing a linked internet content or service (132). Presenting a consistently branded and stylized, and thus instantly recognizable payment instrument (e.g., interface element) is essential in order to engender trust in, and to capture a mass market for, cellular billing, as disclosed herein.

In one embodiment, the cellular network controlling schema, is thus a cellular billing and charging schema (e.g. OCS) which has been configured, as described herein with reference to FIGS. 15A and 15B below, to determine whether an account associated with the identified cellular device (e.g. MSISDN) has sufficient credit required to sustain the charge $N.NN enumerated by the access code NNN.

On determining that a cellular account associated with the cellular identity provided (e.g. MSISDN) has sufficient credit to sustain the $N.NN charge, as enumerated by the access code NNN, the cellular network hosted access controlling schema 121 may communicate a successful transaction to the remote server 111, which in turn may then instruct the access controller interface element 103, via the internet communications channel (API) 104, to grant access to the linked content 132, as referenced by the URL 131. On receiving instruction to grant access, the access controller interface element 103 displayed in the IAPP 101, directs the internet connected device 100 to access (retrieve) and present the linked content or service 132.

[FIG. 2]

Figure 2:
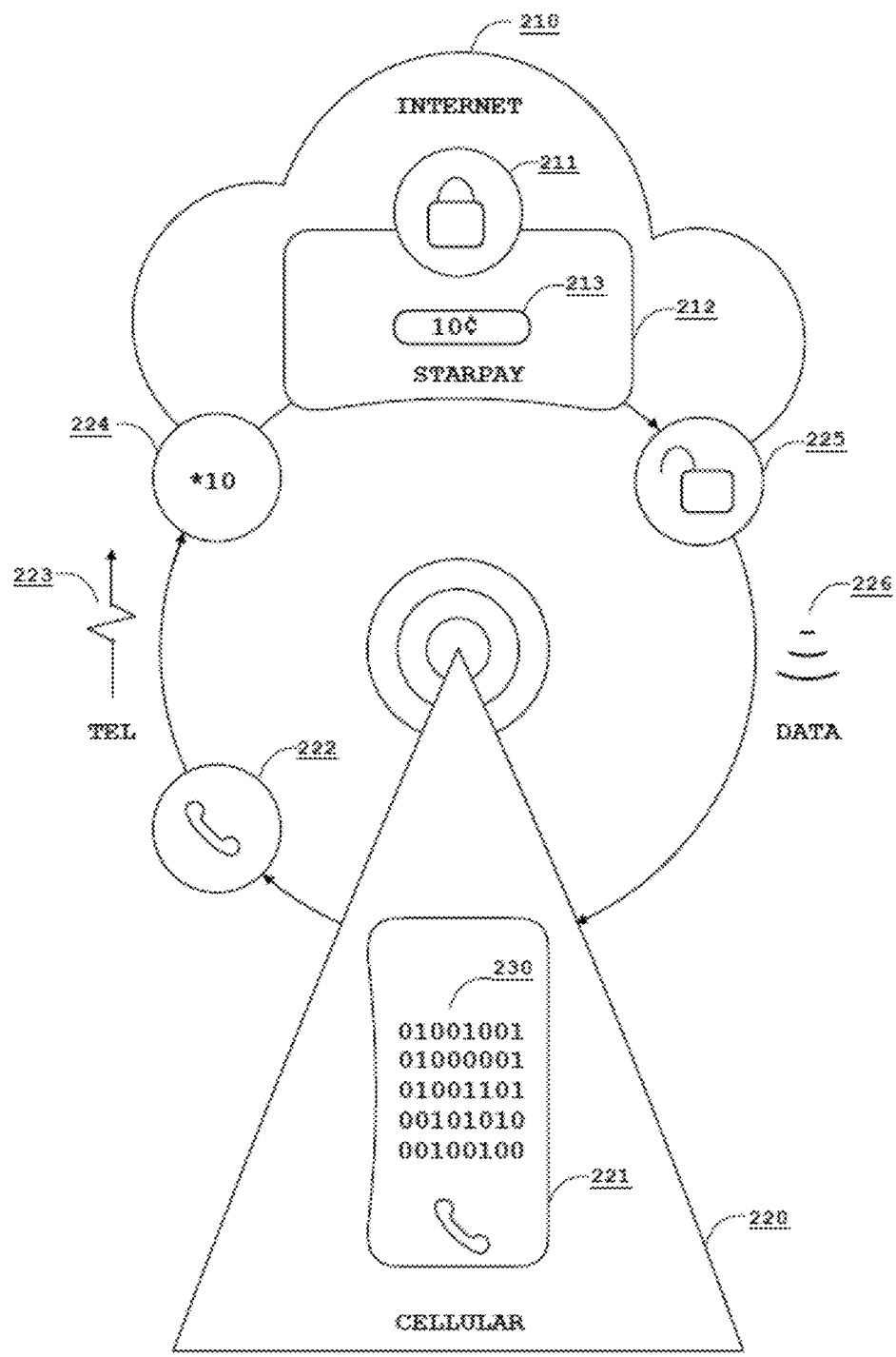
FIG. 2 is an illustrative non-restrictive example of a networking architecture, including at least one intelligent element, in accordance with at least some embodiments of the present disclosure.

FIG. 2 depicts another illustration of a payment network architecture for implementing the process based at least in part on a mobile communication signals of FIG. 20 below in accordance with at least some embodiments of the present disclosure. FIG. 2 includes an illustration of a life cycle of a digital content payment and access via the payment network architecture.

In some embodiments, an access control platform 210 hosts an access-restricted digital service and/or content under a virtual lock 211. In some embodiments, the internet service may request an access control button 213 via a suitable communication, messaging and/or interfacing protocol. For example, in some embodiments, the internet service may utilize, e.g. an application programming interface (API) to send a request to the access control platform 210, which may respond by a same or different API to return an interface element. The interface element may include the access control button 213 and/or any other suitable interface elements.

In some embodiments, the term "application programming interface" or "API" refers to a computing interface that defines interactions between multiple software intermediaries. An API defines the kinds of calls or requests that can be made, how to make the calls, the data formats that should be used, the conventions to follow, among other requirements and constraints. An API can be entirely custom, specific to a component, or designed based on an industry-standard to ensure interoperability to enable modular programming through information hiding, allowing users to use the interface independently of the implementation.

In some embodiments, a user may navigate to the content of the internet service using an internet device 212. In some embodiments, the internet device 212 may include any suitable software and/or application for navigating to the content, such as, e.g. a web browser, an internet connected application, an internet messaging application, a media streaming service, a Real Simple Syndication (RSS) feed, or any other suitable internet accessible content access and/or delivery software or any combination thereof.

In some embodiments, upon navigating to the content, the internet service may deliver to the internet device 212 a content access interface presenting the content and the interface element including the access control button 213. In some embodiments, the content may be presented as a user selectable content interface element that identifies the content. For example, the content interface element may include, e.g. a thumbnail, a hyperlink, a list item, an icon, or other text and/or imagery representative of the content. In some embodiments, the access control button 213 may be presented in association with the content interface element to indicate that the access control button 213 is selectable for the content. For example, the access control button 213 may be rendered as, e.g. an overlay to the content interface element, adjoining the content interface element, on a list row alongside the content interface element, with a lead line pointing to the content interface element, or via any other design feature or any suitable combination thereof.

In some embodiments, the user may select, via the internet device 212, the access control button 213, the content interface element or both to generate an access request for accessing the content. In some embodiments, the access request may include a communication that stages a transaction event in an access control ledger. In some embodiments, the transaction event may be for a value associated with accessing the content and an expected telephony device 221. In some embodiments, the expected telephony device 221 may include a suitable telephony device 221 that has been registered with the access control ledger for a particular content and/or for a particular internet service associated with the value of the transaction event. In some embodiments, the telephony device 221 may be registered by, e.g. pairing, specifying, linking, or otherwise associating a unique identifier associated with the telephony device 221 to the transaction event. In some embodiments, the unique identifier may include without limitation, e.g. an MSISDN, a cryptographically hashed MSISDN, or an augmented hashed MSISDN of the telephony device 221.

In some embodiments, the access control button 213 may represent a request to the user viewing the content on internet device 212 to pay for access by activating (e.g. touching or otherwise selecting via a suitable input device) the access control button 213. Therefore, the access control button 213 may display a value (price) to access the content. In the example depicted in FIG. 2, the user is thus requested to pay 10¢ for accessing the service or the content as shown by the price presented on the access control button 213.

In some embodiments, to satisfy the request to pay for access to the content, the user may initiate a transaction using a telephony call from the telephony device 221 using address signals including the symbolic prefix and following digits formatted to enumerate the requested price. A specially configured IN 220 may utilize the address signals to route the telephony call and execute the transaction based on the symbolic prefix and following digits. In the example depicted in FIG. 2, the user may dial *10 as described below in greater detail, from telephony device 221, presented in portrait mode, utilizing IN 220.

In some embodiments, internet device 212 and telephony device 221 are one and the same device. Thus, on activating the access control button 213 by tapping the button, mobile device 212/221 may be controlled to open the native telephony dialer, preaddressed with the symbolic prefix followed by the digits enumerating the monetary suitable of the price as phone number. For example, the access control button 213 may include software instructions configured to instruct the mobile device 212/221 to open the native telephony dialer preaddressed with the price of the content, e.g. *10 for 10 cents.

In some embodiments, internet device 212 and telephony device 221 are separate devices. Thus, the user may read the prices and manually enter into a dialer the symbolic prefix followed by the digits enumerating the price. In some embodiments, communication between the internet device 212 and the telephony device 221 may enable the internet device 212 to automatically control the telephony device 221 to open the native telephony dialer, preaddressed with the symbolic prefix followed by the digits enumerating the monetary suitable of the price as phone number. For example, the access control button 213 may include software instructions configured to instruct the internet device 212 to broadcast a wireless signal to the telephony device 221. The wireless signal may include instructions to the telephony device 221 to open the native telephony dialer preaddressed with the price of the content. In some embodiments, wireless signal transmissions/communications may include, e.g. a radio frequency identification (RFID), near field communication (NFC), Bluetooth, NBIOT, 3G, 4G, 5G, GSM, GPRS, WiFi, WiMax, CDMA, satellite, ZigBee, and/or other suitable wireless signals.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g. smartphones) are within close proximity of each other.

Accordingly, in some embodiments, the internet device 212 may be configured as a point-of-sale device for in-person micro payments for physical items and/or services, such as at a physical vending machine. The internet device 212 may be used to generate a price for a physical item along with an identifier (e.g. a SKU), and then the internet device 212 and the telephony device 221 may be registered and/or paired for the prices for the physical item. Thus, upon use of the wireless signal (e.g. RFID, NFC, Bluetooth, etc.), the wireless signal may instruct the telephony device 221 to open the native telephony dialer preaddressed with the price of the physical item and/or service.

In some embodiments, on pressing connect (e.g. green phone) on the access control button 222, a call having the address signals enumerating the price to access the content are transported 223 over the wireless radio access network (RAN). The IN 220 performs the AAA (Authentication, Authorization and Accounting) procedure, where Accounting determines whether the account associated with the has sufficient credit ($0.10 per the above example) to complete the call. On successful credit verification, the call and associated address signals (*10), including the MSISDN transported as the Caller Identity, is routed to the access control element 224.

In some embodiments, on receiving the address signals the access control platform queries the access control ledger to determine if a transaction from the MSISDN for the amount signaled (e.g. 10c signaled by *10) is expected. In some embodiments, on determining that the transaction is expected, the access control platform may connect to and then disconnect from the call, e.g. by performing the disclosed hook flash (WINK) signaling, to conduct and complete the transaction, instructing the network to take the call OFFHOOK and thereby begin clocking the call at the signaled tariff (in this example, 10 cents).

In some embodiments, the access control platform instructs the network to replace the call ONHOOK, e.g. momentarily thereafter to complete the hook flash, thereby completing the transaction. Replacing the call ONHOOK which causes the IN to generate a billing CDR for the transaction amount (10c) debiting and/or deducting the transaction amount from an account associated with the caller.

In some embodiments, the access control platform awaits signaling acknowledgement that the call was network disconnected. If the network indicates that the user disconnected the call (e.g. pressed the red phone icon) prior to the call going OFF HOOK (for example, sending a SIP CANCEL message to the access control platform), then the IN 220 may cause the transaction to abort and fail to complete.

In some embodiments, on receiving signaling confirmation that the hook flash event completed successfully, that is the CDR was successfully recorded and the amount was deducted from the caller account, the access control platform may update the access control ledger, marking the transaction from expectation "set" to "met" and/or "successful", communicating the same to the access control button 213. In some embodiments, upon receiving a micro payment confirmation indicating the transaction being "met" and/or "successful", the internet service may control the service or content to be UNLOCKED 225 for accessing via mobile device 212/221, by, for example, without limitation, downloading the internet service (being access-restricted) via the data network connection 226 to be shown on the display 230 of mobile device 212/221.

Thus, in order to effectuate the payment for the digital content and/or service, the user may dial the price indicated by the access control button 213 and unlock the content for consumption using a telephony call that is, e.g. one second or less.

[FIG. 3]

Figure 3:
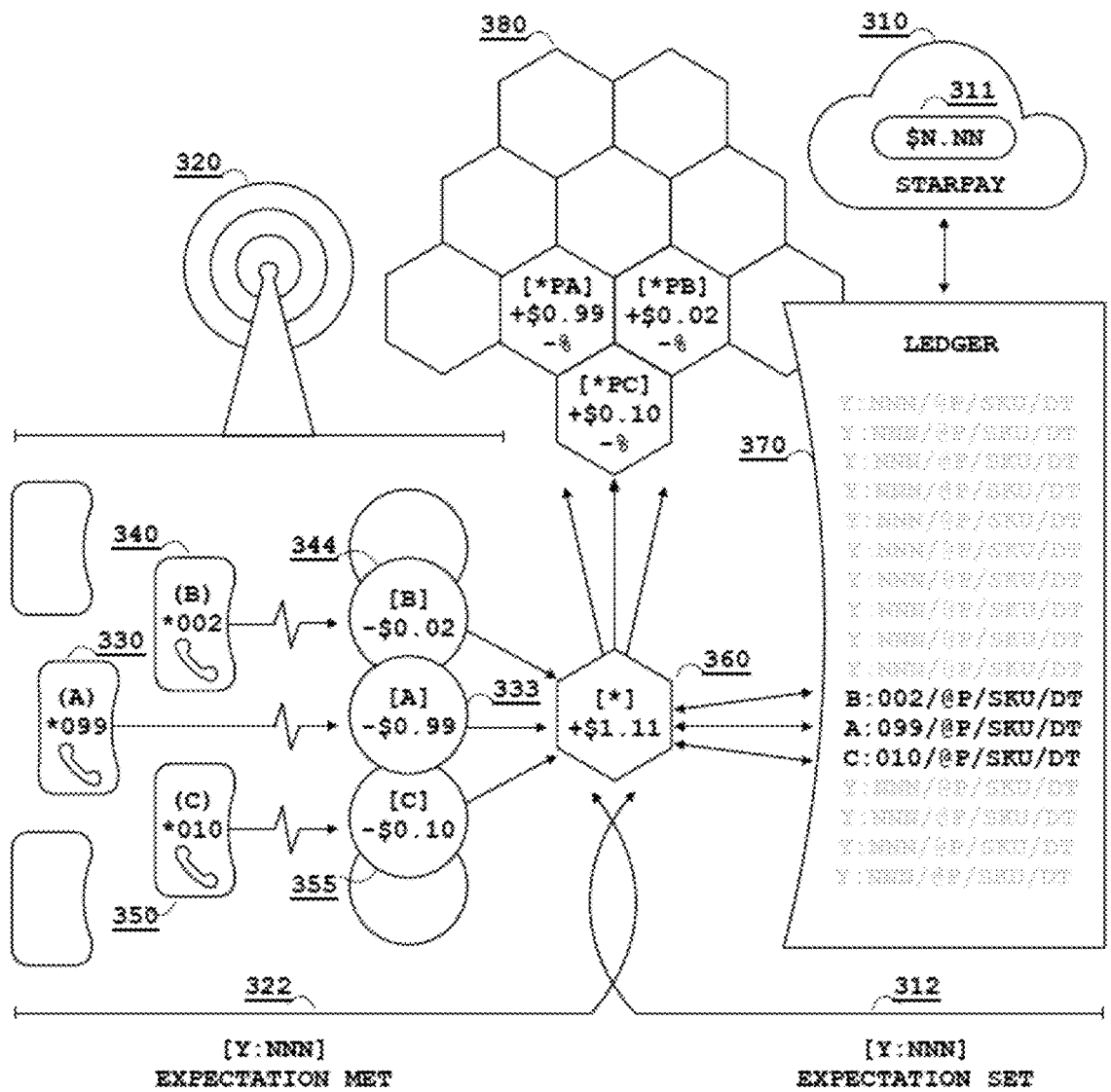
FIG. 3 is an illustrative non-restrictive example of an interworking arrangement in accordance with at least some embodiments of the present disclosure.

FIG. 3 depicts the payment network architecture in greater detail in accordance with one or more embodiments of the present disclosure. FIG. 3 graphically illustrates a massively parallel cellular transactional system and associated functional entity relationships that leverage the symbolic prefix and address signal protocol and the access control platform 310.

In some embodiments, an access control platform 310 hosts digital content requiring micro payment for access. An access control button 311 displays the requested amount to pay (e.g. $N.NN or NNN¢). In some embodiments, an IN 320 is used to signal and conduct the micro payment.

In some embodiments, a prior step may be performed for registering and pairing a cellular identity of the user with the access control platform 310. In some embodiments, the cellular identity may include, e.g. MSISDN-Y of the user. Registration of the cellular identity may be performed via, e.g. a challenge and response method, user input, or other suitable registration technique to pair the cellular identity to a particular expected transaction. This pairing, which couples the access control platform 310 amount presented in the access control button 311 as viewed in a browser or an APP, together with the registered cellular identity, uniquely binds and stages a pending transaction for the content with the user.

In some embodiments, since the payment requested ($N.NN) is uniquely bound (logically coupled) to the registered cellular identity (MSISDN-Y) of the user, the system and method disclosed herein records this pending transaction as an expectation, e.g. in an access control ledger 370 (for example, a record in a centralized database, or a contract in a decentralized blockchain) that lists the MSISDN from which the NNN series of address signals is expected.

In one or more embodiments, where the access control ledger 370 includes a blockchain, the pending transaction represented by the contract is then fulfilled (satisfied) on receiving the cellular signals matching the recorded expectation, thereby authorizing the transfer of funds to the content creator or publisher (@P).

In some embodiments, the exemplary inventive computer-based systems/platforms, the exemplary inventive computer-based devices, and/or the exemplary inventive computer-based components of the present disclosure may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network elements within a computer network such that each element may maintain a copy of the blockchain. Malicious network elements attempting to compromise the integrity of the database must recreate and redistribute the blockchain faster than the honest network elements, which, in most cases, is computationally infeasible. In other words, data integrity is guaranteed by the virtue of multiple network elements in a network having a copy of the same blockchain. In some embodiments, as utilized herein, a central trust authority for sensor data management may not be needed to vouch for the integrity of the distributed database hosted by multiple elements in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and *Byzantine* fault tolerant replication. For example, each element in a peer-to-peer network or blockchain distributed network may act as a title registry and escrow, thereby executing changes of ownership and implementing sets of predetermined rules that govern transactions on the network. For example, each element may also check the work of other elements and in some cases, as noted above, function as miners or validators.

In some embodiments, the reverse association between an activated access control button 311 to purchase a uniquely identifiable digital product (e.g. via SKU or other identifier of content and/or services) online, and an expectation that awaits matching cellular signals from a known MSISDN, enables the user to dial the sticker price ($N.NN) without having to input any additional beneficiary addressing information to which the resulting micro payment is to be directed.

In some embodiments, this transactional simplicity and unified addressing protocol, which binds the signaled price and the provider of the content and/or service, is attained on the reverse association between payee and payer and the resultant expectation set on the selected content and/or service. Thus, the mappings between the cellular micro payment signals, the digital content being purchased, and the provider, are all seamlessly stitched on the backend, in the access control ledger 370 as disclosed, and are thus completely transparent to the consumer (caller).

For example, a digital product or service SKU, from provider @P, requiring NNN¢ ($N.NN) micro payment from MSISDN-Y, with an access control button 311 activated at Date Time Stamp DT, may result in the following expectation and associated metadata, as depicted in the access control ledger 370, where the "/" indicates a record field separator: [Y:NNN/@P/SKU/DT].

Thus, in some embodiments, upon the address signals *NNN being received from MSISDN-Y, and where the cellular wallet (e.g. 333) associated with MSISDN-Y has sufficient credit balance to sustain the NNN¢ charge, provider P is credited for the SKU sold and a new transaction Date Timestamp (DT) is recorded. By recording an initial timestamp on at least one activity associated with Button (e.g. activation of Button (e.g. being clicked on/selected)), the access control platform can disengage on a timeout, on an interval during which no such cellular signals are received, to release any unutilized communication resources.

In some embodiments, a specific series of address signals may be expected from a known MSISDN according the expectation set in the access control ledger 370. Accordingly, in some embodiments, the access control platform 310 may use transaction precognition to ensure that only the correct address signals, and consequently the correct payment amount, are accepted for processing. Thus, if a user mistakenly dials, say *001 (1c) when the pending transaction expects *010 (10c), the access control platform 310 may benignly reject the transaction due to having no matching expectation. Thus, the access control platform 310 may avoid engaging the disclosed hook flash signaling protocol, which would erroneously execute a wayward transaction, debiting the cellular account with an incorrect amount.

In some embodiments, the cellular signaling of address signals mapped to an internet endpoint and product, permits highly parallel transaction processing, where many users (many thousands if not millions) may all simultaneously, or substantially simultaneously, view the same digital content, requesting the same micro payment, and all may then simultaneously or substantially simultaneously, emit the same signals to conduct the same micro payment transaction, all without any interference in signaling a unique transaction that could inadvertently authorize content access and delivery by one consumer to another.

In some embodiments, therefore, by setting a transaction expectation [Y:NNN] only the telephony device with MSISDN-Y that is transmitting address signals NNN, and with sufficient balance in an associated cellular wallet [Y] to sustain a $N.NN charge per the disclosed methods and systems, can unlock the content (SKU) associated with the activated $N.NN access control button 311 presented to the user. This highly orchestrated and staged, one-to-one, many-to-one and many-to-many, user-to-content relational construction as disclosed, enables more efficient and secure micro payment at scale.

FIG. 3 illustrates three such access control platform expectations and resulting transactions from three users, each recorded in the access control ledger 370 prior to the user emitting the associated address signals. These expectations (312) set in the access control ledger 370, may further records transactional metadata, including without limitation:

1. the unique identity of the digital publisher (@P) presenting the access control button 311, which, in some embodiments, is an MSISDN itself. Thus, the unique identity of the digital publisher (@P) describes a provider access control wallet 380 [*P] which may be registered as the content publisher's key, utilizing a similar registration and/or pairing technique to that described above for the user's telephony device, e.g. utilizing an access control platform API.
2. the SKU (Stock Keeping Unit) identifying the digital content or service being purchased, and
3. the button activated timestamp (e.g. a year to millisecond format YYYYMMDDHHMMSSMMM or any other suitable timestamp format).

Thus, in some embodiments, cellular user A with MSISDN-A (330), cellular user B with MSISDN-B (340), and cellular user C with MSISDN-C (350) and so on, who are viewing the same or different access control buttons 311, governing access to the same or different digital content, requesting the same or different payment amounts, may be securely signaled substantially simultaneously, in parallel.

In some embodiments, on each A, B, C telephony device emitting the respective NNN series of address signals, the IN 320 performs the AAA (Authentication, Authorization and Accounting) steps, where the latter step determines whether each of the cellular accounts [A], [B], [C], associated with the callers (A), (B), (C) have sufficient credit ($N.NN) per the direct mapping of the address signals to the monetary value, in order to complete the call setup and the pending micro transaction.

In some embodiments, if the accounts can sustain the associated charges, for example 2¢ for cell A, 99¢ for cell B and 10¢ for cell C respectively, the calls pass the Accounting Verification and are routed to the access control platform 310 (e.g. based on the symbolic prefix and/or equivalent internal routing short code). In some embodiments, the access control platform 310 may then query the access control ledger 370 as a pre-transaction verification step to determine whether the incoming signals from the respective telephony devices are expected.

In some embodiments, the pre-transaction verification step uniquely ensures that a cellular user cannot inadvertently misdial a payment amount, since the transaction is only executed on the condition that an active payment expectation (312) matches the address signals received (322) from the expected cell MSISDN-Y.

In some embodiments, upon the expectation being met for each cellular user, the access control platform 310 performs the hook flash signaling protocol to cause the IN 320 to generate the CDR and complete a corresponding transaction. In particular, the CDR may be generated on receiving acknowledgement that the call of the associated cellular user has been disconnected by the access control platform 310 and not by the cellular user.

In some embodiments, the conditional network disconnect that creates the CDR where the access control platform 310 disconnects, prevents the user from issuing a mid-call setup ABORT, by pressing a phone disconnect button momentarily after pressing a phone connect button for such a duration as to have sufficient time for the address signals to reach the access control platform 310 while subverting the transaction by avoiding generation of the CDR. In some embodiments, since the CDR is used to debit and/or deduct the price from account associated with the cellular user, voiding generation of the CDR causes the transaction to abort. In some embodiments, on receiving a successful transaction completion indication (e.g., affirmative access permission indication), the access control platform 310 may then update the access control ledger (370) to record a completed transaction and timestamp, debiting the provider access control wallet 380 [*P] to reflect the amount due.

The access control platform 310 then communicates to the Internet End Point (IPE) and provider (@P) that the transaction for the associated SKU item has been completed, permitting the digital content to be unlocked, thereby granting content access to the user via the IAPP. In some embodiments the provider receives a UUID that uniquely identifies the transaction.

This expected and verified signaling protocol ensures that the cellular user account has been debited with the payment amount transported in the cellular address signals before granting access to the digital content. Thus, in the illustrated examples, the three micro payment transactions, shown arriving substantially simultaneously from the three telephony devices, result in the following three time ordered cellular accounts ([wallets]) being debited:

$[B]-\$0.02(344)$ $[A]-\$0.99(333)$ $[C]-\$0.10(355)$.

And accumulatively, resulting in an access control platform system register (wallet) credit:

$[*]=[*]+\$1.11(360)$.

The access control platform 310 thus serves as a micro clearing house for content publishers. The accumulative access control platform register (360) is determined by the summation of all access control platform related CDRs over a defined transactional billing period (e.g. daily, weekly, monthly), as in the series:

$[A,*NNN]+[B,*NNN]+[C,*NNN]\ldots$

In some embodiments, the IN 320 may charge a percentage micro payment switching fee (% X) on the conducted transaction. Similarly, the access control platform 310 may charge a transaction processing fee (% Y). The content publisher may then accrue an accumulative balance in their associated access control platform wallet 380 [*P] with each $N.NN transaction completed as follows:

$[*P]=[*P]+((100-X-Y)/100\times\$N.NN)$.

In some embodiments, for a 10% IN 320 fee and 5% access control platform 310 fee can result in rewarding the content publisher majority (85%) of the micro transaction. Accordingly, payment may include authentic and sustainable revenue apportioning.

On deducting any percentages for switching (% X) and transaction (% Y) fees the access control platform 310 may distribute the net payment revenue accrued to each provider (PA, PB, PC) for each transaction by debiting their respective access control platform wallets 380 per the above example:

$$[*PA]=[*PA]+(100-X-Y)/100\times0.99$$

$$[*PB]=[*PB]+(100-X-Y)/100\times0.02$$

$$[*PC]=[*PC]+(100-X-Y)/100\times0.10.$$

In some embodiments these funds may be marked "pending", until such time as the IN 320 finalizes payment to the access control platform 310.

In some embodiments, the internet application (IAPP) on a user's telephony device may request a micro pay transaction utilizing an API, which renders an access control button 311 user interface element displaying a sticker price. In some embodiments the access control button establishes a bidirectional communications channel (e.g. socket connection) between the access control element and the IAPP or IPE.

Such a bidirectional communications channel, permits IN 320 events to be pushed to the internet enabled access control button 311. In some embodiments, the access control button 311 thus delivers a live transactional payment channel, between telephony device, IN 320 and the Internet Application, in a single self-contained user interface element.

In some embodiments, the bidirectional communications channel, together with a micro payment expectation which, as disclosed, uniquely identifies and binds symbolically prefixed address signals from a known cellular device identity matched to a digital content or service at the signaled price, carries signaling per the disclosed methods and systems substantially in real-time between the Cellular Phone, the Cellular Switch, the Internet-based access control element and the access control button including, e.g. an Internet Button.

[FIG. 4A]

Figure 4A:
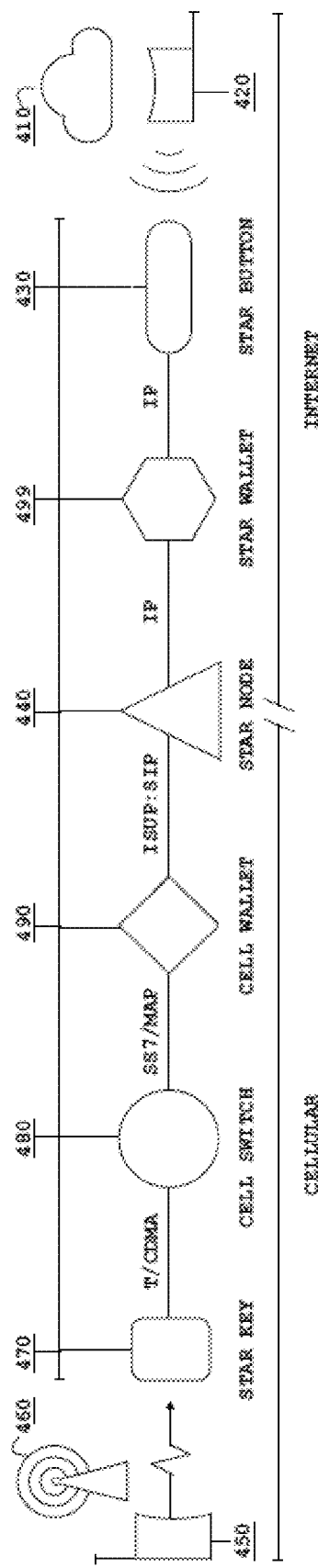
FIG. 4A is an illustrative non-restrictive example of a Circuit Switched Star Logical Channel in accordance with at least some embodiments of the present disclosure.

FIG. 4A depicts a logical representation for a circuit switched IN 460 (e.g. telephony network) and device A 450. In some embodiments, this architectural abstraction depicting the core elements in an access control platform transaction, may omit some elements for clarity. Some embodiments may have an allocation to physical elements different from that shown, however, the physical separation of the logic shown does not impact the modelling disclosed.

In some embodiments, an internet 410 connected device B 420 displays a screen that requests the user of an access control platform for access to digital content or services. The device B 420 may include an internet enabled cellular phone with an Internet browser linking to a webpage or an APP rendering internet content or services. Alternatively, device B 420 may be a personal computer with browser or software connected to the internet. As such, the device B 420 and cellular telephony A 450 may be one and the same physical device.

In some embodiments, on rendering a screen for the access control platform transaction, device B 420 connects to the access control element 440 via a published API, requesting an access control button (430). In some embodiments the API permits the IAPP to specify the access control platform transaction amount (e.g. NNN¢ and *NNN address signals as disclosed herein) together with the SKU being purchased. Each element rendered on the screen that requests access control platform functionality may be further identified by a unique digital ID, linked to the transaction.

In some embodiments, when device A (450) has previously conducted an access control platform transaction using the IAPP and has been registered and/or paired for a pending transaction, as described above, then the expectation may be set at an access control element (440). In some embodiments, the expectation may include a signal from device identified by MSISDN-A emitting the *NNN address signals. This expectation may be, for example, annotated [A:NNN] herein, however any other suitable annotation may be employed. In some embodiments the access control platform API establishes a bidirectional communication between the access control element (440) and the STAR Button (430), permitting transaction events to be communicated between them. One such bidirectional communications protocol utilizes an IP Socket.

In some embodiments, upon tapping the access control button (430) the transaction and the associated channel is activated, prompting the user to dial the *NNN address. While an access control button (430) may be automatically activated, since multiple buttons may be displayed on a single screen, each associated with different content/service, tapping or bringing focus to activate an access control button (430) may be a mechanism to select the desired item to purchase.

In some embodiments, user A may dial *NNN, representing payment in dollar notation ($N.NN), on device A (450). In another embodiment user A may dial *NN or *0NN (with leading zero) representing payment in cents (NN¢). The transactional signals may be transported over the IN 460 (e.g. Radio Access Network (RAN)) using, for example and without limitation, TDMA/CDMA signaling, or Session Initiation Protocol (SIP).

In some embodiments, a symbolic prefix, such as a star, hash, ampersand, etc., in the cellular address signals, is accessed on touching the symbol key (470). For example, a star may be used for the symbolic prefix, in which case, the symbol key 470 may be a star key located at coordinates R4C1 (Row 4 Column 1) in the cellular dial pad matrix. In some embodiments, the symbolic prefix may route the call along a star configured trunk or universal resource indicator (URI) to the access control element (440).

In some embodiments, upon dialing *NNN the mobile originating switching element (e.g. MSC 480) enters the Originating Basic Call State Model (OBCSM), encountering the Initial Detection Point (INITDP: DP2 Collected_Info). The INITDP establishes a call control dialog with a Service Control Point (SCP/gsmSCF) not shown. In some embodiments this MSC/SCP dialog is established utilizing the MAP/SS7 signaling protocol.

In some embodiments, the SCP performs a credit verification for A by querying cellular wallet (490), an account associated with device A 450, to determine whether user A has sufficient credit to complete the call. That is, in this example, determining whether user A has at least $N.NN credit, per the disclosed mapping, in the associated cellular account (490). In some embodiments, the cellular wallet 490 is managed by the IN billing system, or Online Charging System (OCS).

In some embodiments, upon determining that user A has sufficient credit, the SCP instructs the MSC (480) to CONTINUE the call and the MSC 480 then routes the call request to the access control element (440). In one switching embodiment the MSC routes the call along an associated symbol (e.g. star) trunk to a GMSC/SBC, which in turn translates ISUP into SIP signaling.

In some embodiments, while FIG. 4A depicts the MSC 480 connecting to the access control element (440) on a linear path and single hop over the cellular wallet (490), that is merely illustrative of the logical entity relationships in the channel being described. That is, the cellular wallet (490) may not in actuality be connected to the access control element (440) at all, nor involved in the call signaling path and in any protocol translation. The actual network routes, protocols and associated links for cellular wallet 490 access are not shown for clarity.

In some embodiments, on receiving the call request access control element (440) determines whether a call from MSISDN-A, transmitting address signals NNN is expected (i.e., record [A:NNN] exists), being set on the user activating the access control button 430. If such an expectation is met, access control element (440) may instruct MSC (480) to present a Ring Back Tone (RBT) to device A (450) and then, per the hook flash Signaling Protocol disclosed herein, momentarily instructs the MSC 480 to take the call OFF/HOOK and then momentarily thereafter, to replace the call back ON/HOOK in order to execute the transaction. Thus, In some embodiments the access control platform user experiences:

1. Instant Ring Back Tone followed by
2. Momentary Call Connect and Disconnect.

In some embodiments, telephony device (450) may then display a symbolically prefixed call with duration 00:01 seconds. In some embodiments, flash protocol thus presents both audible (Ring Back Tone) and visual (momentary connect) confirmation, where the call raises, connects and then drops in completion. hook flash signaling as disclosed herein generates a $N.NN Call Data Record (CDR) billing ticket on the MSC (480) for the star dialed digits NNN. In a prepaid cellular embodiment, this amount is debited to cellular wallet (490) substantially in real-time.

In some embodiments, on receiving confirmation from MSC (480) that the hook flash protocol completed successfully, confirming CDR generation, the access control element (440) may communicate with access control button (430) that the transaction was successful. On receiving successful indication (e.g. affirmative access permission indication), the access control button (430) may then change state, for example may present an affirmative icon such as a checkmark, to reflect payment completion before unlocking access to the digital service or the content purchased.

In some embodiments, upon a successful transaction completion, the access control element (440) may then record the access control platform transaction amount in the accumulative access control wallet 499 and record the amount due to the provider (less any switching and processing fees) in an access control wallet associated with the provider (not shown).

In some embodiments, upon receiving payment confirmation, the IAPP permits access to the requested content/service, completing the transaction. The access control element (440) may thus coordinate, transport and translate cellular signaling events into transaction events, synchronizing the events on the IN 460 with events on the internet. This signaling convergence thus seamlessly migrates cellular billing certificates into the cloud while maintaining an authoritative transaction record in the form of the CDR.

In some embodiments, since the device B (420) and the device A (450) may be the one and same smartphone device, the user may not have to manually enter the star address signals (*NNN) to dial. Rather, on touching the access control button (430), the access control button 430 may issue a command to the device A/B 420/450 to present the native or selected dialer on the telephony device (420/450), with the address signals corresponding to the price on the access control button 430 automatically entered. To automatically activate the dialer in this preaddressed manner, the access control button (430) embedded in webpages may have an associated "tel:" reference, for example:

<a href="tel:*025">*025</a>.

In some embodiments, while such a telephony URL reference in some embodiments opens the telephony dialer with the address already entered, the user may then be required to CONNECT the call (e.g. pressing the Green Phone Button). A cellular APP with requisite telephony call control permissions and associated access control platform logic, may exercise greater call control through an API to the native dialer, permitting a one touch connection. Regardless, the typical time elapsed from tapping a access control button to completing the payment transaction, is mere seconds.

In some embodiments, since the symbol key (470) (e.g. star, hash, ampersand, etc.) on cellular phone A (450), is thus logically bound and synchronized to an expectant, activated, individual access control button (430) on the Internet, access control platform delivers a virtual fingerprinted payment system. The unique mapping between symbol key and the access control button 430, permits simultaneous access control platform transactions, uniquely signaled and switched, albeit that every transaction may be uniformly presented and practically simultaneously signaled. As described above in FIG. 3 above, this mass atomic binding between symbol key and the access control button 430, is a function of the uniquely staged and expectant signals, embodied in the access control platform transaction protocol.

In some embodiments, up to millions of users or more who may be viewing the same access control button governing access to the same internet content on the same internet page, each requesting users to emit the same cellular signals at substantially the same time, are all switched independently and securely, since every such button is uniquely and logically coupled, in a 1:1 relationship to the known and identified MSISDN from which the star signals are expected. This secure digital cellular circuitry ensures, that when multiple cellular users are simultaneously transacting using the disclosed protocol, A can never dial and inadvertently pay B, since their "cellular wires" can never cross, so to speak.

In some embodiments, the bidirectional star button communications channel permits the access control platform to signal and visually alert the user. For example, if the user dials an incorrect series of digits to that which the access control element is expecting, that is where the [A:NNN] expectation fails to be met, the button may "shake" NO (e.g. animate left right and left) to indicate an incorrect payment attempt was made, and thereby signal the user to try again without incurring cost.

[FIG. 4B]

Figure 4B:
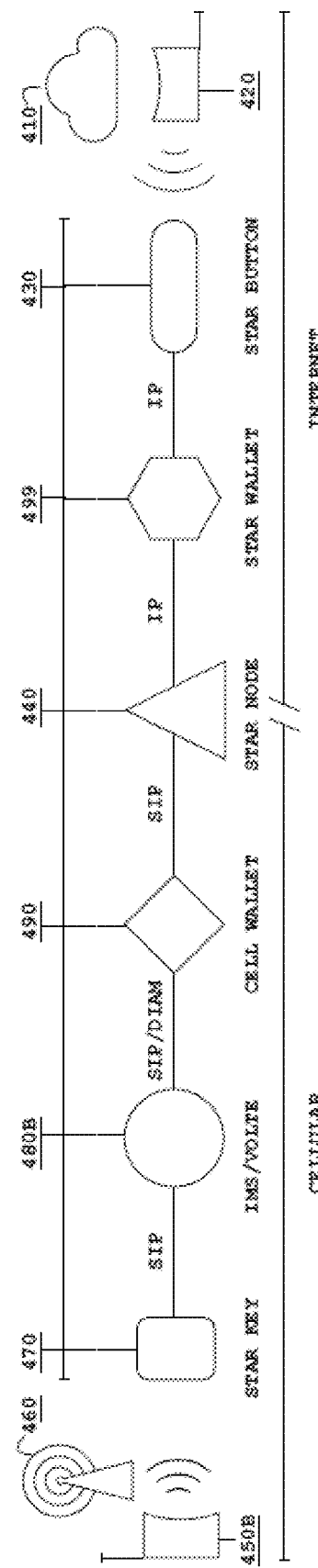
FIG. 4B is an illustrative non-restrictive example of a Packet Switched Star Logical Channel in accordance with at least some embodiments of the present disclosure.

FIG. 4B, which shares annotation with FIG. 4A, except where numeric labels are appended with the character "B", is a channel representation for an IMSNoLTE Packet Switched Telephony Network (480B) and associated User Equipment (450B).

In this IMSNoLTE embodiment the channel logically performs in the same sequence and series as described in FIG. 4A, the distinction being applied to the elements that are depicted to the left of the Cell WALLET (490), which may utilize SIP rather than ISUP signaling to setup the call, and which may utilize SIP and DIAMETER, rather than legacy SS7/MAP protocols for account management and credit verification.

[FIG. 5]

Figure 5:
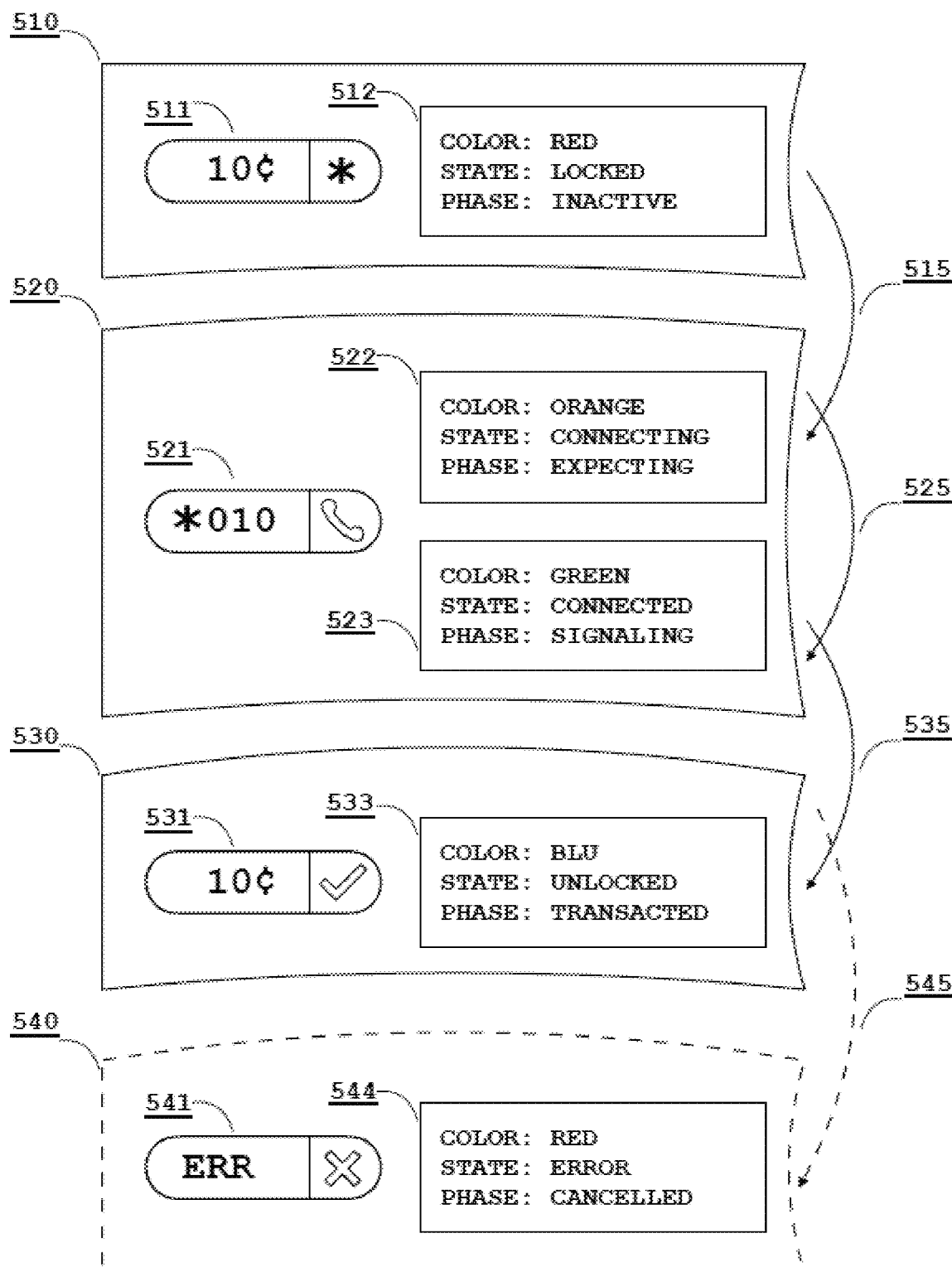
FIG. 5 is an illustrative non-restrictive example of an Action Button Event Transition Series in accordance with at least some embodiments of the present disclosure.

FIG. 5 illustrates a access control button transition series in accordance with one or more embodiments of the present disclosure. In the following series, it is assumed cellular MSISDN-A has been previously paired with the IAPP displaying the access control button 511.

In some embodiments, as described and disclosed in FIGS. 4A and 4B above, the access control buttons, being a self-contained user interface element communicatively coupled to the access control platform, overcomes a technical problem common to all transactional systems, which in some embodiments present separate screens or dialogs in order to communicate state. Separate user interfaces which switch the display context in order to communicate transaction progress, visually impair and operationally impact the user and the overall payment experience. The active, in channel, communication buttons disclosed herein, which contain all the payment communications and states in a single User Interface Element, uniquely overcome these current transactional design limitations.

In block u the access control button 511 is partitioned to display item price at left (10¢), and current icon (action/state) at right (*). On loading, the access control button 511 enters an initial state which In some embodiments displays as series 512:
 Color: RED, signaling the transaction is at a STOP
 State: Locked, barring access to the digital content/service
 Phase: Inactive.
Thus, 512 represents an inactive access control platform channel, coupled to a locked digital item for sale at a listed 10¢ sticker price.

In some embodiments, on activating the access control button 511, for example by tapping or clicking the access control button, the series transitions to block 520, wherein access control button 511 then establishes a communication with the access control platform to set up the payment expectation, which inter alia, records an association between cellular MSISDN-A and the payment amount, [A:010], as described above.

In some embodiments, the expectation further records and associates the provider and product identifiers for this button and the pending transaction as described in FIG. 3 (ledger 370). During this communication establishment, In some embodiments the access control button 511, now labeled 521, transitions (swivels) to the series 522:
 Color: ORANGE signaling a state SHIFT
 State: Connecting
 Phase: Expecting.

In some embodiments, during this 520 transition, the button swivels from displaying the price at left, to displaying the address signals *010 representing the transaction monetary suitable ($0.10) and displays telephone icon at right. In one embodiment the telephone icon indicates that a dial action is required. The color indicates the button is at signal SHIFT.

In some embodiments, displaying the price and the star (10¢ and *) in access control button 511 swivels or otherwise transitions to reveal the button reverse side displaying the dial string (*010) and phone icon in access control button 521. In some embodiments, the transition visually synchronizes the transition from sticker price to dial string, showing the direct mapping between the dollar ($N.NN) digits and the star (*NNN) address signals previously displayed.

In some embodiments, on successful communications establishment, the access control button 523 transitions to series 523, which in this signaling embodiment displays:
 Color: GREEN signaling GO
 State: Connected
 Phase: Signaling.

In some embodiments, at this stage the access control button 521 may prompt the user to dial the displayed digits. In some embodiments, this dial action is manually engaged on tapping the now green button. In another embodiment the dial action is automatically engaged on successful communications establishment.

In either case, when the device supports telephony functionality, the dial action invokes and launches the native telephony dialer with the dial string (*010) automatically entered, as described in FIG. 4 above. If the paired cellular device is physically distinct from the device presenting and displaying the access control button, the user may enter the short dial string (*010) manually on the cellular telephony device (e.g., smartphone/mobile phone).

In some embodiments, on dialing and thus emitting the expectant access control platform address signals (*NNN), from the paired MSISDN-A, the access control platform, now communicatively coupled to the active and connected access control button, verifies the transaction as described above. On successfully completing the transaction, the access control button 521 transitions to block 530, which in some embodiments swivels the access control button 531 again to display the original price at left (10¢) and a tick icon at right. In some embodiments, an audible and/or visual indicator may be emitted to confirm success, such as a coin drop sound or other indicator. In some embodiments, this transaction is signaled and completed in just one second, as described and illustrated below in FIG. 6. Series 533, in this signaling embodiment, visually confirms the completed transaction with:
 Color: Blue, signaling communications and transaction has completed.
 State: Unlocked, granting access to the digital content/service
 Phase: Transacted.

In some embodiments, a final (blue) transacted state affirmatively "nods" YES to the user by animating the button in an up, down and up sequence, to indicate approval. In some embodiments, sound bytes may also be played at each transition for audible alerts (e.g. the sound made when a coin drops into a glass tip jar). On successful payment the screen unlocks to reveal the purchased item. In a URL driven content access embodiment, successful payment may redirect the APP/Browser to the completion URL, displaying the unlocked content.

In some embodiments, if any error condition is encountered during any phase, the series may transition to block 540 where, In some embodiments, the button reverts to a red error state displaying the error encountered at left (e.g. transaction time out, incorrect number dialed, user cancelled etc.), together with a cross icon at right. In some embodiments the button may negatively shake, by animating left and right, to signal NO. The error series 544 may thus present:
 Color: RED, as in the transaction has stopped
 State: Error, indicating cause
 Phase: Cancelled, wherein the button may reset.

In some embodiments, the access control button, and the described transition series, present a highly interactive, responsive and contained payment signaling and processing channel. In some embodiments, the access control button is rendered in an iframe, that overlays the content, so as to appear to float above the providers page.

[FIG. 6]

Figure 6:
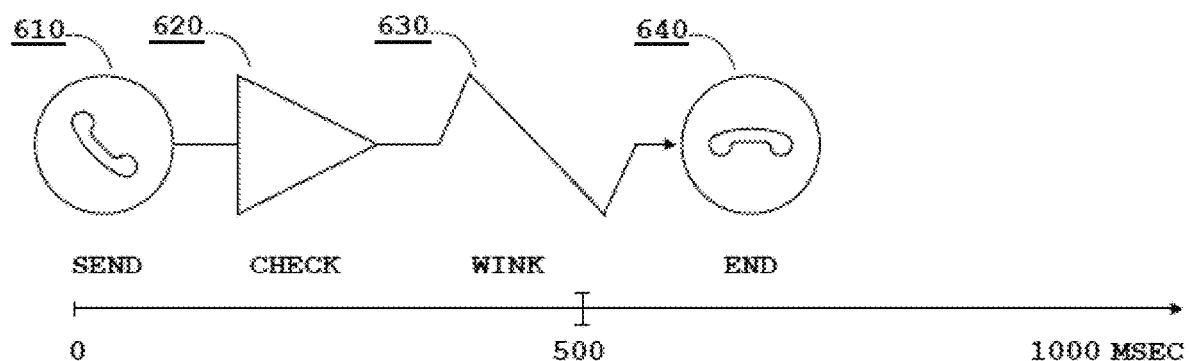
FIG. 6 is an illustrative non-restrictive example of an Action Millisecond Event Timeline in accordance with at least some embodiments of the present disclosure.

FIG. 6 depicts an example of an access control platform micro transaction switching timeline on a millisecond axis, highlighting the flash sub-second switching protocol in accordance with one or more embodiments of the present disclosure. In some embodiments, the time (T) elapsed between switching and billing elements are approximated for illustrative purposes and the timeline is not drawn to scale. Switching and verification is in some embodiments measured in single digit milliseconds.

T=0 msec:
At 610 the user presses SEND to emit access control platform address signals (*NNN) encapsulating the $N.NN transaction amount as disclosed.

T=10 msec:
At 620 the cellular network performs the AAA (Authentication Authorization and Accounting) procedure and on passing the Accounting CHECK, which verifies the account associated with the caller has sufficient credit to sustain the $N.NN charge, routes the call towards the access control platform.

T=20 msec:
At 630 the access control platform verifies that the *NNN address signals received from the cell are from the expected MSISDN-A and match the dollar amount on the access control button and on meeting that expectation, performs the WINK protocol, taking the call OFF/HOOK and then pauses for a suitable period of time, e.g. one second or less, such as 500 msec.

T=520 msec:
The access control platform returns the call ON/HOOK generating a one second cellular billing certificate on the cellular network for the $N.NN amount signaled, which the IN debits the cellular wallet.

T=521 msec:
In some embodiments, the access control platform credits an access control platform wallet associated with the access control platform and provider wallets associated with each provider.

The access control platform transaction is complete and the call ENDS (640). Total time elapsed is less than one second.

In some embodiments, the access control platform micro payment protocol thus may conduct payment on a micro second switched phone call. Further, since the access control platform payment protocol operates using the native telephony signaling channel, along a call setup and billing control path, and since it operates seamlessly using the existing digital cellular wallet, on any and all phones, the access control platform is invisible to the user (i.e., zero footprint).

[FIG. 7]

Figure 7:
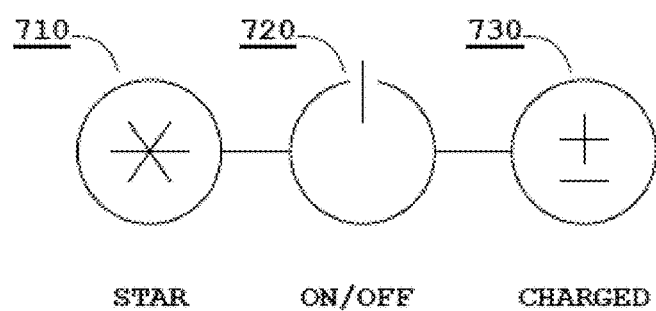
FIG. 7 is an illustrative non-restrictive example of an Action Event Representation Abstraction progression in accordance with at least some embodiments of the present disclosure.

FIG. 7 depicts an abstract charging view of the disclosed access control platform micro payment protocol in accordance with one or more embodiments of the present disclosure.

Item 710 depicts the telephony device A emitting the star address signals (e.g. *NNN) signaling payment for transaction value $N.NN.

Item 720 depicts the OFF/ONHOOK switching function (power icon) engaged on passing the Accounting check, that CONNECTS the call (going OFF/HOOK) and momentarily thereafter DISCONNECTS the call (returning ON/HOOK).

Item 730 depicts the charging function (plus/minus polarity) wherein the callers cellular wallet is debited (−$N.NN) and the access control platform System and provider wallets are credited (+$N.NN less any switching and processing fees).

In some embodiments, the access control platform payment protocol may similarly be depicted by the following text schematic:

(*)-/\\/-(+/−), where:
(*) represents the star address signals (*NNN)
/\ represents the OFF HOOK state
\/ represents the ON HOOK state
(+/−) represents the wallet charging transactions (+/− $N.NN).

[FIG. 8]

FIG. 8 is a flowchart depicting a prior art cellular billing. As shown in FIG. 8, users may be presented with a plurality of payment methods and are required to manually select their desired choice. In flow item 800, the IAPP presents a purchase price for the content or service. This purchase price is an information display rather than an active payment user interface element, to inform the user of the transaction amount. In flow item 801, the IAPP then presents a plurality of payment methods, by presenting a plurality of payment buttons that are logically coupled to the item and displayed purchase price. In flow item 802, the user selects the desired payment method by activating (e.g. tapping or clicking) the corresponding payment button. If the cellular payment button is selected, flow moves along the affirmative YES path to item 803. In flow item 803, the IAPP conducts the selected cellular billing method chosen by the user.

In some embodiments, the plurality of payment options introduces a manual decision making point and an impediment to the mass adoption and frictionless flow of micro payments, given that they are to be encountered with frequency, retarding the cellular billing method for low value (micro) transactions.

[FIG. 9]

FIG. 9 is a flow sequence that illustrates the cellular micro billing via the access control platform in accordance with one or more embodiments of the present disclosure. In some embodiments, as shown in the sequence of FIG. 9, embodiments of the present disclosure enable the removal of the manual payment selection by automatically selecting cellular billing for transactions that are below a maximum threshold amount. In some embodiments, a purchase price threshold of one dollar (USD) automatically selects and presents a cellular payment method button that displays the micro purchase price.

In flow item 900, if the content or service purchase price is below a predetermined threshold, flow moves along the affirmative YES path to item 901.

In flow item 901, the IAPP automatically switches the payment method to cellular and displays a cellular payment button that displays the micro purchase price. Thus, whereas, in the current state of the art as described in FIG. 8 above, the IAPP may present and display the purchase price separately from the access control button, given that there is a plurality of payment methods, the disclosed micro payment system and methods present a unified method and price in a single access control button determinant on the price being below a maximum threshold.

In flow item 902, if the user activates the access control button (e.g. access controller interface element), flow moves along the affirmative YES path to item 903, where the IAPP conducts the cellular payment method.

[FIG. 10]

FIG. 8 is a diagram depicting a prior art cellular billing interface.

IAPP screen 1000, displays content or service 1010 with a static (non-activating) purchase price element 1011 ($9.99), dotted, separate from a plurality of payment buttons and associated methods 1020~1030.

The plurality of payment methods may include options such as: Credit Cards (VISA), PayPal (PPAL), Apple Pay (APAY), Google Pay (GPAY) and Cellular Billing (CELL 1030).

The above display thus presents a user with a single item or service (1010) with a plurality of payment methods (1020), requiring the user to make a manual payment selection.

Figure 11A:
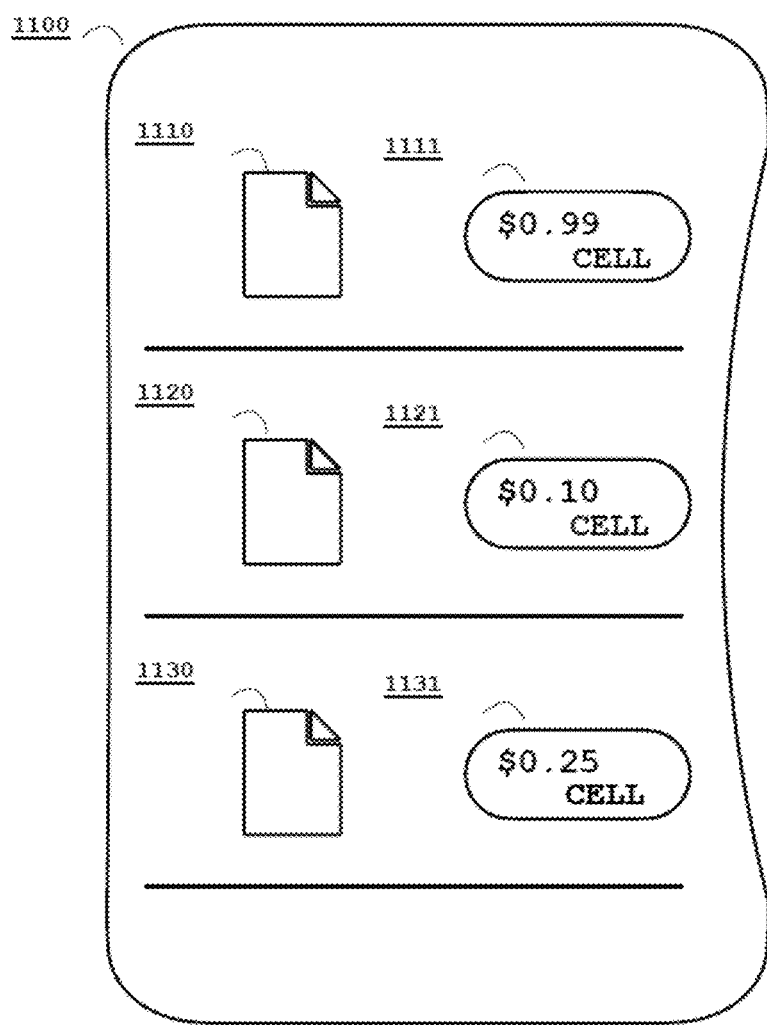
FIG. 11A is an illustrative non-restrictive example of a Singularity nature of an Activity Channel Method (a single activity channel) in accordance with at least some embodiments of the present disclosure.
Figure 11B:
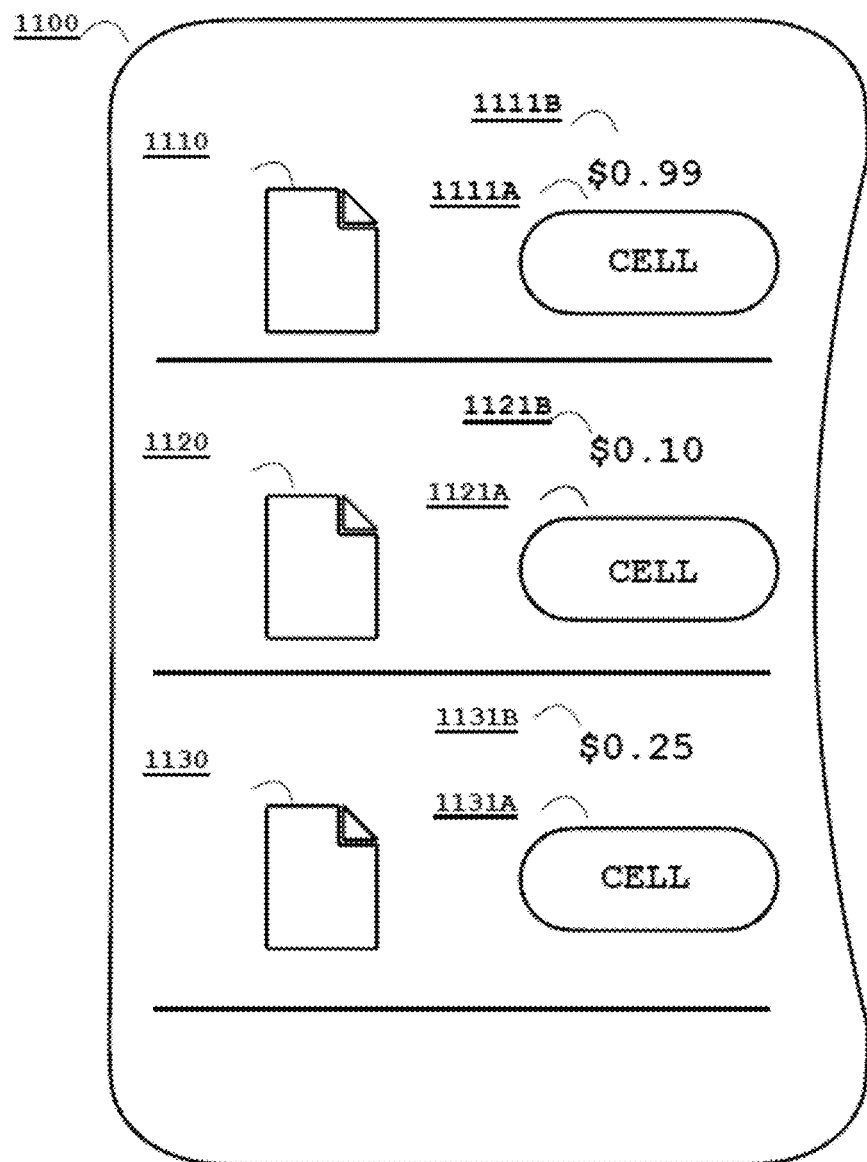
FIG. 11B is another illustrative non-restrictive example of a Singularity nature of an Activity Channel Method (a single activity channel) in accordance with at least some embodiments of the present disclosure.

[FIGS. 11A and 11B]

FIGS. 11A and 11B depict exemplary cellular micro access control application program interfaces enabled by the access control platform in accordance with one or more embodiments of the present disclosure. At least some embodiments of the present disclosure enable the removal of the manual payment selection requirement by automatically switching to cellular access control billing for transactions that are below a maximum threshold amount (e.g. $1.00). In providing the technologically improved access control application program interfaces configured for a particular access-restricted item down to a single selection, in at least some embodiments, the exemplary disclosed systems and methods of the present disclosure provide at least one technological solution that mesh with the website design which in some embodiments renders more than one access-restricted content item, article, link and/or service per webpage.

In some embodiments, as shown in FIG. 11A, display screen 1100 thus shows a plurality of access-restricted items for purchase each with a single directly associated cellular payment access control button (e.g. access controller interface element) displaying the micro purchase price that may utilized as access code. For example, item 1110 with a $0.99 access controller interface element 1111, item 1120 with a $0.10 access controller interface element 1121, item 1130 with a $0.25 access controller interface element 1131, and so on.

In some embodiments, as shown in FIG. 11B, display screen 1100 also shows a plurality of access-restricted items for purchase each with a single directly associated cellular payment access control button (e.g. access controller interface element) displaying the micro purchase price that may utilized as access code. For example, item 1110 with an access controller interface element 1111A and a $0.99 access code label 1111B, item 1120 with an access controller interface element 1121A and a $0.10 access code label 1121B, item 1130 with an access controller interface element 1131A and a $0.25 access code label 1131B, and so on. In some embodiments, access code label is displayed, for example, without limitation, in 1:1 ratio with access controller interface element, thereby providing another technological solution that ensure a singular logical and visual relationship between access code and access controller interface element. In some embodiments, access code label is displayed, for example, without limitation, in a visual vicinity (e.g. separating distance under 2 inches, separating distance under 1 inch, separating distance under 0.5 inch, separating distance under 0.2 inch, etc.) of access controller interface element, thereby providing another technological solution that ensure a singular logical and visual relationship between access code and access controller interface element.

[FIG. 12A]

Figure 12A:
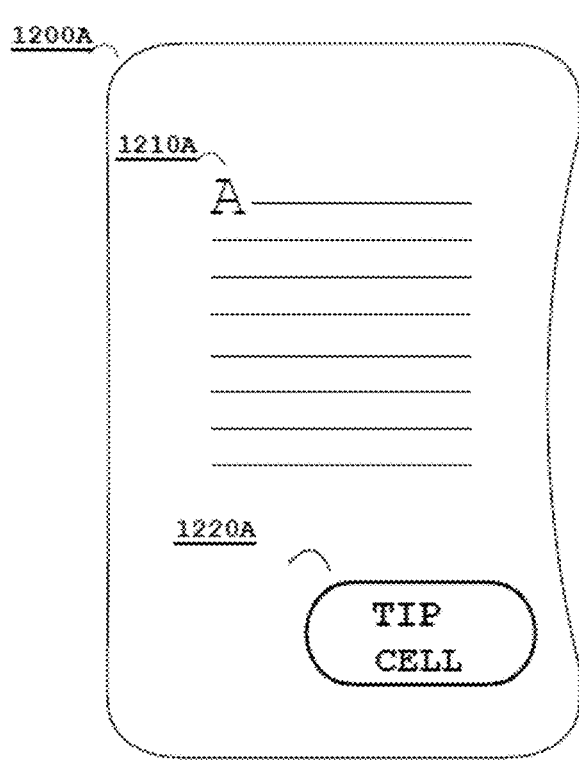
FIG. 12A is an illustrative non-restrictive example of an Action Schematic in accordance with at least some embodiments of the present disclosure.

FIG. 12A illustrates a Micro Gratuity Scheme using the access control platform, where the IAPP permits the user to access and consume the content before requesting any payment in lieu of a gratuity in accordance with one or more embodiments of the present disclosure. In some embodiments, an IAPP screen 1200A displays content 1210A (e.g. an article A), that is unlocked for consumption, together with a cellular tip access control button 1220A. A user may thus determine what value they derive from the freely accessible content and what reward they feel is due to the producer (if any).

[FIG. 12B]

Figure 12B:
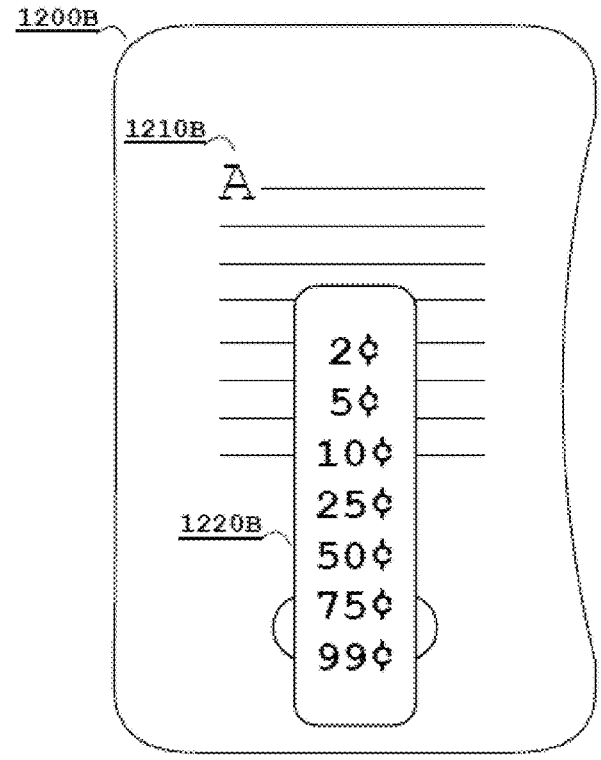
FIG. 12B is an illustrative non-restrictive example of yet another Action Schematic in accordance with at least some embodiments of the present disclosure.

FIG. 12B illustrates a gratuity menu 1220B in Micro Gratuity Scheme using the access control platform in accordance with one or more embodiments of the present disclosure. In some embodiments, the gratuity menu 1220B may present a plurality of micro amounts on activating (e.g. tapping/clicking) the tip access control button (1220A). The user may then select an amount to contribute towards the content production. In some embodiments the IAPP may display the average or the most common gratuity to guide user selection. On selecting the gratuity amount, the cellular payment is conducted as disclosed.

In some embodiments, the micro gratuity scheme inverts the content commercialization proposition, replacing it with an honor system where value may be freely determined by the consumer, the marketplace, rather than dictated by the producer.

[FIG. 13]

FIGS. 13A and 13B illustrate alternate views of FIGS. 10 and 11, again highlighting at least one technological distinction between a technical shortcoming and at least one technological solution in accordance with at least some embodiments of the present disclosure.

FIG. 13A shows a technological shortcoming of a circuitry that is a payment stack which presents a plurality of payment methods from which the user is required to manually select. In one embodiment, as shown in FIG. 13B, at least one technological solution of the present disclosure establishes an access control micro circuitry that may display an automatically assigned, single activity channel 1310, determinant, for example, without limitation, on the purchase price being below a threshold amount.

[FIG. 14]

Figure 14:
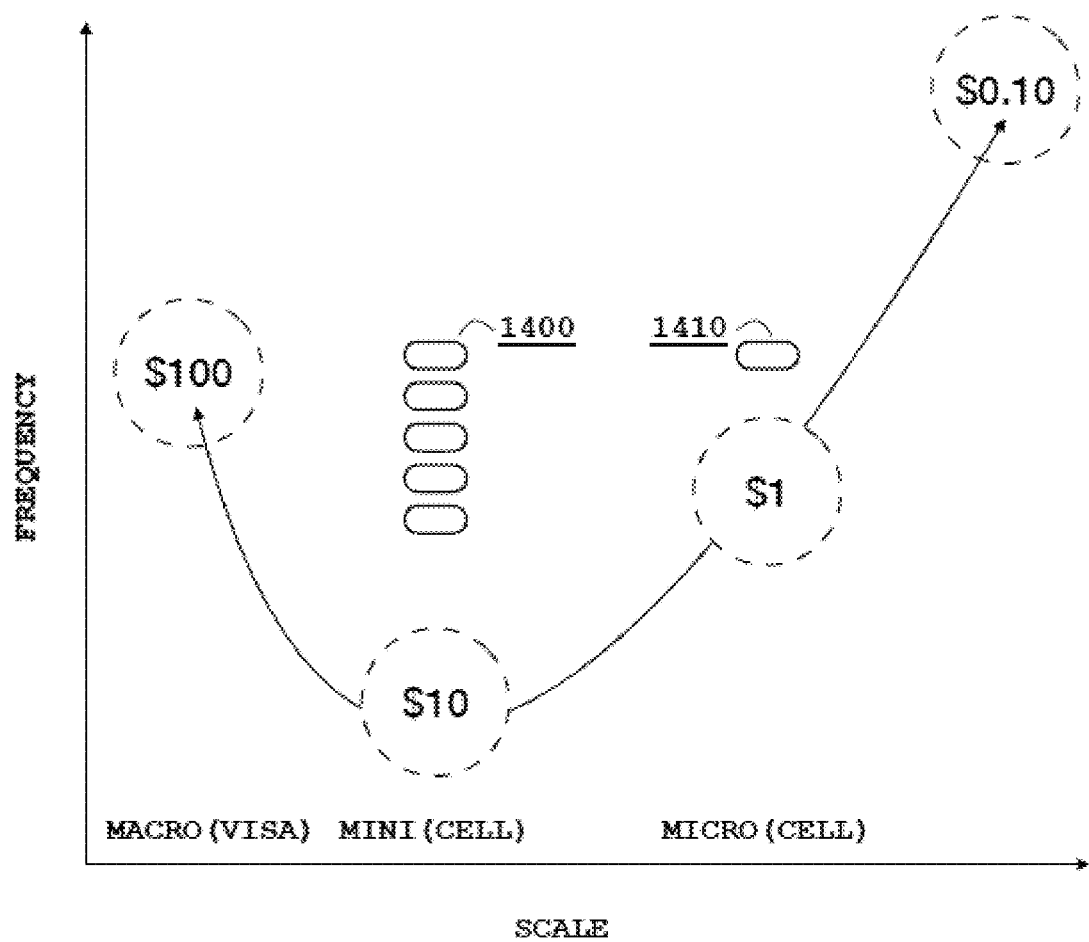
FIG. 14 is a comparative graph illustrating a result of at least one technological improvement projection in accordance with at least some embodiments of the present disclosure.

FIG. 14 graphically depicts a resultant transactional distribution curve, plotting frequency against scale, when a plurality of payment methods and options 1400 are presented for MACRO and MINI amounts versus a single cellular payment method 1410 presented for MICRO amounts.

The low frequency for MINI CELL transactions (e.g. $10) is principally due to the fact that these transactions have to compete with a plurality of more entrenched, renowned and habitually used payment methods as described above.

The high frequency MICRO payment projection is based on the frictionless singular cellular payment method and the positive psychological impact of ultra-low transactional values (e.g. 10¢).

The MICRO payment does not encumber the user with payment method choice. Rather, it seamlessly and swiftly directs all micro payments along an express cellular checkout lane, removing all purchase decision making impediments.

[FIG. 15A]

Figure 15A:
FIG. 15A is an illustrative non-restrictive example of a processing algorithm utilizing cellular communication signals in accordance with at least some embodiments of the present disclosure.

FIG. 15A depicts an example custom rating model of a IN billing element programmed to use the custom rating model to determine communication tariffs (charge) using the address signals of a call in accordance with one or more embodiments of the present disclosure. In some embodiments, the custom rating model may include a dynamic (continuous) computational billing matrix, mapping any star N address signals to its direct monetary suitable as follows:

Row 151A, two *NN digit address signals parsed into a min/max 0/$0.99 charge;

Row 152A, three *NNN digit address signals parsed into a min/max 0/$9.99 charge;

Row 153A, four *NNNN digit address signals parsed into a min/max 0/$99.99 charge;

Row 154A, five *NNNNN digit address signal parsed into a min/max 0/$999.99 charge;

Row 155A, any *N series digit address signal parsed into a min/max 0/N¢ charge; and Row 156A, any N series up to a 5 digit address signal parsed into a min/max 0/N¢ charge.

In some embodiments, there may be a 156A digit limitation, e.g. a limitation of up to 5 digits. Such a limitation, in some embodiments, is to ensure that non star dialed micro payment address signals do not intersect with the subscriber telephone number space.

In some embodiments, the access control platform thus presents users with a highly transparent billing protocol, since the dialed digits equate directly to the cost of the transaction, digit for decimal digit.

In some embodiments, a user may dial any payment amount using the above signaling method and notation. In some micro payment embodiments, two digits (NN), enumerating and encapsulating payments between zero and one dollar ($0.01 to $0.99), may enable the technical solutions to the technical problems described above, including an efficient and verifiable micro transaction with an authoritative record in the form of the CDR. In some embodiments, any other suitable number of digits may be used, such as a three digit embodiment (NNN) may best serve to clarify a dollar and cents notation, for example where 10¢ may then then presented as *010 rather than *10, to avoid any misinterpretation as to the actual transaction value (e.g. where *10 may be construed as signaling $10).

[FIG. 15B]

Figure 15B:
FIG. 15B is an illustrative non-restrictive example of a static state processing model matrix utilizing cellular communication signals in accordance with at least some embodiments of the present disclosure.

FIG. 15B depicts additional detail for the example custom rating model of a IN element programmed to use the custom rating model to determine call tariffs using the address signals of a call in accordance with one or more embodiments of the present disclosure. In some embodiments, the custom rating model may present a static (discrete) micro billing matrix, or rating table, matching two (NN) or three (NNN) digit address signals to their direct monetary suitables.

Row 151B: address signals *00 or *000 translate into a $0.00 charge;

Row 152B: address signals *01 or *001 translates into a $0.01 charge;

Row 153B: address signals *02 or *002 translates into a $0.02 charge;

Row 154B: address signals *05 or *005 translates into a $0.05 charge;

Row 155B: address signals *10 or *010 translates into a $0.10 charge;

Row 156B: address signals *25 or *025 translates into a $0.25 charge;

Row 157B: address signals *50 or *050 translates into a $0.50 charge;

Row 158B: address signals *75 or *075 translates into a $0.75 charge; and

Row 159B address signals *99 or *099 translates into a $0.99 charge;

Thus, a user may dial *01 (star zero one) to pay 1c from their cellular wallet. Similarly, the user may dial, e.g. *02, *05, *10, *25, *50, *75, *99 to respectively pay 2c, 5c, 10c, 25c, 50c, 75c or 99c. For larger amounts, users may dial a longer series of matching digits as previously shown. For more discrete amounts, users may dial the intervening representative digits (e.g. *03=3¢).

Further, in some embodiments, users may dial a dollar normalized notation, such as *001, *002, *005, *010, *025, *050, *075, *099 for the matching denominations. In some embodiments users may dial a short digit sequence representing the monetary suitable, without requiring a symbolic (e.g. star) prefix, as in dialing 001, 002, 005, 010, 025, 050, 075, 099, wherein all such three digit telephone numbers may then be automatically translated into a star or suitably prefixed number by the network switching and controlling elements, in order to route them to such a micro payment processing platform.

In some embodiments, the above billing modification is achieved by manually programming elements of the IN to populate the IN rating tables, stored in non-transitory memory, with entries to support the permissible discrete micro payment amounts (signals). That is for each micro payment the IN offers (e.g. 1¢, 2¢, 5¢, 10¢ etc.) a new entry is inserted into the rating table that corresponds to the address signals for these discrete micro amounts (e.g. rows *001=>1¢, *002=>2¢ etc.). Thus, to support the micro payments in table FIG. 15B above, elements of the IN may be programmed to add nine new rows to the rating tables.

In some embodiments, a non-transitory memory may include any medium and/or mechanism for storing or transmitting information in a form readable by a machine (e.g. a computing device). For example, a machine-readable medium may include read only memory (ROM); random access memory (RAM); magnetic disk storage media; optical storage media; flash memory devices; electrical, optical, acoustical or other forms of propagated signals (e.g. carrier waves, infrared signals, digital signals, etc.), and others.

In one or more embodiments, the IN billing system programmatically determines the rating tariff to be applied by computing the integer suitable of the *NNN address signals. In one embodiment a computation may for example include:

1) extracting the NNN digits using a string operation on the *NNN address signals to remove the symbolic prefix; and
2) converting the resultant NNN string to integer format using a PARSEINT type operation, resulting in the number of cents (NNN) represented by the *NNN address signals.

For example, assuming the micro payment protocol is defined by the fixed three digit notation (NNN) the above signal to tariff conversion in a packet switching network embodiment may be achieved by, for example, referencing the SIP URI/To String headers, and executing the string operations as in the following JavaScript code:

parseInt(SIP_To.substring(1,4)).

In some embodiments, combining the string operations as set forth above may extract the leading portion of the address signals that enumerate the charge to be applied, without parsing any additional (meta) data that may be signaled, that are for transporting to and interpretation by the access control platform internally.

In some embodiments, the charges may be collected in a suitable currency and/or cryptocurrency. In some embodiments, transfers of monetary value across the access control platform may be performed with the suitable currency and/or cryptocurrency (e.g. a suitable digital token and/or coin), while charges imposed by the IN may employ real/fiat/national currency.

In some embodiments, per the above notations, users may dial any amount, for example, between zero and one dollar (including dialing *000 for an audited transaction that bares no cost) however the common denominations as listed, may be sufficient. One benefit to providing a discrete set of values is to reduce the variance recorded and displayed in the telephone dialed history (e.g. a list of recent calls).

In some embodiments, the hook flash protocol may enable the transactions over a ring and switch funds:

From: A PLUS E.164 [+MSISDN] Cellular Sender Wallet ([+A] (or [A])

To: B STAR [*MSISDN] Internet Receiver Wallet [*B].

In some embodiments, the receiving access control platform wallet is addressed per the disclosed systems and methods, which, in some embodiments, utilizes the device registration and/or pairing techniques described above to identify and record the receiver MSISDN for the internet content provider.

In some embodiments, the use of the cellular and internet wallets enables a fungible tokenization, which transports and transforms cellular Network Access (Air time) into internet Content Access (View time). In some embodiments, the use of the cellular and internet wallets facilitated by the disclosed symbolically prefixed signaling and switching advances which succeed in migrating the authoritative and irrevocable cellular billing certificates (CDRS), the core cellular billing engine, to the cloud. In some embodiments, the CDR certificates that transfer across to the cloud (Internet CDR certificates (ICDRS)), retrofit the World Wide Web with Micro Billing Functionality.

[FIG. 15C]

FIG. 15C tabulates and illustrates different address signal encoding schemas in some embodiments. In one circuit switched network embodiment, address signals are Binary Coded Decimals (BCD) transported in pairs (Octets), wherein each signal is expressed as Hexadecimal. ISUP Address signals incorporate header information to define the overall address length, whether the address comprises an even or odd number of signals, and where odd length addresses use BCD zero (0000) as a filler.

Since such address signals are encoded in 4-bit Hexadecimal notation, which can represent 16 discrete signals, and given that decimal dialed digits require just ten (0-9) permutations, as depicted in rows 150C through 151C, Overdecadic Signals thus describe the six remaining characters over and above the ten decimal digits, as depicted in rows 152C through 157C.

In a Telephony BCD notation embodiment, these overdecadic signals may represent the characters "*#ABC" and a stop (ST) signal, by their BCD numerical equivalents (decimal digits 10-15). Thus, in a Telephony BCD encoding embodiment, the Star (*) symbol may be encoded as the character "A" as represented by hexadecimal (binary) 1010. In a Natural BCD notation embodiment, these overdecadic signals may similarly represent the characters "ABCDEF", where F indicates the terminating, address complete, signal Thus in a circuit switched network embodiment a controlling or billing element may convert the 4-bit Hexadecimal address signals into decimal integer notation, discarding any overdecadic signals, in order to extract and determine the charge to apply.

In some packet switched network embodiments, address signals are encoded in 8-bit ASCII notation, for example as represented by the SIP strings in the SIP URI and the SIP To headers. Thus in a packet switched network embodiment, a controlling or billing element may convert the 8-bit ASCII address signals into decimal (integer) format in order to extract the enumerated charge.

[FIG. 16]

Figure 16:
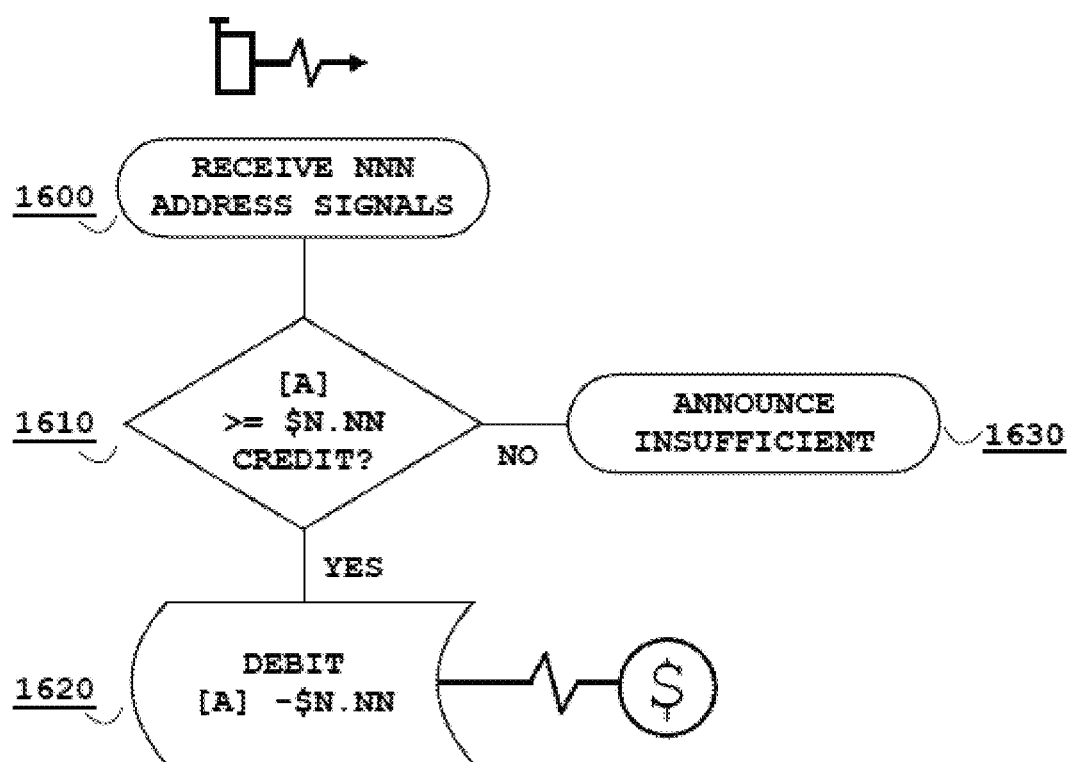
FIG. 16 is an illustrative non-restrictive event/action flow chart of a cellular communications protocol in accordance with at least some embodiments of the present disclosure.

FIG. 16 presents a flow sequence describing a step that debits the cellular wallet with the monetary suitable of the address signals, and which then enables the internet micropayment transaction to progress to completion in accordance with one or more embodiments of the present disclosure.

In flow item 1600, the network receives the NNN address signals per the notations described in FIGS. 15A and 15B above. The call setup request progresses through the OBCSM and AAA (Authentication, Authorization and Accounting) steps, the latter determining whether the sender (caller) has a credit balance sufficient to sustain the suitable $N.NN charge as disclosed.

In flow item 1610, if the caller has sufficient cellular credit to process the dialed transaction, flow progresses along the affirmative YES path to item 1620. If the caller has insufficient cellular credit to process the dialed transaction, flow progresses along the negative (NO) branch to item 1630.

In flow item 1620, on determining cellular credit sufficiency, the $N.NN amount is debited (or deducted) from an account associated with the caller, herein the CELL A Wallet [A]. This fundamental step completes the cellular micro payment component of the internet transaction and is achieved by HOOK FLASH (WINK) signaling as disclosed and described above.

In flow item 1630, on determining cellular credit insufficiency, In some embodiments the network may play an error announcement, for example, "You have insufficient credit to complete this call". The network may further direct the caller to replenish their account or may redirect the call to a service platform accepting payment to replenish the account.

[FIG. 17]

Figure 17:
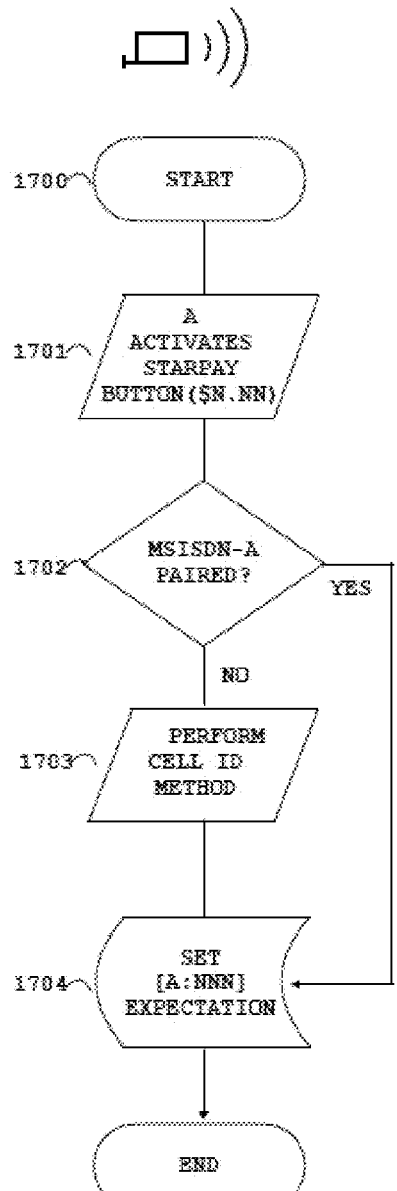
FIG. 17 is an illustrative non-restrictive event/action flow chart of an Expectation cellular communications protocol in accordance with at least some embodiments of the present disclosure.

FIG. 17 depicts a flow chart schema for setting up an access control platform expectation in accordance with one or more embodiments of the present disclosure.

In flow item 1700, IAPP requests an access control button using a published API that communicatively couples with the access control platform, to control access to digital content or service with sticker price $N.NN.

In some embodiments, if the IAPP has previously identified and paired an MSISDN, such identifying information is passed by parameter into the API.

In flow item 1701, user A activates the access control button, for example by tapping or clicking the access control button.

In flow item 1702, the access control platform checks whether the IAPP has passed cellular identifying information (e.g. the registration and/or pairing techniques described above). In some embodiments, if an X/MSISDN has not been communicated, flow progresses along the negative NO branch to step 1703. If an X/MSISDN has been communicated flow progresses along the affirmative YES path to step 1704.

In flow item 1703, the access control platform performs a registration and/or pairing technique to securely determine a cellular identity.

In flow item 1704, the access control platform sets a transaction expectation by recording (storing) the [A:NNN] entry in a datastore or ledger. This record thus sets an expectation to receive signals NNN from telephony device MSISDN-A, matching the activated access control button transaction from the registered and paired telephony device.

[FIG. 18]

Figure 18:
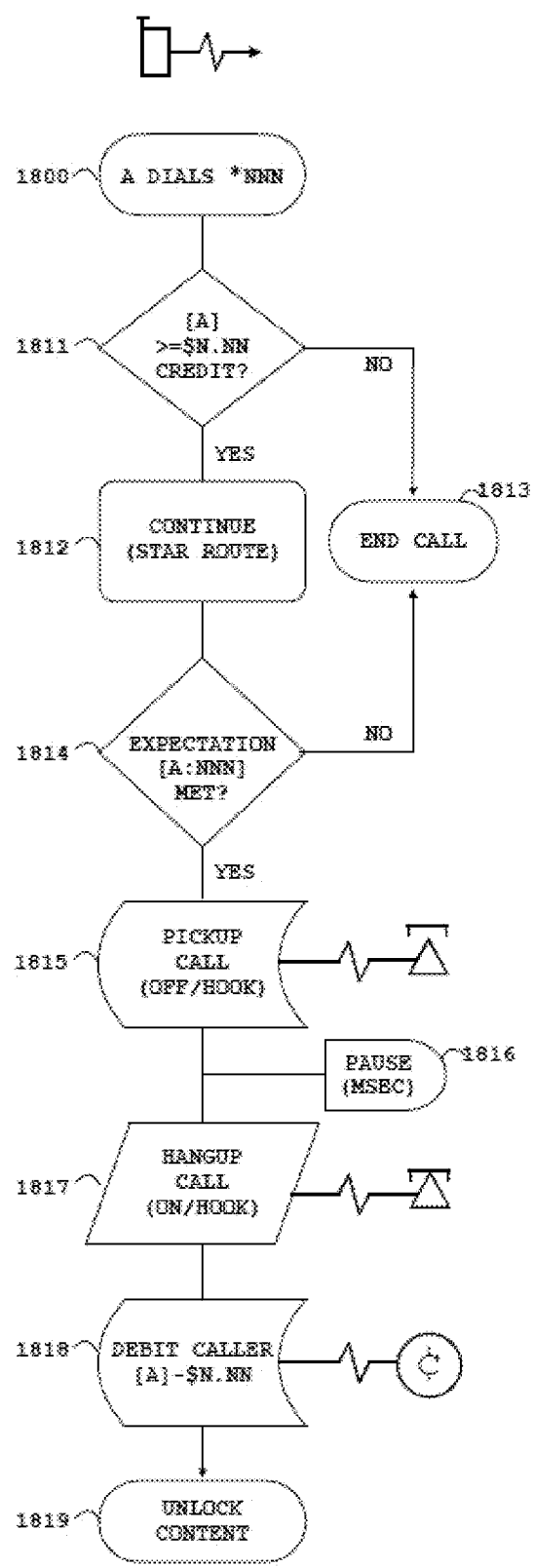
FIG. 18 is an illustrative non-restrictive event/action flow chart of a cellular communications protocol in accordance with at least some embodiments of the present disclosure.

FIG. 18 depicts an exemplary flow chart schema for processing an expected access control platform transaction, setup per FIG. 17 above, in accordance with one or more embodiments of the present disclosure.

In flow item 1800, on activating the access control button, the access control button may progress through a transition series as described in FIG. 5 above. In some embodiments, one transition may present the telephone number to dial in order to conduct the access control platform transaction.

In this example, where the access control platform transaction amount presented in the access control button is listed as $N.NN, per the disclosed systems and methods the button transitions to display a *NNN dial address.

In some embodiments, where the internet device A and the telephony device MSISDN-A are one and the same device (e.g. smartphone) the user may tap the button to activate the telephone dialer on the telephony device.

In some embodiments tapping the access control button thus causes the access control button to emit an instruction to the device to open the default, or the selected telephone dialer, with the *NNN address signals automatically entered. In some embodiments, where the telephony device MSISDN-A is distinct from the internet device A, the user may manually input the *NNN address signals to dial. Once the address signals are entered into the telephone dialer the user may press the CONNECT (e.g. the green phone button) to emit the signals.

In some embodiments, on receiving the call setup request containing the address signals, the cellular network performs the AAA (Authentication, Authorization and Accounting) steps.

In flow item 1811, the Accounting verification determines whether the cellular wallet or account [A] associated with caller A has sufficient credit ($N.NN per the disclosed signals to currency direct mapping), in order to permit the call setup to mature and route to its destination. That is, to CONTINUE routing the call towards the access control platform.

Thus, in some embodiments, access control platform calls may only be permitted to route and reach the access control platform if the caller has passed the requisite credit verification PIC (Point in Call). That is, the cellular account [A] associated with the caller is verified to contain sufficient funds required to cover the monetary suitable enumerated in the address signals as disclosed. Thus, all access control platform transactions are consequently preapproved and gated on established telephony accounting protocols which may verify credit sufficiency before maturing a call and routing to completion.

In some embodiments, if cellular account [A] has a balance less than $N.NN, per the NNN address signals, the flow branches along the negative NO path to flow step 1813, where In some embodiments the network announces the insufficient credit condition and terminates the call.

Figure 19A:
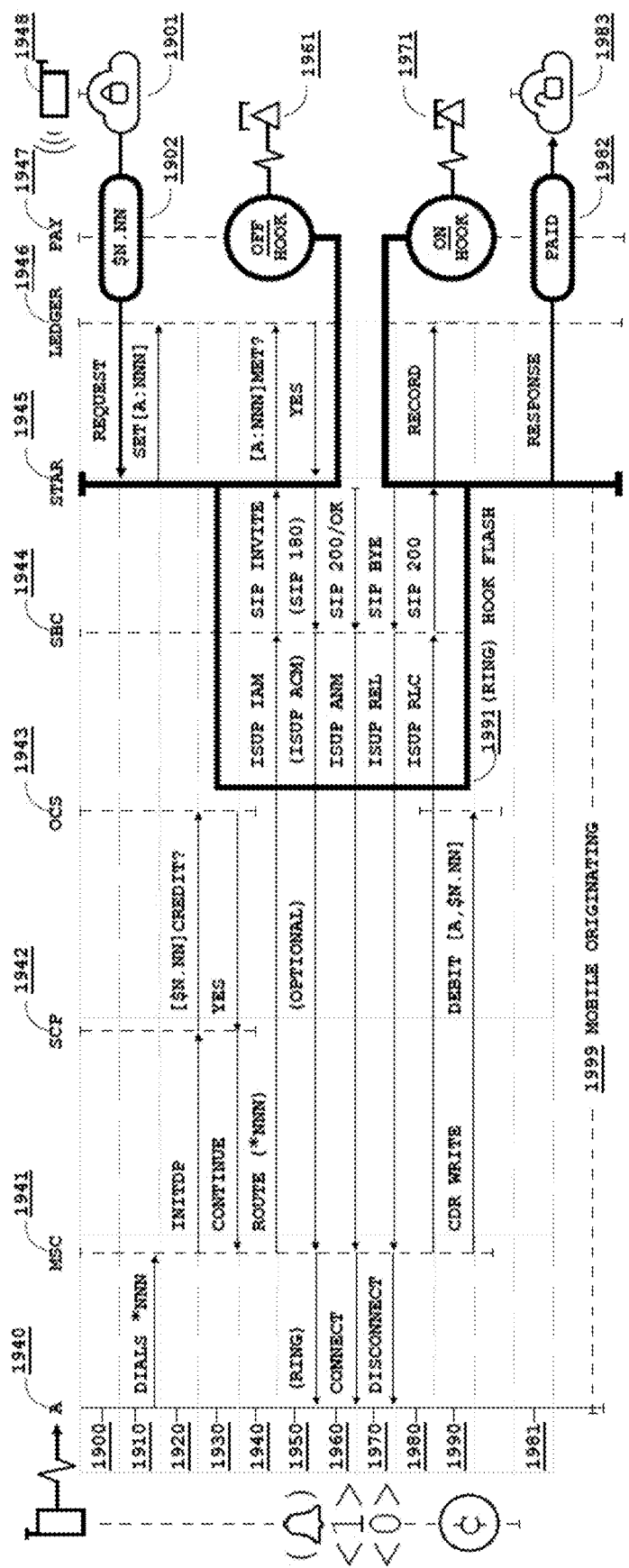
FIG. 19A is an illustrative non-restrictive example of a Circuit Switched Cellular Communication Flash Signaling protocol in accordance with at least some embodiments of the present disclosure.

In some embodiments, if account [A] has a balance greater than or equal to the $N.NN signals then flow progresses along the affirmative YES path to flow item 1812, where the network is commanded to CONTINUE routing and setting up the call along the star path towards the access control platform, as described in greater detail below (FIG. 19A).

In flow item 1814, on receiving the call setup request the access control platform checks whether an expectation for the requested transaction exists and is met. That is, whether a record exists that, inter alia, associates MSISDN-A with address signals NNN. If such an expectation exists and is thus met, flow progresses along the affirmative YES path to flow item 1815. If no such expectation exists, flow branches to the negative NO path to item 1813.

In some embodiments, in addition to binding the anticipated caller MSISDN-A to the series of expected address signals (NNN), the micro payment expectation further associates and records a provider access control platform wallet [MSISDN-B] and SKU identifying the content or service controlled by the actively selected access control button bearing the $N.NN price point. This reversed, BA addressed expectation, set prior to the user signaling the micro payment, enables the access control platform to bind the caller's internet device to the content, the content consumer to the content producer, and to process only matching, valid, active and expected transactions to completion.

In some embodiments, the expectation may ensure that if a user dials an incorrect price, by dialing a series of decimal digits that do not match the actively displayed SKU price as taught by the methods and systems disclosed herein, and even if the user has sufficient credit to cover the erroneously dialed transaction, the access control platform can reject rather than accept the call, thereby not generating a CDR and not executing an erroneous micro payment transaction.

In some embodiments, matching incoming access control platform calls to an expectation as described, enables technical improvements including both reverse binding the provider and the consumer, as well as preventing erroneous transactions being conducted against the callers account, since if the transaction is not expected (anticipated) it is not executed.

In some embodiments, on meeting the expectation, the access control platform commands the network to play RBT to the caller (not shown). Playing RBT gives audible confirmation that the transaction has been greenlighted.

In flow item 1815, the access control platform performs a telephony hook flash, a short duration OFF HOOK signaling event, taking the call OFF HOOK in order to begin the transaction recording.

In flow item 1816, the access control platform, In some embodiments, pauses for, e.g. between 500 msecs and 1 second, in order to generate at least a one second call duration.

In flow item 1817, the access control platform then returns the call back ON HOOK to complete the CDR recording.

In flow item 1818, on successfully completing the hook flash signaling protocol as described in FIG. 3 above, the network records a CDR for the transaction which debits cellular account [A] with the $N.NN signaled transacted amount, thereby completing the cellular component of the transaction.

In flow item 1819, on receiving confirmation that the network successfully disconnected the call, per the disclosed hook flash protocol, the access control platform updates an access control platform ledger to reflect the successful payment, crediting the internet access control platform system [*] and provider [MSISDN-B] wallets and communicating transaction completion to the access control button. On receiving a successful transaction communication, the access control button may transition to a completed state (ticked), and access to the purchased digital content or content and/or service may be unlocked, allowed the user to navigate to the content and/or service via the IAPP and/or web browser.

[FIG. 19A]

FIG. 19A is a control scheme corresponding to the flow methodology presented in FIG. 3 illustrating in greater detail a sequential signaling step ladder for the disclosed micro payment system and method in accordance with one or more embodiments of the present disclosure.

In flow item 1900, at access control element 1945, internet device 1948 requests access to digital content in the cloud (1901) that requires payment and is consequently lock protected as indicated. The content producer utilizes a suitable API to render an access control button (1902) on the display of internet enabled device 1948, requesting payment at the listed sticker price ($N.NN). In this example it is assumed that content provider has previously registered an associated MSISDN (B) as a provider identity, e.g. using the registration and/or pairing techniques described above.

On requesting the access control button 1902, the access control button API communicatively couples to access control element (1945), passing parameters that describe the characteristics of the access control button 1902, including without limitation In some embodiments, the dollar amount, provider identity, SKU, button style, redirect URL on payment completion, etc.

In this schematic, it is assumed the IAPP or the browser presenting the Internet hosted content/service has registered and paired with cellular identity MSISDN-A of user telephony device A (1940), as described above. In some embodiments, the pairing logically couples the access control platform amount presented in the access control button 1902, as displayed on internet device 1948, with the registered cellular identity MSISDN-A, uniquely binding and staging the pending transaction.

Thus, on receiving the access control button 1902 metadata via the API, in flow item 1910 at the access control element 1945, the access control element (1945) in turn sets (records) a pay expectation [A:NNN] as described in FIG. 3 above, by access control ledger 1946. While the schema depicts the access control button 1902 in direct communication with the access control element 1945, other access control platform elements may be associated and traversed in this communication. Thus, an access control button 1902 REQUEST, results in an access control platform EXPECTATION being SET.

While the access control button 1902 request itself may precipitate this expectation, in practice, the expectation may be deferred to button activation (selection) given that a plurality of access control buttons 1902 may be displayed. While a user may select multiple micro pay items to purchase, creating an accumulative payment total (the total sum over all the selected items), such a plural pay method may defer the expectation, so as to record the expected sum total of the pending transaction. The disclosed methods and systems governing button presentation and state management, are described in greater detail in FIG. 5 above, which illustrates a button transition series In some embodiments.

In flow item 1910 at the access control element 1945, mobile device A (1940) dials the access control platform signals *NNN, transmitting a Mobile Originating (MO) call to a servicing switching element (e.g. MSC) 1941. The setup message contains the *NNN address signals in addition to other call parameters. The MSC enters an OBCSM encountering an INITDP.

In flow item 1920, the INITDP establishes a call control dialog between the MSC 1941 and the Prepaid Service Control Point (SCP) 1942, the address of which, in some embodiments, is recorded in the SIM Originating Camel Subscription Information (O-CSI) in the MSC/VLR 1941.

In a Customized Applications for Mobile Networks Enhanced Logic (CAMEL) setting, the system may employ standards that work on a Global Systems for Mobile Communications (GSM) core network or the Universal Mobile Communications System (UMTS) network. In a CAMEL O-CSI embodiment, MSC 1941 has an associated gsmSSF (GSM Service Switching Function), and SCP 1942 is referred to as the gsmSCF (GSM Service Control Function).

SCP 1942 is configured to perform a credit verification for user A, for example, by querying an Online Charging System (OCS) 1943, or a Prepaid Billing System, to determine whether an account associated with device 1940 has sufficient credit to complete the call (i.e., a positive balance greater than or equal to $N.NN in this example). While SCP 1942 and OCS 1943 are depicted as separate elements, they may be the one and same logical or physical element, they may incorporate additional billing elements, and they may embody both call and billing control logic.

In flow item 1930, in response to the credit verification check, the OCS 1943 may respond to SCP 1942 that an account associated with device 1940 has SUFFICIENT credit to complete the call. In response to the credit sufficiency, the SCP instructs the MSC 1941 to CONTINUE the call.

It is important to note, that while figures in some embodiments may herein illustrate a controlling and/or billing element issuing a CONTINUE command, instructing a switching element to continue routing and progressing the call as originally signaled, in some networking embodiments a controlling or billing element may modify the symbolically prefixed address signals, and subsequently issue a CONTINUE with modified arguments instruction.

For example, in a Telephony BCD encoding schema as described in FIG. 15C above, star prefixed address signals (e.g. *010) may be encoded and received by a network switching element as "A010". In some embodiments, a controlling and/or switching element may then translate the symbolic overdecadic signal (i.e., the "*" address signaling prefix encoded as "A"), replacing it with an internal short routing prefix RRR (e.g. 555) that defines a routing path towards the access controlling element (e.g. the Star Access Control Platform). Typically, a short routing prefix comprises 3 or 4 characters, which themselves may include hexadecimal characters (e.g. 555A).

When a controlling or billing element translates and thus modifies the original address signals emitted by the cellular device, it may then issue a CONTINUE with modified arguments instruction (i.e., with the modified CgPN address, e.g. 555010), thereby instructing the switching element to perform a route lookup on the new internal routing prefix, in order to determine a network routing path towards the access controlling element.

In flow item 1940, in one symbol prefixed signaling embodiment, the MSC 1941 performs a routing lookup on a star prefix in the address signals to determine a trunk/route to the access control element 1945, which may be hosted in the Cloud, and transmits an ISUP IAM (Initial Address Message) to GMSC/SBC 1944, which establishes the Mobile Originating (MO) leg 1999.

The GMSC/SBC 1944 (or Media Gateway Controller) is configured to interwork between a Signaling System Seven (SS7) and an IP network, and In some embodiments, to perform signaling translation between ISUP and SIP (Session Initiation Protocol). In an ISUP/SIP translation, ISUP IAM is translated into SIP INVITE, which is transmitted to the access control element 1945.

ISUP includes a messaging protocol such as IAM and is a part of SS7 used to set up telephone calls in a Public Switched Telephone Network (PSTN). A Mobile Application Part (MAP) may be used as an SS7 protocol to setup and control calls via the PSTN through providing an application layer for GSM and UMTS mobile core networks and general packet radio service (GPRS) core networks for communication between and servicing of mobile users. Telephone exchanges (e.g. switches) may be connected via T1 or E1 trunks as shared communication line paths to transport speech from calls.

SIP is a signaling protocol to initiate, maintain, and terminate real-time multi-media (e.g. voice, video, and/or messaging) sessions for internet telephony applications and/or instant messaging over Internet Protocol (IP) networks and/or voice over IP (VOIP) networks.

In flow item 1940, on receiving the SIP INVITE, the access control element 1945, queries the access control ledger (1946) to determine if an access control platform transaction for device MSISDN-A (1940) emitting the NNN address signals is expected (was set) and now matches (is met).

In flow item 1950, on matching an expected transaction thus, In some embodiments access control element (1945) optionally, as depicted by the rounded brackets, responds with a SIP 180/RINGING message in the backward direction, commanding the GMSC/SBC 1944 to return an ISUP Address Complete Message/Call Progress (ACM/CPG) Alerting message, notifying MSC 1941 that the transaction has connected to the access control platform. In turn, MSC 1941 may then optionally present RBT to mobile device 1940 as graphically indicated (BELL). In responding with SIP/180 as a ringing message, the access control element 1945 matures the call into a placed and completed call, delivering a successful call setup.

The SIP/180 response is optional as it does not materially impact the access control platform protocol which is predicated on the disclosed WINK (hook flash) signaling which executes the transaction as described below and moreover, since the access control platform user experience is communicated visually via the access control button 1902 in the IAPP as disclosed.

In flow item 1960, the access control element 1945 then commands GMSC/SBC 1944 to ANSWER the call by issuing a SIP 200/OK message (CSEQ: INVITE), in the backward direction, which in turn is translated into an ISUP ANS (ANSWER) message at GMSC/SBC 1944, notifying the MSC 1941 that the call has been answered. At this point, the call has gone OFF HOOK (CONNECT BINARY <1>) as textually indicated in flow step 1960 and graphically in 1961, and a call duration timer begins for CDR generation associated with the answered call.

In flow item 1970, the access control element 1945 thereafter, in some embodiments, between 500 msec and 1 second later (or any other suitable time period), disconnects the call by issuing a SIP BYE command in the backward direction, which GMSC/SBC 1944 translates into ISUP REL (Release), instructing MSC 1941 to release the call, which returns the call to an ON HOOK state (DISCONNECT BINARY <0>) as textually indicated in flow step 1970 and graphically in 1971.

This Star mobile hook flash signaling is thus directed by the access control element 1945 lifting the receiver to be OFF HOOK (i.e., answer), and then, in some embodiments, between 500 msecs and 1 second thereafter (or any other suitable time period), replacing the receiver back to be ON HOOK (i.e., release).

In flow item 1980, on the network successfully disconnecting the call, the MSC 1941 responds with ISUP RLC (Release Complete) in the forward direction, which is translated at the GMSC/SBC 1944 into a SIP 200 message transmitted to access control element 1945 completing the STAR RING HOOK FLASH, or STAR HOOK FLASH (absent the RBT presentation) Payment Protocol (block 1991).

In flow item 1990, upon issuing ISUP RLC, MSC 1941 completes the CDR generation, thus recording a nominal call duration event (e.g. one second), thereby debiting the account associated with the caller NNN¢ (cents) per the disclosed micro payment method.

In some embodiments, such a mobile originating dialog, collectively referenced herein as a "Ring Hook flash" (or "hook flash") signaling protocol (block 1991), may present caller A with an instant ring, followed by a momentary call connect and disconnect (OFF/ON HOOK), thus raising and dropping the call to present a 00:00:01 second call duration on the display of device A 1940. This hook flash signaling protocol and clearing delivers an audiovisual confirmation that the transaction completed successfully.

On receiving the SIP 200 in flow item 1980 as response to the SIP BYE message issued by access control element 1945 in flow item 1970, the network acknowledges that the hook flash transaction has completed and the CDR has been recorded. This acknowledgment confirms that the account associated with device 1940 has been debited with the $N.NN micro payment and the cellular portion of the transaction has been successfully completed.

If device 1940 disconnects the call prior to the hook flash signaling completion, either in response to the user pressing disconnect (e.g. pressing the red phone button) or due to the network dropping the call (e.g. signal loss or network congestion) the transaction fails to complete. In such a scenario, in some embodiments, the access control element 1945 communicates the transaction failure to the access control platform button 1902/1982 which may then change state to reflect a "CANCEL" event occurred (not shown).

In flow item 1980, in response to the successful cellular transaction completion, access control element 1945 updates LEDGER 1946 to record the successful completion of the micro payment transaction, crediting a wallet of the access control platform itself (system wallet) [*] with the corresponding $N.NN amount and the provider access control platform wallet [*B] with the transaction amount ($N.NN) less any switching and processing fees that may apply (both not shown).

In flow item 1981 access control element 1945 then communicates the successful RESPONSE to the access control platform button 1902. In some embodiments, the successful RESPONSE may cause the access control button 1902 to change state reflecting PAID (1982), which in turns unlocks the digital content and/or service (1983) for access by device 1948.

While the RBT and hook flashing, may provide telephony audiovisual feedback the primary access control platform user experience presents within the access control platform button as it transitions under STAR 1945 signaling, state management and control, as described above in FIG. 5.

[FIG. 19B]

Figure 19B:
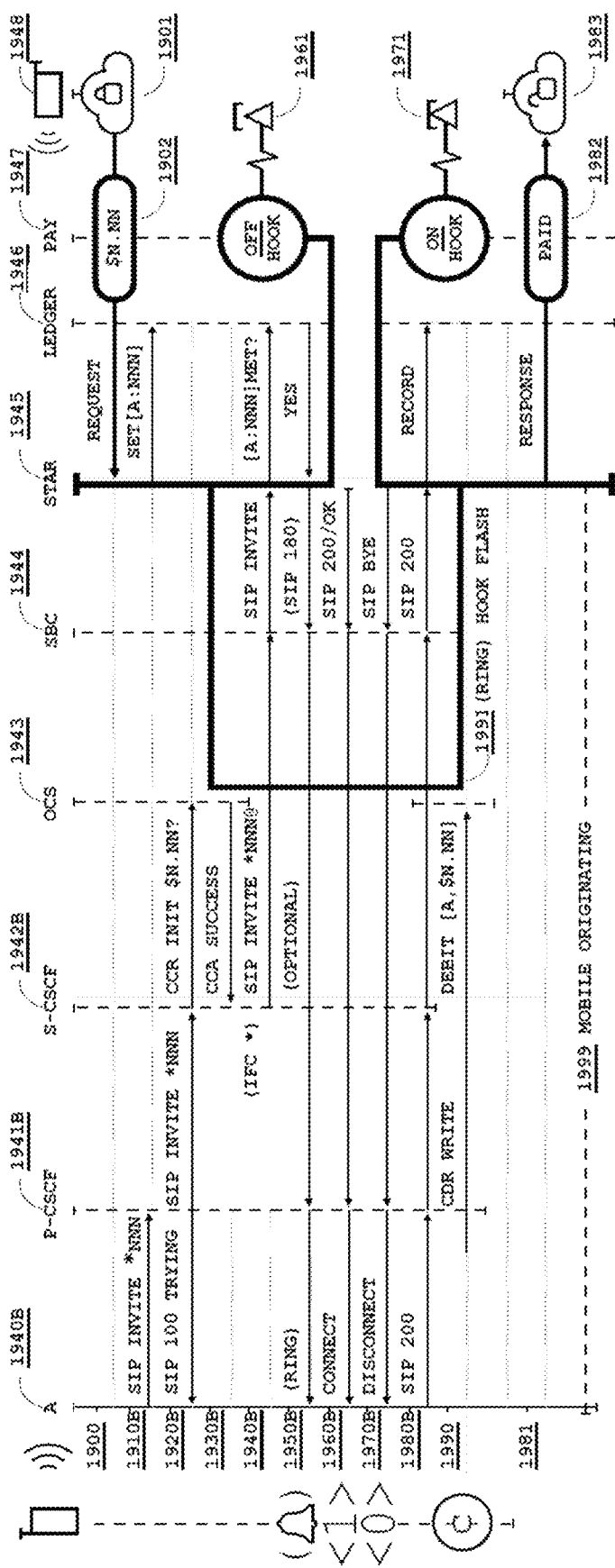
FIG. 19B is an illustrative non-restrictive example of a Packet Switched Cellular Communication Flash Signaling Protocol in accordance with at least some embodiments of the present disclosure.

FIG. 19B is a control scheme corresponding to the flow methodology presented in FIG. 3 illustrating in greater detail a sequential signaling step ladder for the disclosed micro payment system and method for an originating VoLTE call request in accordance with one or more embodiments of the present disclosure. FIG. 19B shares corresponding labels and steps with FIG. 19A as shown, with the exception of those flow items annotated with the letter B. Whereas FIG. 19A describes a Circuit Switched Framework and associated mobile telephony device 1940, FIG. 19B describes a VOLTE telephony device, User Equipment (UE) 1940B, accessing a packet switching network 1941B/1942B. In this control schema, the native SIP signaling capabilities between the UE 1940B, the IMS network elements 1941B and 1942B, and the access control platform 2 are described.

In some embodiments, the communication network may be a packet switched network supporting Session Initiation Protocol (SIP) User Equipment (UE). The packet switched network may be IMS, VoLTE, and combinations thereof, or other suitable packet switched networks that move data in separate data packets based on a destination address to transmit a message.

SIP is a signaling protocol to initiate, maintain, and terminate real-time multi-media (e.g. voice, video, and/or messaging) sessions for internet telephony applications and/or instant messaging over Internet Protocol (IP) networks and/or voice over IP (VOIP) networks. UE may include smart or otherwise network connected devices, such as the first user mobile device described herein. The embodiments described herein may be based on the packet switched network and/or may be integrated with a circuit switched network based on dedicated point to point connections for calls, as described in greater detail below.

Packet switched networks groups data such that it can be transmitted as packets (e.g. discrete blocks of data) over a digital network. As set forth above, one such packet switching network may be IMS VoLTE, utilizing an Internet Multimedia Subsystem (IMS) and a packet switched voice service as Voice over Long Term Evolution (VoLTE), which is a high-speed wireless communication for mobile telephony devices and data terminals such as other smart mobile devices that may be on an Internet of Things (IoT) network.

IMS VoLTE involves VoLTE as a high-speed wireless communications protocol utilizing IMS to implement standards and procedures for delivering voice communication as well as data over 4G LTE networks. Data from a circuit-switched cellular networks (i.e., Code Division Multiple Access (CDMA) and Global System for Mobile Communications (GSM)) may be transformed into network packets before being broadcast on a public switching network such as IM VoLTE. VoLTE uses IMS-based networks to offer these services. VoLTE supports amongst other services, rich multimedia communications including high definition audio and video services that may operate over 4G and LTE data capable networks.

IMS resides as a stand-alone system outside of a VoLTE network and may be connected to the VoLTE network through a communicative coupling through an interface to a gateway of the VoLTE network, such as a SGi interface connecting IMS with a Public Data Network (PDN) Gateway, described in greater detail below. One or more UEs may be communicatively coupled through an Evolved University Mobile Communications System Terrestrial Radio Access Network (E-UTRAN) and interfaces to an Evolved Packet Core (EPC) of the VoLTE network and further to IP services such as an IMS network and the Internet. E-UTRAN is a radio access network acting as an air interface of an 3rd Generation Partnership Project (3GPP) LTE IN upgrade path.

The EPC of the VoLTE network may include functional elements such as a Mobile Management Entity (MME), a Serving Gateway (S-GW), and the PDN Gateway (P-GW). The MME is control point responsible for most control plane functions. The S-GW flows through IP packets in uplink and downlink transmissions and handles handovers. The PDN Gateway allocates IP addresses to UEs and acts as a point of communication between EUTRA and other non-3GPP services such as the Internet. Respective PDN Gateways may be associated with and provide interfaces to IMS and the Internet, such as the SGi interface that is a reference point between the PDN Gateway and the packet data network.

The EPC may further include a Policy and Charging Rule Function (PCRF) element as a functional element to determine permitted traffic types in real-time and traffic accounting for billing purposes. When a UE starts a VoLTE call, the PCRF may check if the UE has a subscription to start the call and, if so, setup a dedicated bearer for IMS services. An IMS powered UE may include a Universal Integrated Circuit Card (UICC) and a Session Initiated Protocol User Agent (SIP UA) to send and receive SIP messages and provide telephony functionality. The UICC may include identity modules such as a Subscriber Identity Module (SIM) and an IP Multimedia Services Identity Module (ISIM) for use by an IMS subsystem.

A multitude of elements may comprise an IMSNoLTE Packet Switched network; however, for the sake of simplicity, IMSNoLTE may be referenced herein as a generalized SIP network subsystem. Further, main functional elements of the VoLTE architecture as described herein may be defined in 3GPP while allowing non-3GPP technologies to interface with and be managed from the IMS VoLTE network. The IMS functional elements of the IMS Core governing call setup and control may include Proxy Call Session Control Function (P-CSCF) and Serving Call Session Control Function (S-CSCF).

The P-CSCF may be the initial point of contact for session signaling for the IMS-enabled VoLTE User Equipment (UE). The P-CSCF may behave as a SIP proxy by forwarding SIP messages between the UE and the IMS Core Network.

The S-CSCF includes data regarding user knowledge and application permissions associated with a user account. The S-CSCF of the IMS Core may provide session, routing and billing functions for all sessions under its control and invokes Application Servers based on Initial Filter Criteria (IFC) received from the Home Subscriber Server (HSS) during service registration. The S-CSCF may act as SIP registrar for the VoLTE User Equipment (UE) of a user account that the HSS and Interrogating Call Session Control Function (I-CSCF) assign to it. The S-CSCF may query the HSS for the subscriber profiles which are used to authorize and manage requested services.

The S-CSCF may thus be a central element on the IMS signaling plane. The S-CSCF may be a SIP server that also performs session control, and in some embodiments uses Diameter Cx and Dx interfaces to download and upload user profiles associated with user accounts to and from the HSS. The S-CSCF may also handle SIP registrations and be in the signaling path of all messages. Significantly, the S-CSCF may determine which Application Server (AS) the SIP message from the SIP UA of the UE has handled by the P-CSCF will be forwarded to for the provision of service and provide requisite routing.

The S-CSCF may thus enable the assignment of an AS to the session when required. In some embodiments, the role of the S-CSCF is to execute the session request by locating a destination endpoint and conducting the signaling toward it. The S-CSCF may also be able to coordinate with a Media Resource Function (MRF) for any media announcements/tones to be played to the originating party. Per the 3GPP technical specifications, the S-CSCF may also act as a Charging Triggering Function (CTF) managing charging of users of the IMS infrastructure and services. The S-CSCF may communicate with an IMS Gateway Function (IMS-GWF) that may operate as a SIP application server and may signal the S-CSCF to terminate a session when a user runs out of credits during a session. Although the S-CSCF may act as the CTF, a same functionality may be applied to any IMS network element.

In embodiments, as the CTF element in an IMS network, the S-CSCF may perform several tasks in order to identify the correct charging to apply, that corresponds to and is triggered by the user session activity. The S-CSCF, when performing its normal routing actions for the SIP signaling may determine whether the SIP information represents a chargeable activity, and which type of charging mechanism may be applied. The charging mechanisms for IMS sessions may be either Offline (Post-paid) charging, using accounting messages, or online (Pre-paid) charging, using substantially real time credit control messages and procedures. Information about IMS transactions may be sent from the S-CSCF to a charging element that collects this information and stores it in the form of Charging Data Records (CDRs).

In flow item 1910B, user A through VoLTE UE device 1940B, dials the address signals *NNN representing the micro transaction $N.NN, per the disclosed methods and systems. The dialing results in UE 1940B sending a SIP INVITE request to P-CSCF 1941B, whose address is discovered during UE registration procedure (not shown). The INVITE request may contain, within the Contact header and the P-Preferred-Service header, the IMS Communication Service Identifier (ICSI) for IMS Multimedia Telephony (e.g. urn:urn-7:3gpp-service.ims.icsi.mmtel).

In flow item 1920B, P-CSCF 1941B adds a P-Charging-Vector header and forwards the SIP INVITE to the S-CSCF 1942B identified during UE registration (not shown). S-CSCF 1942B receives the SIP INVITE from P-CSCF 1941B, S-CSCF 1942B invokes any VoLTE services as defined and triggered by the Initial Filter Criteria (IFC) within the subscriber profile, retrieved during the IMS Registration. S-CSCF 1942B checks the P-Preferred-Service header in the SIP INVITE request (e.g. MMTel ICSI) and verifies that the user is authorized for the service by validating against the subscribed services retrieved in the service profile during Registration.

For example, with online charging, network resource usage may be granted by the OCS based on the price or the tariff of the requested service and the balance in the subscriber's account. The OCS may support at least two types of online charging functions: session-based charging function (SBCF) and the event-based charging function (EBCF). The SBCF may be responsible for network bearer and session-based services such as voice calls, GPRS sessions, or IMS sessions. Moreover, it may be able to control the session by permitting or denying a session establishment request after checking the subscriber account. In the OCS, a rating function (RF) may determine the price/tariff of the requested network resource usage in real-time.

In flow item 1920B, the P-CSCF 1941B may respond with SIP 100 TRYING to the requesting UE 1940B in order to arrest an INVITE timeout. P-CSCF 1941B may then forward the INVITE to the S-CSCF 1942B, which in turns may send an Initial Credit Charge Request (for example, CCR CC-request-type "INITIAL_REQUEST") to OCS 1943. OCS 1943 may collectively comprise the Session Balance Control Function (SBCF) and the Account Balance Management Function (ABMF).

In flow item 1920B, on receiving the CCR message, the SBCF may retrieve the account information and the subscriber profile from the OCS ABMF. The SBCF may then send a Tariff Request message to the RF to determine the tariff of the IMS call. Based on the subscriber information, the RF may reply to the SBCF with the Tariff Response message, which may include the billing plan and the tariff information for the IMS service.

When the tariff information is received, the SBCF may perform credit unit reservation with the ABMF. It may then reply to S-CSCF 1942B with a Credit Control Answer (CCA) message containing any granted credit (e.g. specifying the number of seconds or minutes allowed for the call). When it has been determined that the account associated with user A has sufficient credit, in this embodiment credit greater than or equal to $N.NN, the CCA message returned in flow item 1930B may indicate credit authorization success.

In flow item 1930B, In some embodiments responsive to receiving the CCA Success, S-CSCF 1942B or attendant TAS may then reroute the INVITE request with a modified call signal (e.g. *NNN@), in some embodiments via SBC 1944 to the IP address of the access control platform 1945 as the transaction processing platform.

In flow item 1940B as shown, responsive to receiving the CCA Success, the S-CSCF 1942B or attendant TAS may thus create a new call leg on a modified INVITE request including a modified call signal with a modified address, a distinguishing service code prefix and a signaling switch destination address.

In embodiments, the modified address incorporates a distinguishing service code (e.g.: * or XXX) prefixed to the B address signals and specifies as a network identifier for the micropayment access control platform destination address, the star domain in the branched URI. As non-limiting examples, the modified address may be of the form:

INVITE sip:*NNN@starlogik.com SIP/2.0 or,
INVITE sip:555NNN@55.225.225.45 SIP/2.0, where 555 is the applied service code prefix, and 55.225.225.45 is the Star Access Control Platform IP address (IPV4 notation).

S-CSCF 1942B may then add a Via Header with new branch tag, thereby branching (forwarding or sequentially forking) the call, in some embodiments via SBC 1944, to the access control platform 1945.

The symbol prefixed URL may further incorporate a Mobile Network Code (MNC) and Mobile Country Code (MCC) assigned to the Mobile Network Operator (MNO), such as, for example:

INVITE sip:*NNN@7.655.starlogik.com SIP/2.0.

The above INVITE example illustrates a DNS URL for a South African MNO Cell C (MCC=655 being the country designation for South Africa, and MNC=7 being the Network Identifier for the MNO. The MNC level 4 and MCC level 3 domains permit dynamic DNS resolution on a Fully Qualified Domain Name (FQDN) down to country and carrier for localized access control platform hosting.

In accordance with the Call Data Record generation reconciliation as disclosed herein, originating CDRS for the hook flash communication methods (Ring Commerce Uplink, block 1991) may generate CDRs that, in some embodiments, are recorded with MSISDN-A and address signals *NNN (A*NNN titled CDRs). Branching the INVITE request thus with the modified NNN address signals, as described above, preserves CDR reconciliation with the micro payment transactions conducted.

This NNN address signal modification may ensure that the originating S-CSCF CDRs, generated when the access control element 1945 performs the hook flash method as described in FIG. 19A above. In flow item 1960B, STAR 1945 going OFF HOOK (picking up the call) and then, e.g. between 500 msec and 1 second or other duration for a nominal call length, thereafter, in flow item 1970B, going back ON HOOK (hanging up the call), collectively service block 1991, are distinguishable as A*NNN (or XXXNNN) titled CDRS. Such A*NNN generated CDRs (e.g. the Star CDR dataset) may then be audited to calculate the accumulative access control platform transactions conducted over a set period of time.

Thus, flow items 1940B through 1980B communicating with the access control platform 1945 are functionally suitable to flow items 1940 through 1980 in FIG. 19A, however since the described IMSNOLTE Packet Switched Network may utilize SIP signaling, no signaling protocol translation between the UE 1940B and the IMS network elements (P-SCSF 1941B and S-SCSF 1942B) and the access control platform 1945 may be required in this embodiment.

[FIG. 19C]

Figure 19C:
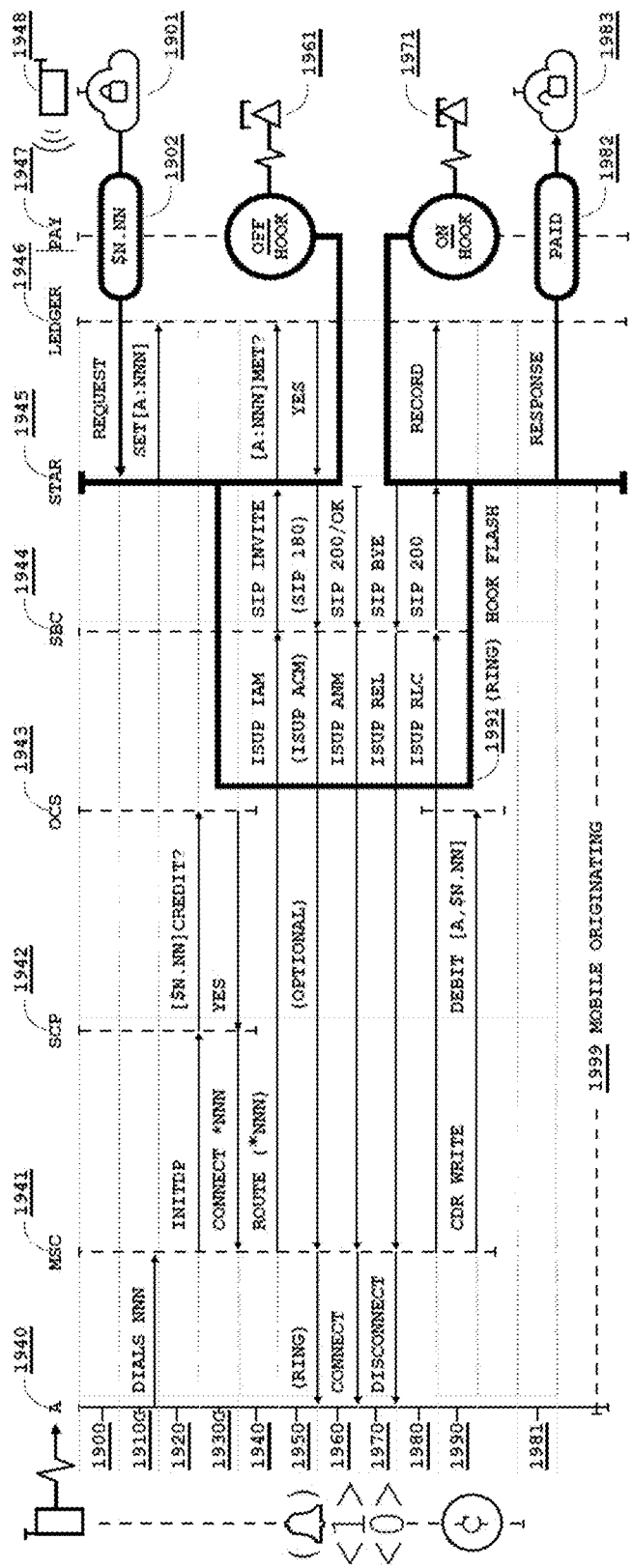
FIG. 19C is an illustrative non-restrictive example of a Circuit Switched Cellular Communication Signaling Protocol with Automatic Routing in accordance with at least some embodiments of the present disclosure.

FIG. 19B is a control scheme corresponding to the flow methodology presented in FIG. 3 illustrating in greater detail a sequential signaling step ladder for the disclosed micro payment system and method in accordance with one or more embodiments of the present disclosure. FIG. 19C is similar to FIG. 19A sharing corresponding labels and steps with FIG. 19A as shown, with the exception of those flow items annotated with the letter C. Whereas FIG. 19A depicts mobile telephone 1940 in flow item 1910 emitting signals *NNN, FIG. 19C illustrates an embodiment where in flow item 1910C the mobile telephone 1940 signals NNN, without a symbolic prefix.

In flow item 1930C, SCP 1942 In some embodiments with associated OCS 1943, automatically modifies the NNN address signals received, when those signals contain between a minimum and a maximum series of digits, for example, between a minimum of 3 and a maximum of 5 digits, to include a routing prefix identifying the access control platform 1945.

In flow item 1930C, on modifying the NNN address signals thus, SCP 1942 commands the MSC 1941 to CONNECT the call on the now modified address signals, for example, *NNN. This may command the MSC 1941 to REROUTE the call in flow item 1940, along a SIP trunk via a Gateway MSC (GMSC) or Media Gateway Controller (MGC) both not shown, and in some embodiments via the SBC 1944 to the access control platform 1945. The MGC/SBC may perform ISUP IAM to SIP INVITE signaling protocol translation as disclosed herein.

In flow item 1930C, MSC 1941 may look up a pre-configured routing table including a trunk indicator (e.g. trunk communication path) associated with the modified address signal prefix and translate/route the modified address based on the trunk indicator of the trunk associated with the modified address from the pre-configured routing table. The modified call signal may be automatically routed along the trunk from MSC 1941 to the GMSC/MGC or SBC 1944, and then be automatically routed along the SIP trunk to the access control platform 1945. The disclosed micro payment transaction then proceeds per FIG. 15A as described above.

[FIG. 20]

Figure 20:
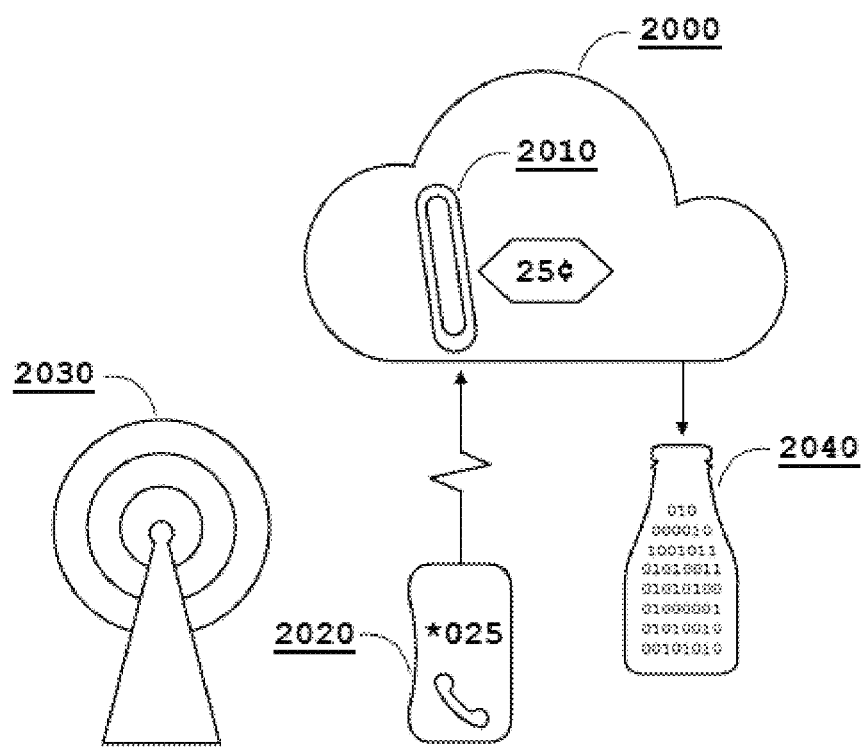
FIG. 20 is an illustrative non-restrictive example of a process based at least in part on cellular communication signals in accordance with at least some embodiments of the present disclosure.

FIG. 20 depicts an illustrative non-restrictive example of a process based at least in part on a mobile communication signals in accordance with at least some embodiments of the present disclosure. In some embodiments, the process includes an access control platform 2000, e.g. implemented as a cloud platform, that interfaces with a cellular network 2030 to conduct transactions using CDRs.

In some embodiments, a mobile phone 2020 may be associated with network account (wallet not shown) with the cellular network 2030. In some embodiments, the telephony device 120 may communicate with the cellular network 2030 to transfer value from the network account to the access control platform 2000 in order to access digital goods and/or services 2040 for delivery to the telephony device 2020. In some embodiments, the telephony device 2020 communicates a request for the transfer of value by formatting the address signals of a telephone call to carry the value to be transferred.

In some embodiments, the access control platform 2000 is configured to interface with the cellular network 2030. Accordingly, the cellular network 2030 may provide the value from the account of the telephony device 2020 to deposit a virtual token into an access control platform wallet 2010 associated with the provider of the digital goods and/or services 2040. In some embodiments, the virtual token may include an authentic transparent, and low cost, fiat backed micro currency. By providing the virtual token to the access control platform wallet 2010 of the provider, the access control platform 2000 can provide the value for the digital goods and/or services 2040, such that the digital goods and/or services 2040 may be dispensed to the telephony device 2020. As a result, the adaptations to the cellular network 2030 can democratize Internet commerce and access to digital content and/or services.

Artisans skilled in Switching and Billing will appreciate that alternate embodiments can include those incorporating metadata together with the dialed digits enumerating the monetary suitable, wherein such metadata can without limitation include data identifying a beneficiary and a Stock Keeping Unit (SKU).

While some embodiments may include using a hook flash protocol, where a phone call momentarily goes OFF and then back ON HOOK to execute the transaction, and wherein the address signals enumerate the transaction amount, other network protocols and bearers that deliver suitable transactional functionality may be employed, including without limitation, USSD and SMS bearers.

In an alternate USSD embodiment the following mobile originated dial string may achieve a similar result:

*NNN # or *XXX*NNN #.

The above USSD examples may similarly be interpreted as requesting a transaction with monetary suitable $N.NN matching the signals NNN, and where the XXX code may identify the USSD application servicing the transaction which is typical amongst USSD service provision. USSD command strings in some embodiments use the star as a delimiter to separate variables.

For example, the following USSD dial string may be constructed to encapsulate an alternate micro payment application XXX, monetary suitable amount NNN, provider identifier PPP and commodity SKU CCC being purchased:

*XXX*NNN*PPP*CCC#.

In the above USSD example, PPP and CCC may be as many or few digits necessary to uniquely identify the provider and the item being sold. Similarly, NNN may be as many digits required to enumerate the monetary suitable, with more digits representing higher cost items. In yet another USSD embodiment the micro payment application may be identified by a leading zero as in:

*0NN # which translates into $0.NN and

*0NNN # which translates into $N.NN.

In some embodiments, the zero based (prefixed) USSD command string embodiment, can condense the USSD application identifier, in some embodiments three digits, into a single identifying and leading digit (zero) in order to present a reduced USSD instruction set that enumerates the transaction amount, as per the telephony embodiments described herein.

USSD application hosting, routing and/or execution may be serviced internally by the network using protocols such as Mobile Application Part (MAP) signaling, and externally using an External Messaging Entity that connects to the carrier USSD and/or SMSC messaging platform, using standard Internet Protocols such as SMPP and HTTP.

In one SMS micro payment embodiment, the systems and methods disclosed herein may be similarly realized by permitting users, and by proxy their mobile devices, to send a payment instruction to an SMS short address code that itself enumerates the transaction amount.

The SMS signaling path and billing process in an Intelligent Network (IN) may be similar to that of the disclosed symbolically prefixed telephony protocol. By modifying the SMS routing (e.g. message interception and routing based on the CdPA), and by modifying the billing system per the above telephony systems and methods, all such symbolically addressed mobile originating messages may be utilized to conduct the cellular micro billing as disclosed, that is, debiting an account associated with the sending mobile device by the amount enumerated in the SMS address, and then be routed on the symbolic address prefix to an Access Control Platform (e.g. DCB Platform of the present disclosure) in order to complete the Internet transaction.

For example, permitting an SMS addressed to:
*NNN.
Since many mobile devices permit sending an SMS in the IAPP background, under programmatic control and without user intervention, such a symbol prefixed SMS signaling service would deliver an equally engaging and frictionless user experience. And since an SMS sent from a user who lacks sufficient credit may be instantly rejected (e.g. where the operator returns MO_FSM_Neg_Response) the device may be alerted to a failed submission, preventing content from being accessed and preserving the interactive real-time signaling characteristics displayed during the transaction, as disclosed using a telephony protocol.

As detailed above, up to now Premium Rate SMS services have not managed to transparently reflect the charge to be applied, since the PSMS short address code does not, in any way, encapsulate nor indicate the cost of service. Moreover, many PSMS service require distinct short codes for charging different amounts.

By permitting consumers to utilize a symbol prefixed SMS signaling service to transact as disclosed herein, a PSMS platform may be modified to overcome such billing and marketing limitations by accepting universal signaling encapsulating the cost of the service (the charge to be applied) in the symbolically addressed mobile originating SMS header. Whereas existing PSMS platforms utilize two way mobile terminating SMS, which consume vastly more network resources (i.e., paging and locating the destination device and then transporting a return reply confirmation), the newly disclosed mobile originating SMS transaction may be conducted in a single step, and without necessarily requiring any SMS confirmation content in the message body, since originating the message authoritatively instructs the operator to apply the signaled charge. A short message sent without a content payload, significantly reduces signaling load on the network.

Moreover, such a cellular messaging signaling system would satisfy the data requirements constituting "Card Present" transactions, as described above, since a mobile originating SMS addressed thus, will generate an authoritative and irrevocable, billing record capturing the transaction data and cost at the time of the submission.

For example, sending a mobile originated STAR SMS may result in a CDR as follows in Table 3.

TABLE 3

| Date Time | SMS | Sent To | Cost |
|---|---|---|---|
| Oct. 1, 2021 10:30:15 | Mobile Originated | *010 | $0.10 |

Conducting payments on the Internet in some embodiments require a user to login to an exemplary access control platform of the present disclosure, for example by entering a registered user name and password, and oftentimes a two factor code (2FA) in order to authorize a transaction. Thus, an improvement to online payment processing is enabled by the disclosed embodiments by utilizing the existing biometric and other safeguards used for locking mobile telephones, thereby preventing unauthorized access to the phone and consequently to the micro payment functionality without needing to rely on vulnerable network communications for authentication.

Since the disclosed methods and systems require access to the communication service(s) on the computing device (e.g. mobile phone, cellular service-enabled computer (e.g. laptop, tablet, etc.), etc.), these existing device safeguards obviate the need for additional payment security features, such as a secret PIN, since the device is already secured from unauthorized access. Reducing the number of steps required to affect a micro payment not only enhances the user experience but may lead to high frequency utilization. In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

[FIG. 21]

Figure 21:
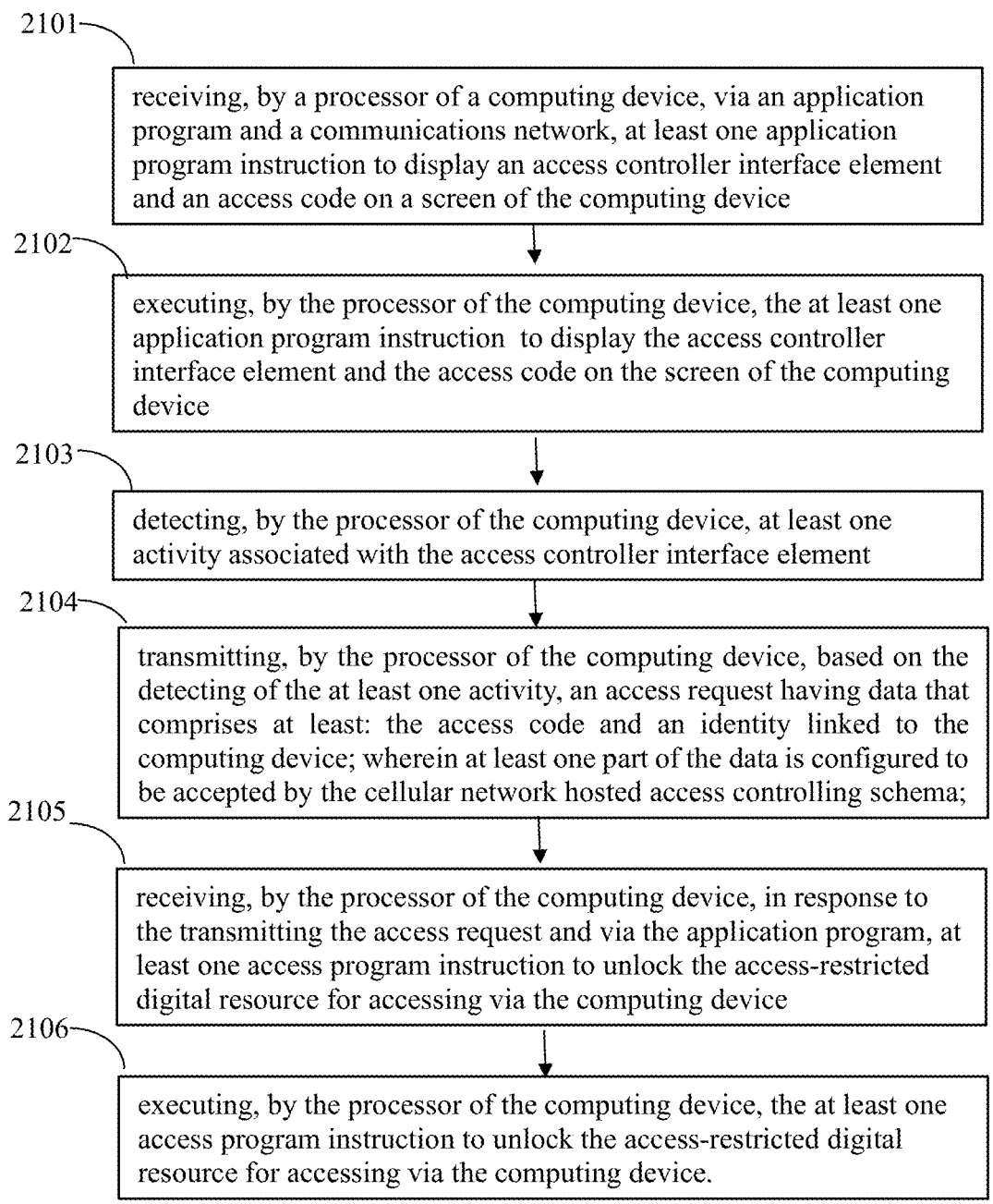
FIG. 21 is an illustrative non-restrictive example of a process based at least in part on cellular communication signals in accordance with at least some embodiments of the present disclosure.

FIG. 21 depicts an illustrative non-restrictive example of an exemplary process based at least in part on a mobile communication signals in accordance with at least some embodiments of the present disclosure. In some embodiments, the exemplary process of FIG. 21 may include at least the following steps of: at step 2101, receiving, by a processor of a computing device, via an application program and a communications network, at least one application program instruction to display an access controller interface element and an access code on a screen of the computing device; where the access controller interface element is: communicatively coupled to a cellular network hosted access controlling schema and operationally linked to an access-restricted digital resource; at step 2102, executing, by the processor of the computing device, the at least one application program instruction to display the access controller interface element and the access code on the screen of the computing device; at step 2103, detecting, by the processor of the computing device, at least one activity associated with the access controller interface element; at step 2104, transmitting, by the processor of the computing device, based on the detecting of the at least one activity, an access request having data that includes: the access code and an identity linked to the computing device; where at least one part of the data is configured to be accepted by the cellular network hosted access controlling schema; at step 2105, receiving, by the processor of the computing device, in response to the transmitting the access request and via the application program, at least one access program instruction to unlock the access-restricted digital resource for accessing via the computing device; where the receiving the at least one access program instruction to unlock the access-restricted digital resource is after the at least one part of the data has been accepted by the cellular network hosted access controlling schema; and, at step 2106, executing, by the processor of the computing device, the at least one access program instruction to unlock the access-restricted digital resource for accessing via the computing device.

[FIG. 22]

Figure 22:
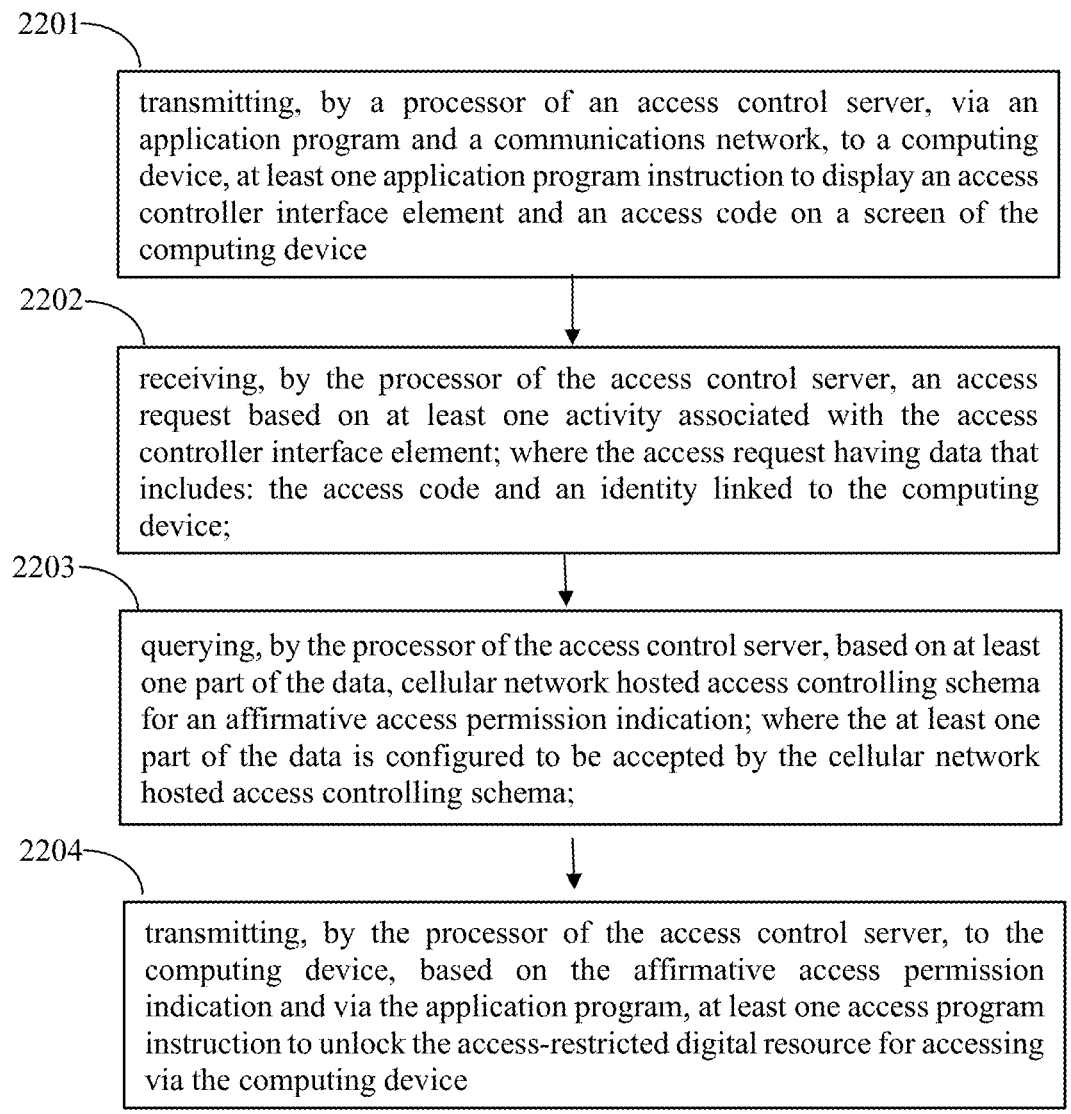
FIG. 22 is an illustrative non-restrictive example of a process based at least in part on cellular communication signals in accordance with at least some embodiments of the present disclosure.

FIG. 22 depicts an illustrative non-restrictive example of an exemplary process based at least in part on a mobile communication signals in accordance with at least some embodiments of the present disclosure. In some embodiments, the exemplary process of FIG. 22 may include at least the following steps of: at step 2201, transmitting, by a processor of an access control server, via an application program and a communications network, to a computing device, at least one application program instruction to display an access controller interface element and an access code on a screen of the computing device; where the access controller interface element is: communicatively coupled to a cellular network hosted access controlling schema and operationally linked to an access-restricted digital resource, restricted from being accessed via the computing device; at step 2202, receiving, by the processor of the access control server, an access request based on at least one activity associated with the access controller interface element; where the access request having data that includes: the access code and an identity linked to the computing device; at step 2203, querying, by the processor of the access control server, based on at least one part of the data, the cellular network hosted access controlling schema for an affirmative access permission indication; where the at least one part of the data is configured to be accepted by the cellular network hosted access controlling schema; and at step 2204, transmitting, by the processor of the access control server, to the computing device, based on the affirmative access permission indication and via the application program, at least one access program instruction to unlock the access-restricted digital resource for accessing via the computing device.

[FIG. 23]

Figure 23:
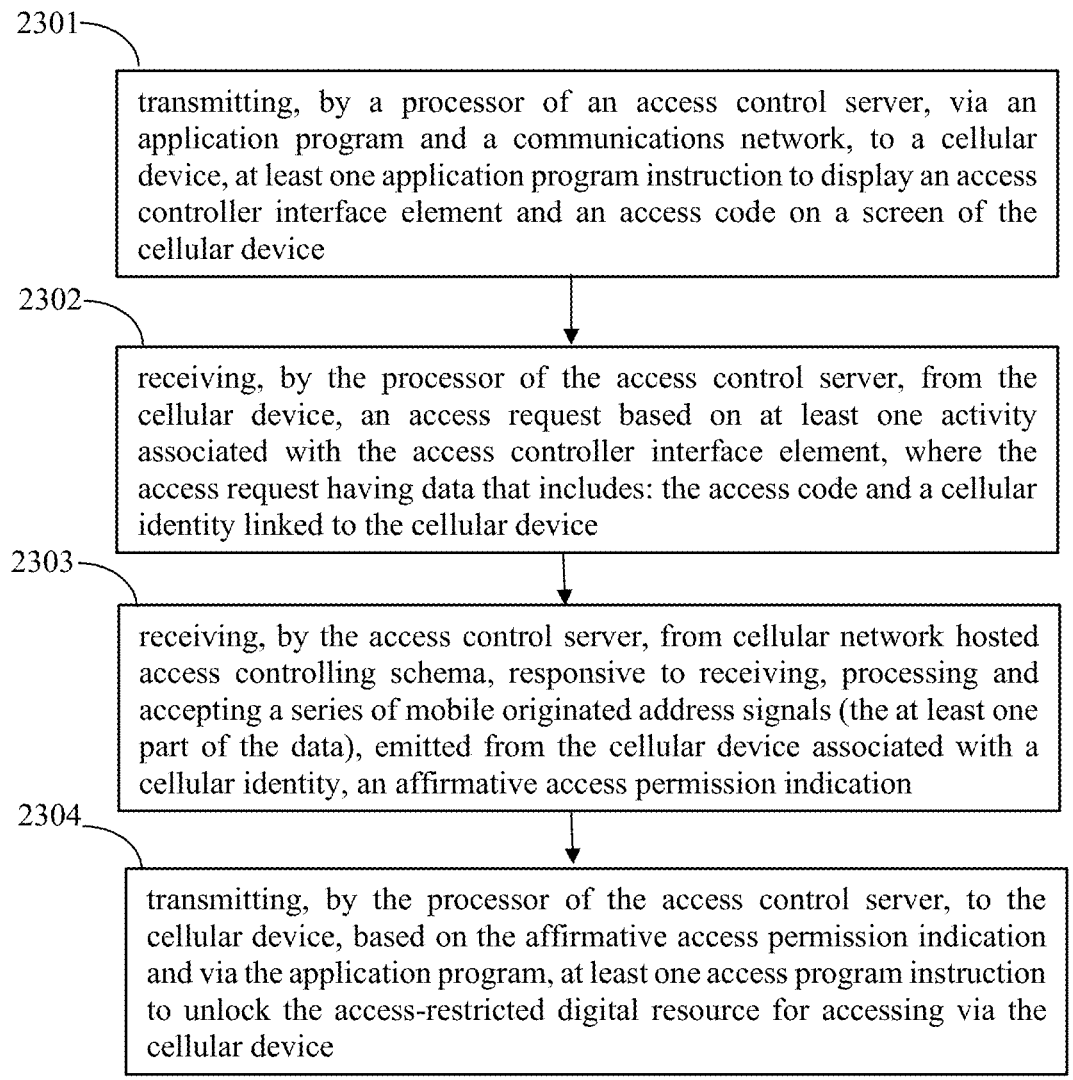
FIG. 23 is an illustrative non-restrictive example of a process based at least in part on cellular communication signals in accordance with at least some embodiments of the present disclosure.

FIG. 23 depicts an illustrative non-restrictive example of an exemplary process based at least in part on a mobile communication signals in accordance with at least some embodiments of the present disclosure. In some embodiments, the exemplary process of FIG. 23 may include at least the following steps of: at step 2301, transmitting, by a processor of an access control server, via an application program and a communications network, to a cellular device, at least one application program instruction to display an access controller interface element and an access code on a screen of the cellular device; where the access controller interface element is: communicatively coupled to a cellular network hosted access controlling schema and operationally linked to an access-restricted digital resource, restricted from being accessed via the cellular device; at step 2302, receiving, by the processor of the access control server, from the cellular device, an access request based on at least one activity associated with the access controller interface element; where the access request having data that includes: the access code and a cellular identity linked to the cellular device; at step 2303, receiving, by the access control server, from the cellular network hosted access controlling schema, responsive to receiving, processing and accepting a series of mobile originated address signals (the at least one part of the data) as disclosed herein, emitted from the cellular device associated with the cellular identity, an affirmative access permission indication; and at step 2304, transmitting, by the processor of the access control server, to the cellular device, based on the affirmative access permission indication and via the application program, at least one access program instruction to unlock the access-restricted digital resource for accessing via the cellular device.

[FIG. 24]

Figure 24:
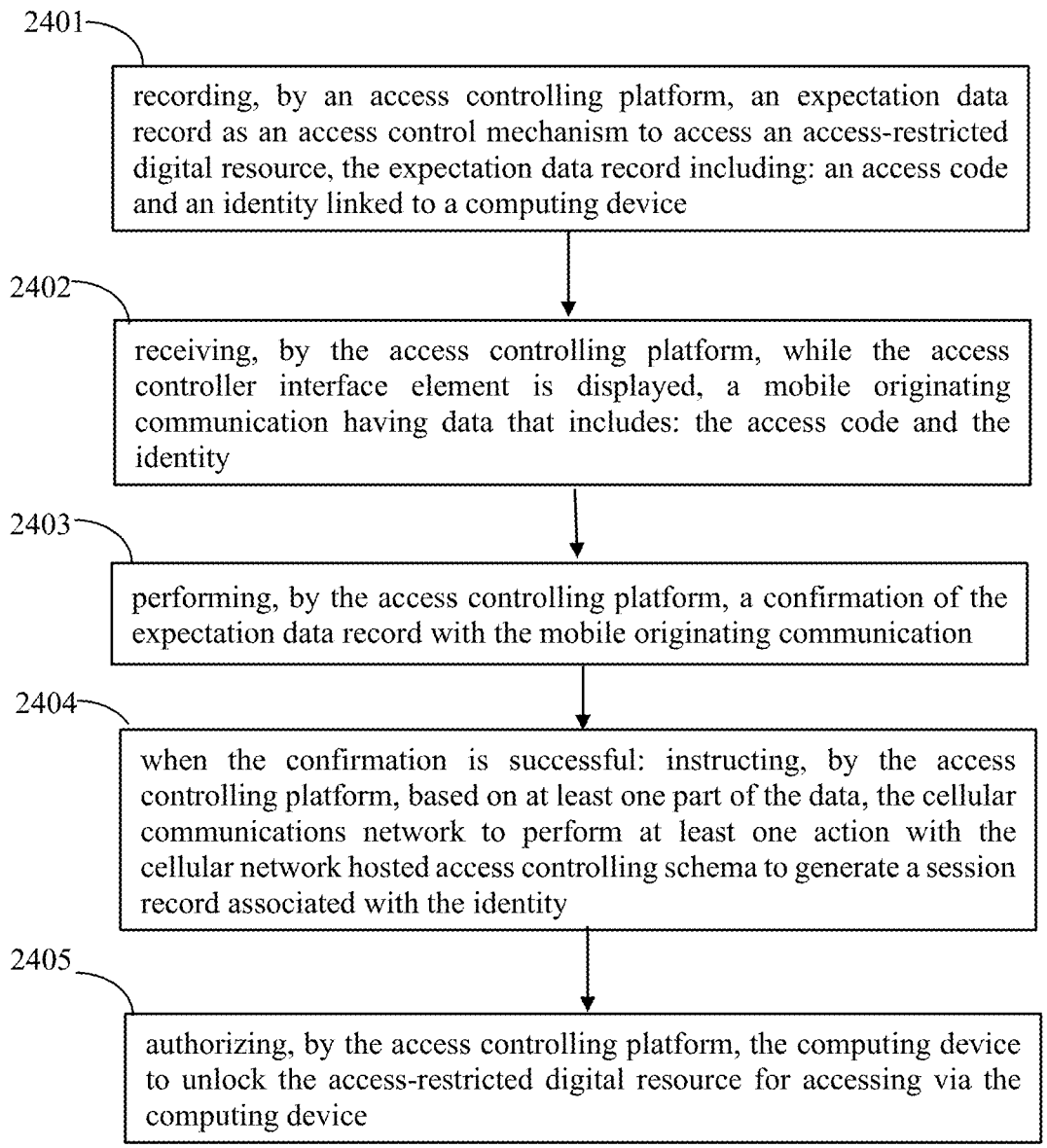
FIG. 24 is an illustrative non-restrictive example of a process based at least in part on cellular communication signals in accordance with at least some embodiments of the present disclosure.

FIG. 24 depicts an illustrative non-restrictive example of an exemplary process based at least in part on a mobile communication signals in accordance with at least some embodiments of the present disclosure. In some embodiments, the exemplary process of FIG. 24 may include at least the following steps of: at step 2401, recording, by an access controlling platform an expectation data record as an access control mechanism to access an access-restricted digital resource, the expectation data record including: an access code and an identity linked to a computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; at step 2402, receiving, by the access controlling platform, while the access controller interface element is displayed, a mobile originating communication having data that includes: the access code and the identity; at step 2403, performing, by the access controlling platform, a confirmation of the expectation data record with the mobile originating communication; at step 2404, when the confirmation is successful: instructing, by the access controlling platform, based on at least one part of the data, the cellular communications network to perform at least one action with the cellular network hosted access controlling schema to generate a session record associated with the identity; and, at step 2405, authorizing, by the access controlling platform, the computing device to unlock the access-restricted digital resource for accessing via the computing device.

[FIG. 25]

Figure 25:
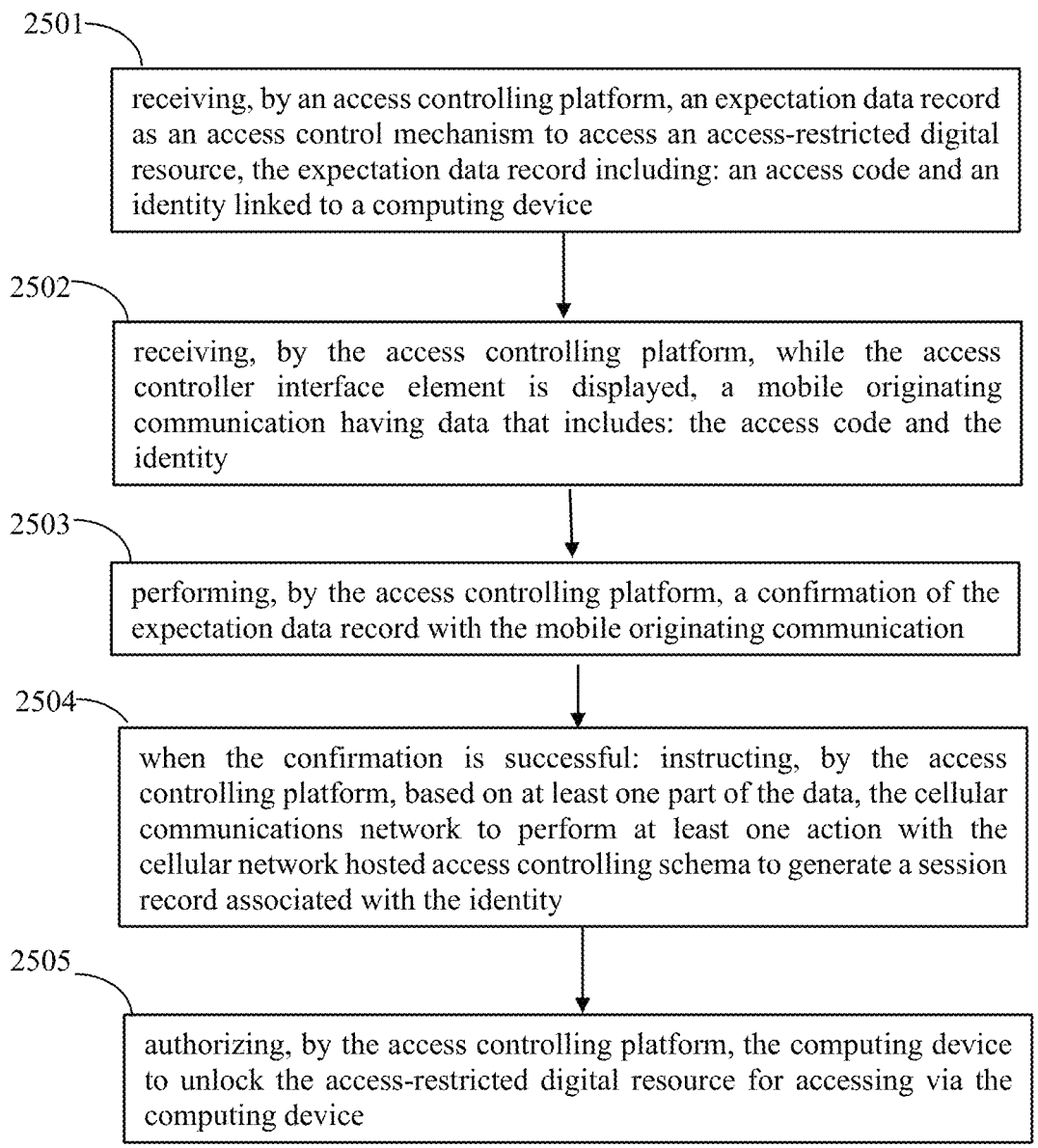
FIG. 25 is an illustrative non-restrictive example of a process based at least in part on cellular communication signals in accordance with at least some embodiments of the present disclosure.

FIG. 25 depicts an illustrative non-restrictive example of an exemplary process based at least in part on a mobile communication signals in accordance with at least some embodiments of the present disclosure. In some embodiments, the exemplary process of FIG. 25 may include at least the following steps of: at step 2501, receiving, by an access controlling platform, an expectation data record as an access control mechanism to access an access-restricted digital resource, the expectation data record including: an access code and an identity linked to a computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; at step 2502, receiving, by the access controlling platform, while the access controller interface element is displayed, a mobile originating communication having data that includes: the access code and the identity; at step 2503, performing, by the access controlling platform, a confirmation of the expectation data record with the mobile originating communication; at step 2504, when the confirmation is successful: instructing, by the access controlling platform, based on at least one part of the data, the cellular communications network to perform at least one action with the cellular network hosted access controlling schema to generate a session record associated with the identity; and, at step 2505, authorizing, by the access controlling platform, the computing device to unlock the access-restricted digital resource for accessing via the computing device.

As used herein, the terms "computer element," "network element," and "element" identify at least one software component and/or a combination of at least one software component and at least one hardware component which are designed/programmed/configured to manage/control other software and/or hardware components (such as the libraries, software development kits (SDKs), objects, etc.).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, in at least some embodiments, the terms "if" and "when" shall have the same meaning.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session or can refer to an automated software application which receives the data and stores or processes the data.

Examples of hardware elements may include processors, microprocessors, circuits, circuit elements (e.g. transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

At least some aspects of the present disclosure will now be described with reference to the following numbered clauses.

Clause 1. A method includes at least steps of: receiving, by a processor of a computing device, via an application program and a communications network, at least one application program instruction to display an access controller interface element and an access code on a screen of the computing device; where the access controller interface element is: communicatively coupled to a cellular network hosted access controlling schema and operationally linked to an access-restricted digital resource; executing, by the processor of the computing device, the at least one application program instruction to display the access controller interface element and the access code on the screen of the computing device; detecting, by the processor of the computing device, at least one activity associated with the access controller interface element; transmitting, by the processor of the computing device, based on the detecting of the at least one activity, an access request having data that includes at least: the access code and an identity linked to the computing device; where at least one part of the data is configured to be accepted by the cellular network hosted access controlling schema; receiving, by the processor of the computing device, in response to the transmitting the access request and via the application program, at least one access program instruction to unlock the access-restricted digital resource for accessing via the computing device; where the receiving the at least one access program instruction to unlock the access-restricted digital resource is after the at least one part of the data has been accepted by the cellular network hosted access controlling schema; and executing, by the processor of the computing device, the at least one access program instruction to unlock the access-restricted digital resource for accessing via the computing device.

Clause 2. The method of clause 1 or any clause herein, where the transmitting the access request is in accordance with at least one of: a mobile originating cellular communications protocol or a communications protocol of a transmission control protocol/Internet protocol (TCP/IP) suite.

Clause 3. The method of clause 1 or any clause herein, further including: requesting, by the processor of the computing device, via the application program, the at least one application program instruction.

Clause 4. The method of clause 1 or any clause herein, where the access-restricted digital resource includes at least one of: an access-restricted internet content or an access-restricted internet service.

Clause 5. The method of clause 1 or any clause herein, where the identity is: a cellular identity or derived from the cellular identity; and where the cellular identity identifies: a cellular device that is programmatically associated with the computing device or the computing device that is a cellular service-enabled device.

Clause 6. The method of clause 5 or any clause herein, where the cellular identity is one of: an International Mobile Subscriber Identity (IMSI), a cryptographically hashed IMSI, a Mobile Station International Subscriber Directory Number (MSISDN), or a cryptographically hashed MSISDN.

Clause 7. The method of clause 1 or any clause herein, where the at least one access program instruction includes a universal resource locator (URL), referencing an Internet address of the access-restricted digital resource.

Clause 8. The method of clause 1 or any clause herein, where the at least one application program instruction includes at least one of at least one JavaScript instruction, at least one HTML instruction, or at least one CSS instruction, to control an appearance, at least one functionality, or both, of the access controller interface element.

Clause 9. The method of clause 1 or any clause herein, where the access request includes symbolically prefixed address signals specifying the access code.

Clause 10. The method of clause 1 or any clause herein, where the cellular network hosted access controlling schema is configured to accept the at least one part of the data as an access charge to be applied to a cellular account associated with the identity.

Clause 11. The method of clause 11 or any clause herein, further including: executing, by the processor of the computing device, the at least one application program instruction to display the access code: on the access controller interface element or in a visual vicinity of the access controller interface element.

Clause 12. The method of clause 2 or any clause herein, where the mobile originating cellular communications protocol is one of: a Telephony call setup request, a Short Message Service request, or an Unstructured Supplementary Services Data request.

Clause 13. A method includes at least steps of: transmitting, by a processor of an access control server, via an application program and a communications network, to a computing device, at least one application program instruction to display an access controller interface element and an access code on a screen of the computing device; where the access controller interface element is: communicatively coupled to a cellular network hosted access controlling schema and operationally linked to an access-restricted digital resource, restricted from being accessed via the computing device; receiving, by the processor of the access control server, an access request based on at least one activity associated with the access controller interface element; where the access request having data that includes: the access code and an identity linked to the computing device; querying, by the processor of the access control server, based on at least one part of the data, the cellular network hosted access controlling schema for an affirmative access permission indication; where the at least one part of the data is configured to be accepted by the cellular network hosted access controlling schema; and transmitting, by the processor of the access control server, to the computing device, based on the affirmative access permission indication and via the application program, at least one access program instruction to unlock the access-restricted digital resource for accessing via the computing device.

Clause 14. The method of clause 13 or any clause herein, where the receiving the access request is in accordance with at least one of: a mobile originating cellular communications protocol or a communications protocol of a transmission control protocol/Internet protocol (TCP/IP) suite.

Clause 15. The method of clause 13 or any clause herein, where the affirmative access permission indication specifies that the at least one part of the data has been accepted by the cellular network hosted access controlling schema as an access charge to be applied to a cellular account associated with the cellular identity of the computing device.

Clause 16. The method of clause 13 or any clause herein, where the at least one application program instruction further instructs the computing device to: specify the access code as symbolically prefixed address signals of the access request and utilize a mobile originating cellular communications protocol to transmit the access request to the cellular network hosted access controlling schema.

Clause 17. A computing device including at least the following components: at least one processor in communication with a non-transitory computer readable medium storing at least one first application program instruction; where the at least one first application program instruction, when executed, cause the at least one processor to: receive at least one second application program instruction to display an access controller interface element and an access code on a screen of the computing device; where the access controller interface element is: communicatively coupled to a cellular network hosted access controlling schema and operationally linked to an access-restricted digital resource, restricted from being accessed via the computing device; execute the at least one second programming instruction to display the access controller interface element and the access code on the screen of the computing device; detect at least one activity associated with the access controller interface element; transmit, based on the detecting of the at least one activity, an access request having data that includes: the access code and an identity linked to the computing device; wherein at least one part of the data is configured to be accepted by the cellular network hosted access controlling schema; receive, in response to the access request, at least one access program instruction to unlock the access-restricted digital resource for accessing via the computing device; where the receiving the at least one access program instruction to unlock the access-restricted digital resource is after the at least one part of the data has been accepted by the cellular network hosted access controlling schema; and execute the at least one access program instruction to unlock the access-restricted digital resource for accessing via the computing device.

Clause 18. The computing device of clause 17 or any clause herein, where the computing device is further configured to transmit the access request in accordance with at least one of: a mobile originating cellular communications protocol or a communications protocol of a transmission control protocol/Internet protocol (TCP/IP) suite.

Clause 19. The computing device of clause 17 or any clause herein, where the access-restricted digital resource includes at least one of: an access-restricted internet content, or an access-restricted internet service.

Clause 20. The computing device of clause 17 or any clause herein, where the identity is: a cellular identity or derived from the cellular identity; and where the cellular identity identifies: a cellular device that is programmatically associated with the computing device or the computing device that is a cellular service-enabled device.

Clause 21. The computing device of clause 17 or any clause herein, where the cellular identity is one of: an International Mobile Subscriber Identity (IMSI), a cryptographically hashed IMSI, a Mobile Station International Subscriber Directory Number (MSISDN), or a cryptographically hashed MSISDN.

Clause 22. The computing device of clause 17 or any clause herein, where the cellular network hosted access controlling schema is configured to accept the at least one part of the data as an access charge to be applied to a cellular account associated with the identity.

Clause 23. The computing device of clause 17 or any clause herein, where the at least one second application program instruction further instructs the computing device to display the access code: on the access controller interface element or in a visual vicinity of the access controller interface element.

Clause 24. A method including: recording, by an access controlling platform, an expectation data record as an access control mechanism to access an access-restricted digital resource, the expectation data record including: an access code and an identity linked to the computing device; where the access code is associated with the access-restricted digital resource, restricted from being accessed via a computing device; where the expectation data record has been generated while an access controller interface element is displayed on a screen of the computing device; where the access controller interface element is operationally linked to the access-restricted digital resource; receiving, by the access controlling platform, while the access controller interface element is displayed, a mobile originating communication having data that includes: the access code and the identity; performing, by the access controlling platform, a confirmation of the expectation data record with the mobile originating communication; when the confirmation is successful: instructing, by the access controlling platform, based on at least one part of the data, the cellular communications network to perform at least one action with the cellular network hosted access controlling schema to generate a session record associated with the identity; and authorizing, by the access controlling platform, the computing device to unlock the access-restricted digital resource for accessing via the computing device.

Clause 25. A system including: at least one processor of an access controlling platform; where the at least one processor is in communication with a non-transitory computer readable medium storing software instructions that, when being executed by the at least one processor, instruct the access controlling platform to: recording an expectation data record as an access control mechanism to access an access-restricted digital resource, the expectation data record including: an access code and an identity linked to a computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; receive, via the cellular network hosted access controlling schema and while the access controller interface element is displayed, a mobile originating communication having data that includes: the access code and the identity; perform a confirmation of the expectation data record with the mobile originating communication; when the confirmation is successful: instruct the cellular communications network to perform, based on at least one part of the data, at least one action with the cellular network hosted access controlling schema to generate a session record associated with the identity; and authorize the computing device to unlock the access-restricted digital resource for the accessing via the computing device.

Clause 26. The method of clause 24, the system of clause 25, or any clause herein, where the mobile originating communication is a telephone call; and where the instructing, by the access controlling platform, the cellular communications network to perform at least one action further includes: instructing, by the access controlling platform, the cellular communications network to: answer the telephone call and release the telephone call momentarily thereafter, once sufficient time passes to generate the session record associated with the identity.

Clause 27. The clause 26 or any clause herein, where the sufficient time is less than 1 second.

Clause 28. The method of clause 24, the system of clause 25, or any clause herein, where the identity is: a cellular identity or derived from the cellular identity; and where the cellular identity identifies: a cellular device that is programmatically associated with the computing device or the computing device that is a cellular service-enabled device.

Clause 29. The clause 28 or any clause herein, where the cellular identity is one of: an International Mobile Subscriber Identity (IMSI) or a Mobile Station International Subscriber Directory Number (MSISDN).

Clause 30. The method of clause 24, the system of clause 25, or any clause herein, where the access-restricted digital resource includes at least one of: an access-restricted internet content or an access-restricted internet service.

Clause 31. The method of clause 24, the system of clause 25, or any clause herein, where the mobile originating communication is in accordance with a mobile originating cellular communications protocol.

Clause 32. The clause 31 or any clause herein, where the mobile originating cellular communications protocol is one of: a Telephone call setup request, a Short Message Service request, or an Unstructured Supplementary Services Data request.

Clause 33. The method of clause 24, the system of clause 25, or any clause herein, where the mobile originating communication includes symbolically prefixed address signals specifying the access code.

Clause 34. The method of clause 24, the system of clause 25, or any clause herein, where the cellular network hosted access controlling schema is configured to accept the at least one part of the data for generating the session record in a cellular account associated with the identity.

Clause 35. The clause 34 or any clause herein, where the session record includes an access charge for accessing the access-restricted digital resource via the computing device.

Clause 36. The method of clause 24, or any clause herein, further including: transmitting, by the access controlling platform to the computing device, prior to the receiving the expectation data record, at least one application program instruction to display the access controller interface element and the access code on the screen of the computing device.

Clause 37. The method of clause 36, or any clause herein, where the at least one application program instruction further instructs the computing device to display the access code: on the access controller interface element or in a visual vicinity of the access controller interface element.

Clause 38. The method of clause 24, or any clause herein, where the authorizing the computing device to unlock the access-restricted digital resource for accessing via the computing device, further including: transmitting, by the access controlling platform to the computing device, based on the confirmation, at least one access program instruction to unlock the access-restricted digital resource for accessing via the computing device.

Clause 39. The method of clause 38, or any clause herein, where the at least one access program instruction includes a universal resource locator (URL), referencing an Internet address of the access-restricted digital resource.

Clause 40. The method of clause 24, or any clause herein, where the performing of the confirmation further including: confirming, by the access controlling platform, that the expectation data record and the mobile originating communication have been received within a predetermined time period from each other.

Clause 41. The system of clause 25, or any clause herein, where the software instructions, when being executed by the at least one processor, further instruct the access controlling platform to transmit to the computing device, prior to the receiving the expectation data record, at least one application program instruction to display the access code on the access controller interface element.

Clause 42. The system of clause 25, or any clause herein, where the software instructions, when being executed by the at least one processor, further instruct the access controlling platform to transmit to the computing device, based on the confirmation, at least one access program instruction to unlock the access-restricted digital resource for accessing via the computing device.

Clause 43. The system of clause 25, or any clause herein, where the software instructions, when being executed by the at least one processor, further instruct the access controlling platform to confirm that the expectation data record and the mobile originating communication have been received within a predetermined time period from each other.

Clause 44. A method including: receiving, by an access controlling platform, from a computing device, an expectation data record as an access control mechanism to access an access-restricted digital resource, the expectation data record including: an access code and an identity linked to the computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; receiving, by the access controlling platform, while the access controller interface element is displayed, a mobile originating communication having data that includes: the access code and the identity; performing, by the access controlling platform, a confirmation of the expectation data record with the mobile originating communication; when the confirmation is successful: instructing, by the access controlling platform, based on at least one part of the data, the cellular communications network to perform at least one action with the cellular network hosted access controlling schema to generate a session record associated with the identity; and authorizing, by the access controlling platform, the computing device to unlock the access-restricted digital resource for accessing via the computing device.

Clause 45. A system including: at least one processor of an access controlling platform; where the at least one processor is in communication with a non-transitory computer readable medium storing software instructions that, when being executed by the at least one processor, instruct the access controlling platform to: receive, from a computing device, an expectation data record as an access control mechanism to access an access-restricted digital resource, the expectation data record including: an access code and an identity linked to the computing device; where the access code is associated with the access-restricted digital resource, restricted from being accessed via the computing device; where the expectation data record has been generated while an access controller interface element is displayed on a screen of the computing device; where the access controller interface element is operationally linked to the access-restricted digital resource; receive, while the access controller interface element is displayed, a mobile originating communication having data that includes: the access code and the identity; perform a confirmation of the expectation data record with the mobile originating communication; when the confirmation is successful: instruct the cellular communications network to perform, based on at least one part of the data, at least one action with the cellular network hosted access controlling schema to generate a session record associated with the identity; and authorize the computing device to unlock the access-restricted digital resource for the accessing via the computing device.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
    receiving, by a processor of a computing device, via an application program and a communications network, at least one application program instruction to display an access controller interface element and an access code on a screen of the computing device;
    wherein the access controller interface element is:
        communicatively coupled to a cellular network hosted access controlling schema and
        operationally linked to an access-restricted digital resource;
    executing, by the processor of the computing device, the at least one application program instruction to display the access controller interface element and the access code on the screen of the computing device;
    detecting, by the processor of the computing device, at least one activity associated with the access controller interface element;
    transmitting, by the processor of the computing device, based on the detecting of the at least one activity, an access request having data that comprises:
        the access code and
        an identity linked to the computing device;
        wherein at least one part of the data is configured to be accepted by the cellular network hosted access controlling schema;
    receiving, by the processor of the computing device, in response to the transmitting the access request and via the application program, at least one access program instruction to unlock the access-restricted digital resource for accessing via the computing device;
    wherein the receiving the at least one access program instruction to unlock the access-restricted digital resource is after the at least one part of the data has been accepted by the cellular network hosted access controlling schema; and executing, by the processor of the computing device, the at least one access program instruction to unlock the access-restricted digital resource for accessing via the computing device.

2. The method of claim 1, wherein the transmitting the access request is in accordance with at least one of:
a mobile originating cellular communications protocol or
a communications protocol of a transmission control protocol/Internet protocol (TCP/IP) suite.

3. The method of claim 1, further comprising:
requesting, by the processor of the computing device, via the application program, the at least one application program instruction.

4. The method of claim 1, wherein the access-restricted digital resource comprises at least one of:
an access-restricted internet content or an access-restricted internet service.

5. The method of claim 1, wherein the identity is:
a cellular identity or
derived from the cellular identity; and
wherein the cellular identity identifies:
a cellular device that is programmatically associated with the computing device or the computing device that is a cellular service-enabled device.

6. The method of claim 5, wherein the cellular identity is one of:
an International Mobile Subscriber Identity (IMSI),
a cryptographically hashed IMSI,
a Mobile Station International Subscriber Directory Number (MSISDN), or
a cryptographically hashed MSISDN.

7. The method of claim 1, wherein the at least one access program instruction comprises a universal resource locator (URL), referencing an Internet address of the access-restricted digital resource.

8. The method of claim 1, wherein the at least one application program instruction comprises at least one of at least one JavaScript instruction, at least one HTML instruction, or at least one CSS instruction, to control an appearance, at least one functionality, or both, of the access controller interface element.

9. The method of claim 1, wherein the access request comprises symbolically prefixed address signals specifying the access code.

10. The method of claim 1, wherein the cellular network hosted access controlling schema is configured to accept the at least one part of the data as an access charge to be applied to a cellular account associated with the identity.

11. The method of claim 1, further comprising:
executing, by the processor of the computing device, the at least one application program instruction to display the access code: on the access controller interface element or in a visual vicinity of the access controller interface element.

12. The method of claim 2, wherein the mobile originating cellular communications protocol is one of:
a Telephony call setup request,
a Short Message Service request, or
an Unstructured Supplementary Services Data request.

13. A method comprising:
transmitting, by a processor of an access control server, via an application program and a communications network, to a computing device, at least one application program instruction to display an access controller interface element and an access code on a screen of the computing device;
wherein the access controller interface element is:
communicatively coupled to a cellular network hosted access controlling schema and
operationally linked to an access-restricted digital resource, restricted from being accessed via the computing device;
receiving, by the processor of the access control server, an access request based on at least one activity associated with the access controller interface element;
wherein the access request having data that comprises:
the access code and
an identity linked to the computing device;
querying, by the processor of the access control server, based on at least one part of the data, the cellular network hosted access controlling schema for an affirmative access permission indication;
wherein the at least one part of the data is configured to be accepted by the cellular network hosted access controlling schema; and
transmitting, by the processor of the access control server, to the computing device, based on the affirmative access permission indication and via the application program, at least one access program instruction to unlock the access-restricted digital resource for accessing via the computing device.

14. The method of claim 13, wherein the receiving the access request is in accordance with at least one of:
a mobile originating cellular communications protocol or
a communications protocol of a transmission control protocol/Internet protocol (TCP/IP) suite.

15. The method of claim 14, wherein the mobile originating cellular communications protocol is one of:
a Telephony call setup request,
a Short Message Service request, or
an Unstructured Supplementary Services Data request.

16. The method of claim 13, wherein the access-restricted digital resource comprises at least one of:
an access-restricted internet content, or
an access-restricted internet service.

17. The method of claim 13, wherein the identity is:
a cellular identity or
derived from the cellular identity; and
wherein the cellular identity identifies:
a cellular device that is programmatically associated with the computing device or the computing device that is a cellular service-enabled device.

18. The method of claim 17, wherein the cellular identity is one of:
an International Mobile Subscriber Identity (IMSI),
a cryptographically hashed IMSI,
a Mobile Station International Subscriber Directory Number (MSISDN), or
a cryptographically hashed MSISDN.

19. The method of claim 13, wherein the affirmative access permission indication specifies that the at least one part of the data has been accepted by the cellular network hosted access controlling schema as an access charge to be applied to a cellular account associated with the identity.

20. The method of claim 13, wherein the at least one application program instruction comprises at least one of at least one JavaScript instruction, at least one HTML instruction, or at least one CSS instruction, to control an appearance, at least one functionality, or both, of the access controller interface element.

21. The method of claim 13, wherein the at least one application program instruction further instructs the computing device to display the access code: on the access controller interface element or in a visual vicinity of the access controller interface element.

22. The method of claim 13, wherein the at least one access program instruction comprises a universal resource locator (URL), referencing an Internet address of the access-restricted digital resource.

23. The method of claim 13, wherein the at least one application program instruction further instructs the computing device to:
specify the access code as symbolically prefixed address signals of the access request and utilize a mobile originating cellular communications protocol to transmit the access request to the cellular network hosted access controlling schema.

24. A computing device comprising:
at least one processor in communication with a non-transitory computer readable medium storing at least one first application program instruction;
wherein the at least one first application program instruction, when executed, cause the at least one processor to:
receive at least one second application program instruction to display an access controller interface element and an access code on a screen of the computing device;
wherein the access controller interface element is:
communicatively coupled to a cellular network hosted access controlling schema and
operationally linked to an access-restricted digital resource, restricted from being accessed via the computing device;
execute the at least one second programming instruction to display the access controller interface element and the access code on the screen of the computing device;
detect at least one activity associated with the access controller interface element;
transmit, based on the detecting of the at least one activity, an access request having data that comprises:
the access code and
an identity linked to the computing device;
wherein at least one part of the data is configured to be accepted by the cellular network hosted access controlling schema;
receive, in response to the access request, at least one access program instruction to unlock the access-restricted digital resource for accessing via the computing device;
wherein the receiving the at least one access program instruction to unlock the access-restricted digital resource is after the at least one part of the data has been accepted by the cellular network hosted access controlling schema; and
execute the at least one access program instruction to unlock the access-restricted digital resource for accessing via the computing device.

25. The computing device of claim 24, wherein the computing device is further configured to transmit the access request in accordance with at least one of:
a mobile originating cellular communications protocol or
a communications protocol of a transmission control protocol/Internet protocol (TCP/IP) suite.

26. The computing device of claim 24, wherein the access-restricted digital resource comprises at least one of:
an access-restricted internet content, or
an access-restricted internet service.

27. The computing device of claim 24, wherein the identity is:
a cellular identity or
derived from the cellular identity; and
wherein the cellular identity identifies:
a cellular device that is programmatically associated with the computing device or the computing device that is a cellular service-enabled device.

28. The computing device of claim 27, wherein the cellular identity is one of:
an International Mobile Subscriber Identity (IMSI),
a cryptographically hashed IMSI,
a Mobile Station International Subscriber Directory Number (MSISDN), or
a cryptographically hashed MSISDN.

29. The computing device of claim 24, wherein the cellular network hosted access controlling schema is configured to accept the at least one part of the data as an access charge to be applied to a cellular account associated with the identity.

30. The computing device of claim 24, wherein the at least one second application program instruction further instructs the computing device to display the access code: on the access controller interface element or in a visual vicinity of the access controller interface element.

* * * * *